United States Patent
Cooper et al.

(10) Patent No.: US 6,469,741 B2
(45) Date of Patent: Oct. 22, 2002

(54) APPARATUS AND METHOD FOR PROCESSING TELEVISION SIGNALS

(75) Inventors: J. Carl Cooper, Monte Sereno, CA (US); Howard Loveless, Ben Lomond, CA (US); David Wallen, San Francisco, CA (US); Mirko Vojnovic, Santa Clara, CA (US)

(73) Assignee: Pixel Instruments Corp., Los Gatos, CA (US)

( * ) Notice: Subject to any disclaimer, the term of this patent is extended or adjusted under 35 U.S.C. 154(b) by 0 days.

(21) Appl. No.: 09/848,582

(22) Filed: May 2, 2001

(65) Prior Publication Data

US 2001/0035912 A1 Nov. 1, 2001

Related U.S. Application Data

(60) Division of application No. 09/627,618, filed on Jul. 28, 2000, which is a division of application No. 09/324,339, filed on Jun. 2, 1999, now Pat. No. 6,141,057, which is a division of application No. 08/573,468, filed on Dec. 15, 1995, now Pat. No. 5,946,049, which is a continuation-in-part of application No. 08/096,240, filed on Jul. 26, 1993, now Pat. No. 5,550,594.

(51) Int. Cl.[7] .................................................. H04N 7/01
(52) U.S. Cl. ........................................ 348/441; 348/571
(58) Field of Search ................................ 348/513, 514, 348/572, 573, 714, 715, 718, 571, 441, 554, 555, 553; 345/605, 606, 698, 699; H04N 7/01, 11/20

(56) References Cited

U.S. PATENT DOCUMENTS

| 4,018,990 | A | 4/1977 | Long et al. |
|---|---|---|---|
| 4,109,276 | A | 8/1978 | Hopkins, Jr. et al. |
| 4,110,785 | A | 8/1978 | Dischert et al. |
| 4,400,719 | A | * 8/1983 | Powers ........................ 348/450 |
| 4,485,402 | A | 11/1984 | Searby |
| 4,527,145 | A | 7/1985 | Haussmann et al. |
| 4,623,922 | A | * 11/1986 | Wischermann ............... 348/580 |
| 4,698,664 | A | 10/1987 | Nichols et al. |
| 4,719,509 | A | * 1/1988 | Sakamoto .................... 348/441 |
| 4,812,783 | A | 3/1989 | Honjo et al. |
| 4,992,874 | A | 2/1991 | Willis et al. |
| 5,087,973 | A | * 2/1992 | Kawahara .................... 348/572 |
| 5,101,274 | A | 3/1992 | Yoshimura et al. |
| 5,294,984 | A | * 3/1994 | Mori et al. .................. 345/615 |
| 5,387,943 | A | 2/1995 | Silver |
| 5,442,636 | A | 8/1995 | Bontekoe |
| 5,877,815 | A | 3/1999 | Tsujimura |

OTHER PUBLICATIONS

Data Sheets for TRW TMC 2242 from TRW LSI Products Inc. 1991 Data Book Prior Art Submission in Ser. No. 096,240 Submitted Aug. 11, 1995.

* cited by examiner

Primary Examiner—Michael Lee
(74) Attorney, Agent, or Firm—J. Carl Cooper

(57) ABSTRACT

This invention is an apparatus and method for processing television signals and in particular high quality video type signals in analog or digital form. The preferred embodiments utilizes digital storage along with oversampling, interpolation and various filtering in recursive and nonrecursive form to provide fixed or variably delayed output video signals wherein the artifacts and distortion of the video is kept to low levels.

68 Claims, 39 Drawing Sheets

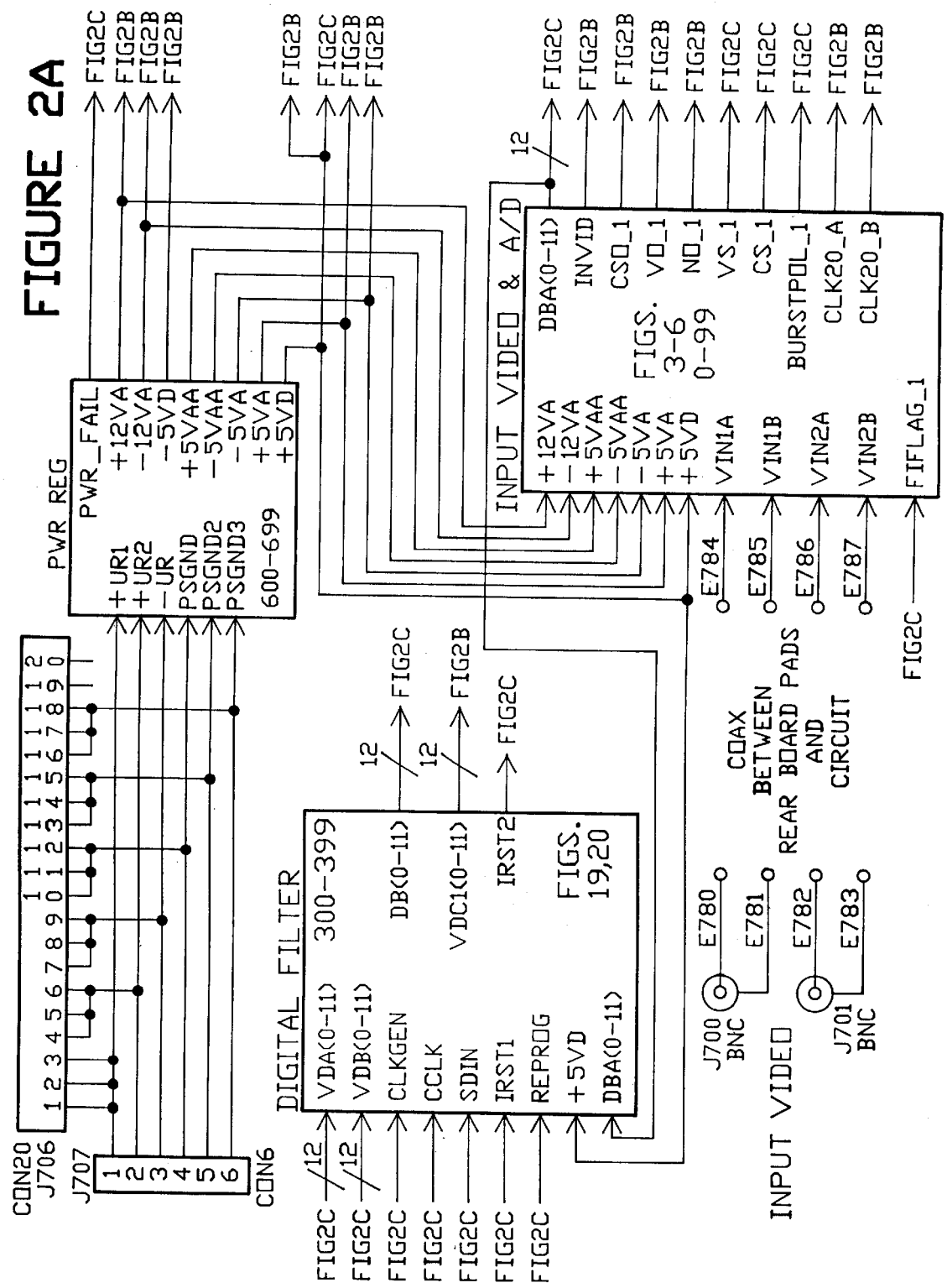

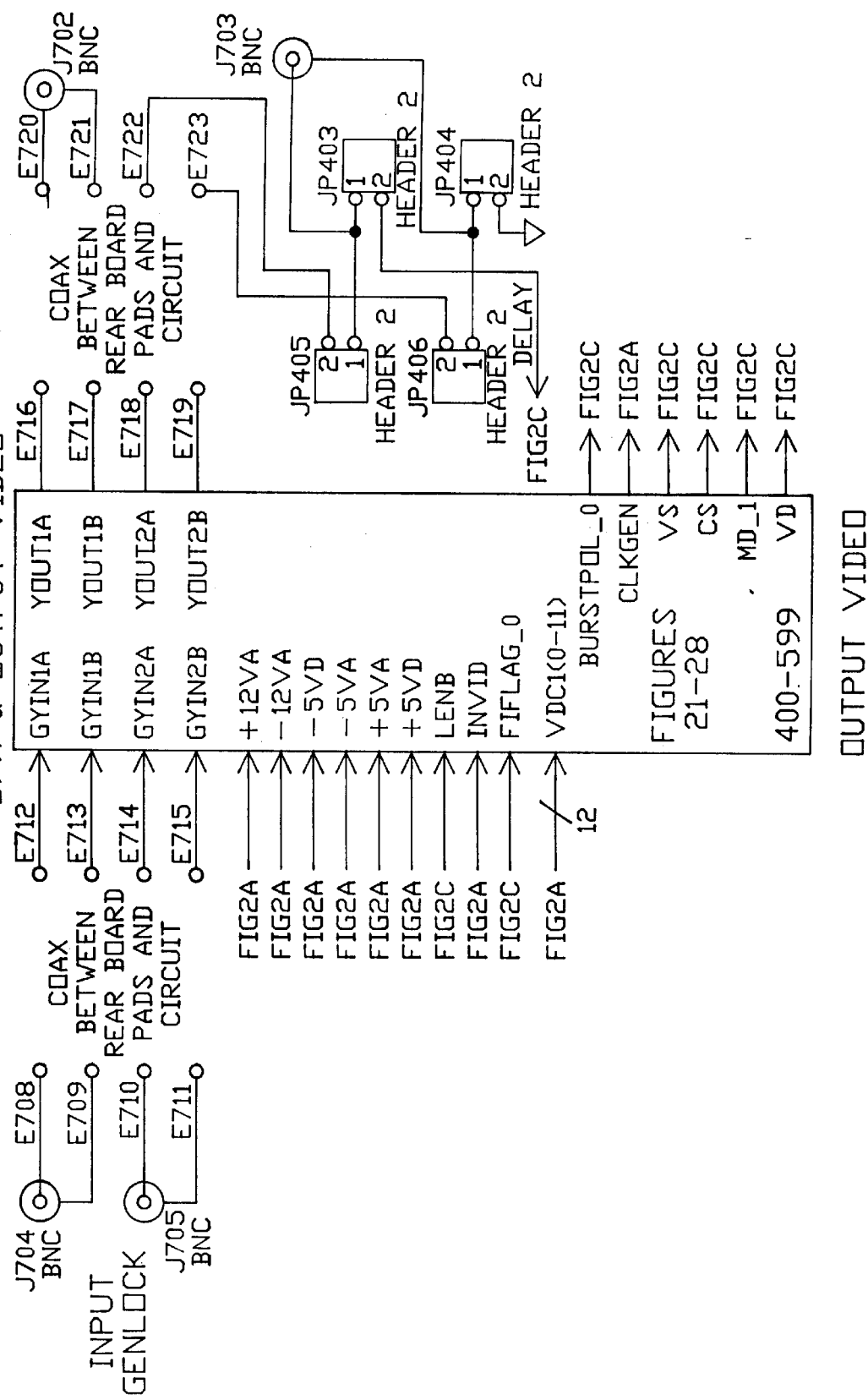

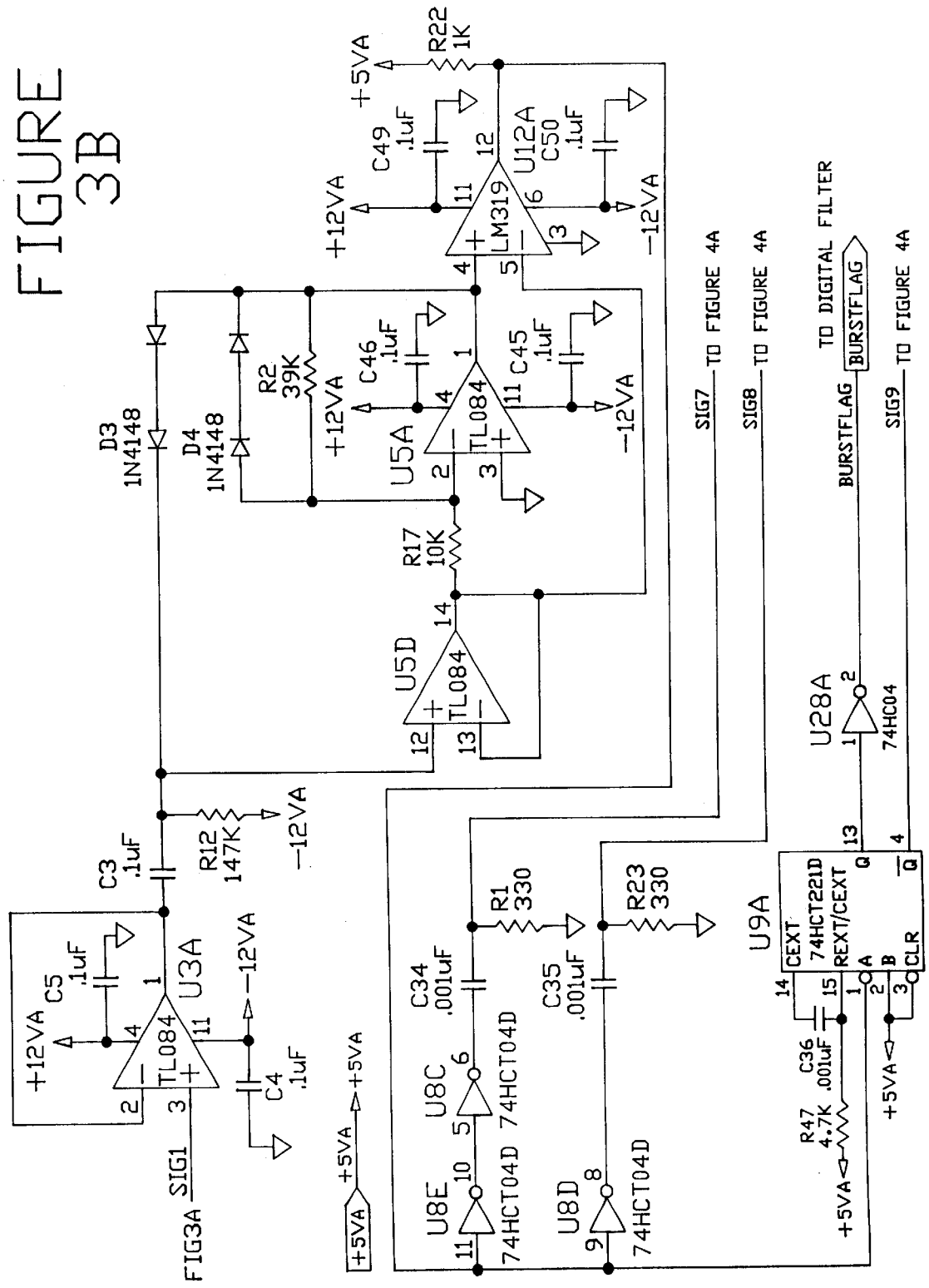

FIGURE 12 ALTERNATE SECONDARY SIGNAL PATH

APPARATUS AND METHOD FOR PROCESSING TELEVISION SIGNALS

This application is a division of application Ser. No. 09/627,618 filed Jul. 28, 2000 which in turn is a division of application Ser. No. 09/324,339 filed Jun. 02, 1999, now U.S. Pat. No. 6,141,057 issued Oct. 31, 2000 which in turn is a division of application Ser. No. 08/573,468 filed Dec. 15, 1995, now U.S. Pat. No. 5,946,049 issued Aug. 31, 1999, which in turn is a continuation in part of application Ser. No. 08/096,240 filed Jul. 26, 1993, now U.S. Pat. No. 5,550,594 issued Aug. 27, 1996. The above applications are incorporated herein by reference in their entirety for all purposes and to the extent permitted by law as if fully set out herein.

BACKGROUND OF THE INVENTION

1. Field of the Invention

The present invention relates to the field of synchronizing asynchronous signals and finds particular use in synchronizing video type signals in television systems.

2. Description of the Prior Art

The prior art contains many circuits for video synchronizers, beginning with U.S. Pat. No. 4,018,990. These synchronizers generally provide video synchronization by sampling and digitizing the active video portion of a video signal in response to the timing thereof, storing the digitized video in a memory, reading the digitized video from the memory at a proper time in response to a reference signal to achieve synchronization thereof, converting the read digitized video back to analog, and reconstructing and combining sync, burst and blanking with the read analog video.

Various techniques and circuits to perform these functions are well known in the art, and emphasis has been placed on improving performance in terms of minimizing noise and distortion from the digitizing process, and improving the immunity of the devices to noise which may be carried with or interfere with the signal which is being synchronized.

SUMMARY OF THE INVENTION

The inventive video synchronizer and improvements described herein are designed to allow synchronization of high quality video like signals in analog or digital form (which may include compressed digital form such as MPEG, etc.), while providing minimum distortion and maximum transparency. The invention is particularly well suited for efficiently synchronizing multiple video type signal of mixed or matched form to a desired reference signal. It will be recognized that the inventive teachings herein may be applied equally to analog signals in analog component, composite, serial and parallel and digital data streams in digital serial, parallel, component, composite and compressed forms, as well as other forms and standards of electronic signal conveyance.

Because full sync tip to peak white video is digitized in the analog preferred embodiment shown herein, one would normally expect quantizing errors to be significant. The inventive features of the preferred analog embodiment however show the use of sophisticated digital signal processing techniques such as over-sampling and interpolation, such that these errors are kept to unexpected low levels.

The inventive concepts described herein are applicable for many analog and digital video signal standards, including but not limited to MONOCHROME, SECAM, PAL, NTSC and HDTV versions in analog form, for example the well known RS-330 and RS-170 standards, as well as digital forms, for example the well known SMPTE 259 and 260 standards, or compressed digital form, for example JPEG, MPEG 1 and MPEG 2.

Other functions may be combined with the synchronizing function, for example standards conversion, compression and decompression, noise reduction, oversampling and filtering. Such additional functions will be referred to herein and in the claims as filtering, and will be understood to include such additional functions.

In the preferred embodiment of the invention it is taught to store and pass one or more secondary signal with the video signal in a fashion which maintains proper time relationship between the video signal and the secondary signal.

The preferred embodiment is suitable to be constructed on a single small, low power PC board which because of small size and low power may be installed in various case configurations. It is also shown to pass one or more secondary signals with the video signal in a separate parallel but time related path.

The inventive concepts described herein are well suited for use in synchronizing satellite feeds, inter-suite connections and in house signals, thus eliminating the use of expensive and cumbersome multiple genlocking and timing schemes.

Objects of the invention include:

An improved video synchronizer designed to allow synchronization of high quality video like signals while providing minimum distortion and maximum transparency.

A synchronizer which maintaining high signal quality at a reasonable price.

A synchronizer which digitizes full sync tip to peak white video with low quantizing error and distortion.

A digital signal device which makes use of oversampling and interpolation, such that sampling and quantizing errors are kept to unexpected low levels.

A video synchronizer which may be constructed on a single PC board and which may be installed in various case configurations.

A multiple signal synchronizer configuration in which a single genlock circuit may be utilized to provide reference signals for multiple synchronizers, but still retain individual genlock phase controls for each.

A signal synchronizer to use the input signal as the reference to allow the synchronizer to be used as an adjustable, fixed length delay, which use may be automatically switched.

A signal synchronizer capable of using recursive and nonrecursive adaptive filtering for noise reduction, image enhancement or other features.

A signal synchronizer capable of storing a full repetition period of the signal in memory.

A video signal synchronizer capable of digitizing and storing the entire video signal, including all sync, burst, horizontal blanking and vertical blanking so as to pass all signals encoded outside the active video area.

A video synchronizer capable of selecting ones of the signals contained within the blanking areas, so that those signals may be preserved and passed with only the repetitive sync burst and blanking reconstructed and reinserted in the stored signals from the memory.

Video signal processing having a memory for storing the video signal and having a parallel storage path for use in video or television systems for the passing of one or more related or unrelated secondary signals with the video signal in order to maintain separate parallel but time related transmission paths for the secondary signals.

A synchronizer for video type signals in which reduction in size and power consumption is brought about by minimizing the electronic circuitry.

A video synchronizer for multiple video signals of the same or different form for which the circuitry for each video signal may be separately constructed and which may be installed in various case configurations, with the common circuitry being shared by the multiple circuits.

A signal synchronizer in which one of the input signals is used as the reference.

A multiple electronic signal synchronizer which is configured to be used as an adjustable, fixed length delay, which use may be automatically switched.

A multiple signal synchronizer configured to use a selected one of the input signals as the reference to synchronize a plurality of input signals to one of the plurality, with the selection of the reference being automatically switched under known conditions.

A signal synchronizer capable of storing a full repetition period of the signal in memory.

A video signal synchronizer capable of storing the entire video signal, including associated sync, timing, error checking and ancillary signals or portions so as to pass those signals or portions in addition to the active video portions.

A video synchronizer capable of selecting ones of the portions outside of the active video so that those portions may be preserved and passed or reconstructed and reinserted in the stored signals from the memory.

A video signal processing device having a memory for the video signal and having an additional memory capability for one or more related or unrelated secondary signals in order to achieve proper time relationship of the secondary signals with respect to the associated video signal.

These and other objects of the invention will become apparent to one skilled in the art from the description herein, taken in conjunction with the attached drawings.

DESCRIPTION OF THE PREFERRED EMBODIMENT

Figure 1:
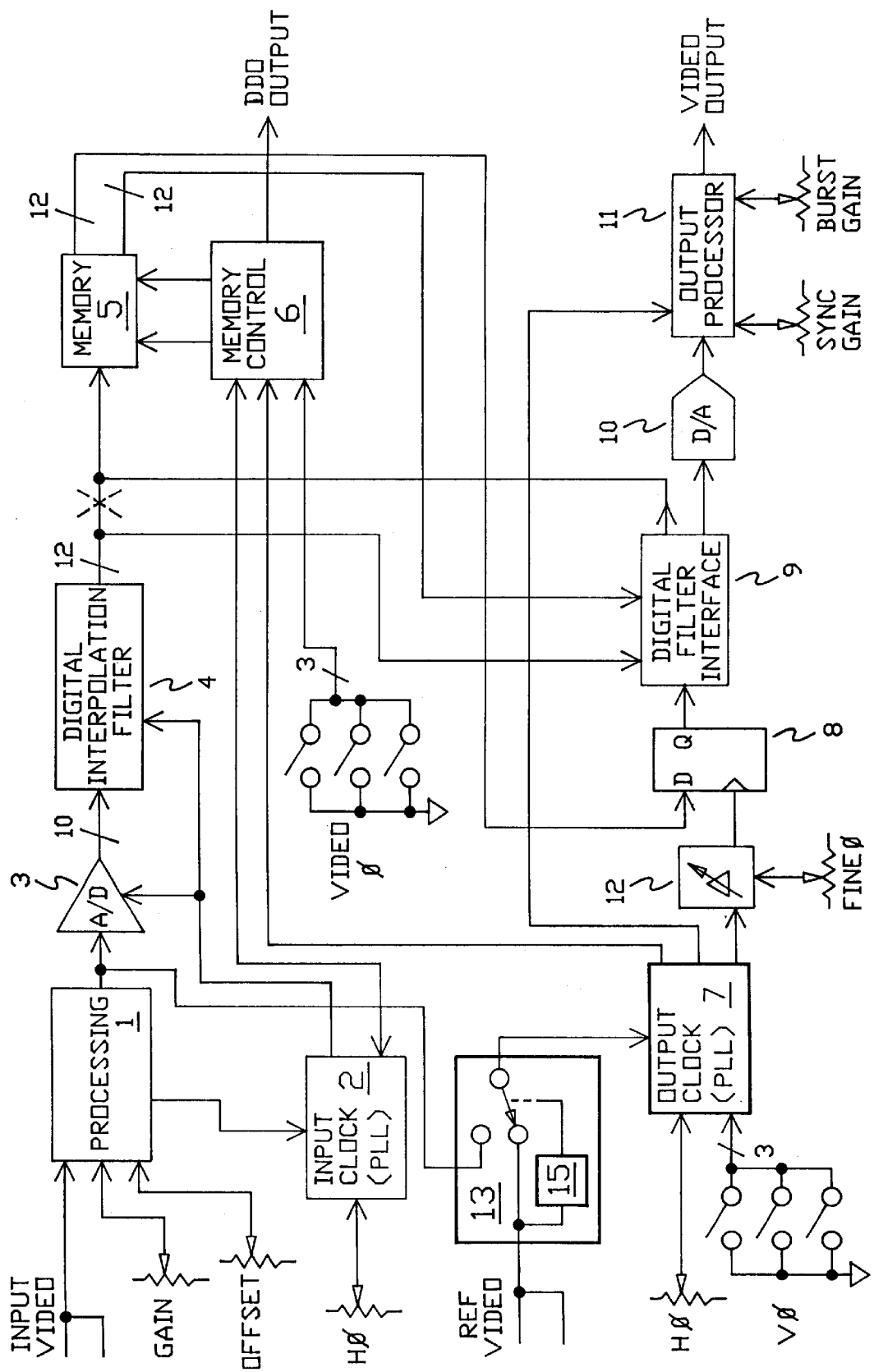
FIG. 1 is a block diagram of the preferred embodiment of the invention.

The preferred embodiment described herein is preferred for use with reference signals of a type similar to the common black burst signal or component or composite digital signals. Alternatively, other signals may be utilized for reference, for example individual ones of clock, subcarrier, H and V sync and field one reference, or compressed digital signals such as MPEG or JPEG types, which signals may be utilized in respect to the multiple synchronizer configuration described herein.

In such multiple synchronizer configuration a single genlock circuit may be utilized to provide such reference signals for all of the multiple synchronizers being utilized, but still retaining individual phase controls for each. Such is very useful since it is a common requirement to synchronize several signals to a common reference. Unlike other synchronizers which switch to an independent internally generated reference in the event that an external reference signal is not supplied, the preferred embodiment of the present invention teaches to automatically switch to use the input video like signal as a reference. This novel feature allows the synchronizer to be used as an adjustable, fixed length delay, useful for a variety of timing and other purposes.

In the preferred embodiment a multiple synchronizer configuration is used with the ability to install individual signal path circuit for each incoming electronic signal to be synchronized, with each of the individual signal path circuits being adapted to operate with the specific form of the signal. For example video signals such as analog, SMPTE 259, MPEG, JPEG, etc. and various associated signals such as analog and digital audio, time code, machine control as well as other related or unrelated secondary signals may all be synchronized by combining individual signal path circuits for each signal. Multiple collections of signals of differing types may be conveniently accommodated and synchronized.

It will be understood that the phrases signal path and signal path circuits will refer to accommodating at least one signal, but may also refer to accommodating multiple signals, since circuits accommodating individual signals maybe combined, with common elements, for example the memory and memory controller, being shared. For example, analog signal paths may be constructed together to allow multiple analog signals to be accommodated. Similarly digital signal paths may be combined. A digital program signal path may be constructed to accommodate a digital video signal and associated digital audio signals.

One of the novel features of the multiple synchronizer configuration taught herein is the ability to utilize a single genlock circuit to select the reference to which each of the multiple signals which are input to the synchronizer configuration are synchronized or timed. The genlock circuit is preferred to be capable of alternately selecting one of an external reference or the video signals to be synchronized for use. Such selection is preferred to be available as automatic or operator selectable, as desired by the operator. In the automatic operation, a hierarchy of selections may be specified, for example the operator might set the following criteria for selection:

highest priority, external digital reference next priority, external analog reference next priority, first video to be synchronized next priority, second video to be synchronized Using this plan, if the external digital reference is present it is used, otherwise the analog reference is used if it is present, otherwise the first video to be synchronized is used if it is present, otherwise the second video is used. This feature of the invention may be utilized to accommodate any number of signals.

Unlike other synchronizers which switch to an independent internally generated reference in the event that an external reference signal is not supplied or is lost, the preferred embodiment of the present invention teaches a capability to automatically switch to use the input video signal as the reference. This novel feature allows the synchronizer to be used as an adjustable, fixed length delay, useful for a variety of timing and other purposes. It will be appreciated that this capability may be used in conjunction with an internal reference however. For example, if none of the desired external signals or inputs is present, then the internal reference may be selected.

In the preferred embodiment it is desired to retain individual phase controls for adjustment of the output phase of each synchronized signal with respect to the reference signal. Such individual control is very useful since it is a frequent requirement to synchronize several input signals to a common reference signal. The individual controls may be located with, or part of, the common genlock circuit, or with each signal path, for example on the memory control circuit.

With the widespread use of digital video processing, audio synchronization is becoming a significant problem. The preferred embodiment of the invention shows inventive concepts which incorporate a digital delay output (DDO) which provides a steering signal to drive a companion audio synchronizer such as those described in U.S. Pat. Nos. 4,313,135 and 5,202,761, thereby providing accurate audio to video synchronization.

The preferred embodiment described herein may be constructed with commonly available parts. Specific attention is called to the family of digital video ICs which are supplied by Gennum Corporation of Toronto, Canada. These ICs provide all of the capability to interface serial video data streams to standard parallel sample data streams, such as those which are provided by the analog to digital converters and digital to analog converters shown in the earlier application. Gennum also provides ICs for operation with parallel video interconnection and for reconstruction and replacement of various synchronizing and other components outside of the active video portion of a digital signal. It will be recognized by one of ordinary skill in the art that the A-D and D-A circuitry may be replaced with the serial to parallel and parallel to serial converter circuits supplied by Gennum in order to utilize the present invention with digital video signals. Attention is also called to the family of analog and digital ICs manufactured by Crystal Semi-conductor of Austin, Tex. Crystal's ICs provide all of the capability of interfacing analog and digital associated signal such as audio, time code, control and other secondary signals in the signal path of the present invention. For example, Crystal supplies ICs for interfacing AES/EBU digital audio signals commonly associated with video signal with the memory circuitry 5 of the preferred embodiment.

Attention is further called to the several digital compression and decompression ICs supplied by manufacturers such as C-Cube, LSI logic and Zoran of San Jose, Calif. which ICs may be incorporated to facilitate use of the invention with compressed digital video, audio and associated signals for example as that which are compressed in accordance with JPEG or MPEG standards.

Novel digital signal processing techniques are also shown, such as video oversampling, recursive and nonrecursive adaptive noise reduction filtering. In the preferred embodiment, 10 bit oversampling with 12 bit processing and D-A conversion are used to maintain the utmost video signal integrity. A full 8 field video memory is shown for both PAL and NTSC, thus eliminating the need for chroma inverters and their inherent degradation of the signal.

The preferred embodiment of the invention makes use of video oversampling which is performed at 2560 X $f_h$ (40.3 MHz in NTSC) in the A-D conversion to provide digitized samples of the video, followed by digital interpolation filtering of the digitized samples to provide filtered samples in order to completely eliminate the high frequency phase distortion normally found in analog anti alias filters. This frequency is much higher than the highest standard frequency in use which is four times subcarrier (14.3 MHz for NTSC). In addition, this technique considerably reduces the quantizing and other distortions which normally plague digital devices. While the use of oversampling to ease input anti alias filtering is known in the industry, it should be noted that it is believed that the use of oversampling and interpolation to an increased number of bits of resolution is believed to be a novel feature in view of the unexpected result of reducing distortions occurring in the sampling and A-D conversion process. Most pronounced of these reduced distortions is a better than theoretical quantizing noise performance. Such decrease in quantizing noise allows system performance to be greater than that of the A/D and D/A convertors (which seldom are perfect), and in fact greater than what is normally considered theoretically possible for the given resolution of the A-D convertor. In addition other benefits are had, such as reduced differential gain and phase as well as reduced harmonic and phase distortion are all achieved by oversampling and interpolation, all of which are often reduced to levels lower than those achieved by a given A-D convertor operating without such oversampling and interpolation.

In addition to the excellent video performance, the inventive concepts described herein with respect to the preferred embodiment show to sample, digitize and store the entire video signal, including all syncs, bursts, horizontal blanking and vertical blanking. Such storage of the entire video signal is contrary to the established practice in the art, where only the active video portion of the signal is digitized and stored, and the repetitive sync, burst and blanking portions of the signal (which are mathematically defined and repetitive in nature) are reconstructed and added to the active video read from the memory. By digitizing and storing the full signal, all VITS (Vertical Interval Test Signals), VIRS (Vertical Interval Reference Signal), VITC (Vertical Interval Time Code), sound in sync and any other of the useful but nonrepetitive signals encoded outside the active video area may be preserved and passed.

For the purpose of further explanation of the invention, these information containing signals which reside outside of active video area of the signal will be referred to as the nonrepetitive signals (although some are in fact repetitive), and the repetitive signals such as horizontal and vertical sync and blanking, and color burst will be referred to generally as syncs or synchronizing signals. It will be known to one skilled in the art from the teachings herein that select portions contained within the blanking areas of the stored video from the memory may be preserved and passed and known ones of the repetitive sync burst and blanking portions may be reconstructed and inserted in the synchronized video.

Although the continuous digitizing and storing of video type signals presents a number of particular technical challenges, the most critical being that there is no time to clear, reset or synchronize FIFO memories and DRAM memory address circuits, such problems are overcome by the present invention, which solutions will be apparent to one skilled in the art from the teachings herein.

The ability to pass VITC will be quite useful for inter suite use and the preservation of sound in sync will be especially useful for PAL applications where such signals are commonly used. Alternatively, if the user does not desire to maintain this information, or wishes to insert new information, full reinsertion of sync, blanking and burst may be selected. Alternatively, as will be apparent from the teachings herein, it will be shown to digitize only the active video, and selected ones of the nonrepetitive signals contained within the blanking areas, so that those signals may be preserved and passed and selected ones of the repetitive sync burst and blanking may be reconstructed and reinserted in the stored signals from the memory. Furthermore, in the preferred embodiment a full repetition period of memory is used, for example 8 fields for PAL, thus there is no chance of upsetting the proper chroma subcarrier sequence in either PAL or NTSC and the need for chroma inverters or other chroma phase correction schemes is eliminated.

With the widespread use of digital video processing, audio synchronization is becoming a significant problem. The preferred embodiment shows inventive concepts which incorporate a digital delay output (DDO) which provides a steering signal to drive a companion audio synchronizer such as those described in U.S. Pat. Nos. 4,313,135 and 5,202,761, thus guaranteeing accurate audio to video synchronization.

The preferred embodiment described herein is shown schematically in FIGS. 2–28 and may be constructed with commonly available parts whose generic or manufacturers part numbers are given. While the part numbers for the ICs are commonly known, in the event that one does not immediately recognize the manufacturer, the IC Master may be consulted to locate the manufacturer from the part number prefix which is given. The preferred embodiment constructed according to the teaching herein meets the following technical description and is capable of meeting the following specifications with components which are commonly available. These specifications are common to both PAL and NTSC versions and where applicable will apply for other systems as well.

The preferred embodiment may be constructed on a single PC board suitable for mounting in a variety of case configurations, including a single board desk top version, a 6 board rack mount version, and a 12 board rack mount version. The 6 and 12 board versions may mix boards operating on various signal standards, for example NTSC and PAL boards. Schematic diagrams are shown in FIGS. 2–28 which have been constructed and tested to meet the following specifications and performance levels:

| | |
|---|---|
| Sampling Rate | 2560 × $f_h$, 40.3 MHz NTSC, 40.0 MHz PAL |
| Input Quantizing | 10 Bits |
| Digital Filtering | 2→1 decimation with 10→12 bit interpolation nonrecursive adaptive interpolation filtering digital anti-alias filtering optional adaptive recursive noise reduction optional digital temporal integration |
| Memory | 12 Bit video, including full storage of H and V blanking interval. |
| Bandwidth | ±1% to 8 MHz |
| Thru Gain | Unity ± 1% |
| S/N | 60 dB unweighted over 10 MHz bandwidth |
| Chroma/Luma gain error | <1% |
| Chroma/Luma timing error | <5 ns |
| Chroma/Luma Intermodulation | <0.5% |
| Differential Gain | <1% |
| K Factor (2T Pulse) | <0.5% |
| 2T Pulse to Bar Error ratio | <1% |
| Short Time Distortion | <1% |
| Line Time Distortion | <0.25% |
| Field Time Distortion | <0.25% |
| Input/Output Crosstalk | −60 dB to 8 MHz |
| Control | selectable pass incoming blanking interval or insert new sync, burst and blanking. Inserted sync edges and burst envelope and $sine^2$ shaped. Sync and burst amplitude are adjustable. |
| GENLOCK | |
| H Ø adjust | ±3 μs (output H to reference H) |
| V Ø adjust | 3 H advance to 1 H delay (output V to reference V) |
| Burst Ø adjust | 360° (Inserted burst to reference burst) |
| VIDEO PROC | |
| Video setup | ±10 IRE (operative with inserted sync) |
| Video gain | ±20 IRE |
| H Ø adjust | ±3 μs (active video to inserted sync) |
| Hue Ø Adjust | ±20° (active video to inserted burst) |
| INPUTS | |
| Video in (differential looping) | |
| Reference (differential looping) | |
| OUTPUTS | |
| Video 1 | |
| Video 2/DDO (strap selectable) | |
| FRONT PANEL CONTROLS AND ADJUSTMENTS | |
| Output Gain | |
| Output Hue | |
| Input Setup | |
| Input Gain | |
| Input 75Ω term | |
| Hue | |
| Digital Filter Select | |
| Genlock Burst Ø | |
| Genlock VØ | |
| Genlock HØ | |
| POWER | |
| 110/120 or 220/240 volt strap selectable | |
| 50/60 Hz | |
| 32 Watts Max. 27 Watts typical | |
| ENVIRONMENTAL | |
| Temperature | |
| Operating: 0° C. to +45° C. | |
| Storage: −55° C. to +75° C. | |
| Humidity: 10–95%, non condensing | |
| TYPICAL MOUNTING CASE SIZES FOR PREFERRED EMBODIMENT | |
| Single board case | 1.75"H × 8.75"W × 17"D |
| Six Board case 19" rack mount | 3.5"H × 19"W × 18.5"D |
| Twelve Board case 19" rack mount | 7"H × 19"W × 18.5"D |

The diagram of FIG. 1 shows a video input terminal which is preferred to be of the high impedance looping type, which input is coupled to a processing section 1. The processing section operates to DC restore the video, remove common noise offset and noise, provide video gain and video offset to the video signal, which signal is coupled to the input of an Analog to Digital convertor section 3, and to a reference selecting section 13. In addition, the processing section 1 operates to recover synchronizing information from the input video signal, and couple this synchronizing information to the input clock section 2, which in the preferred embodiment contains a phase locked loop. The preferred embodiment operates to detect when the input signal is disrupted, with the memory responsive thereto to cease storing of samples and repetitively output a repetition period of stored samples during at least the pendency of the disruption.

The video from the processing section 1 is coupled to an A/D convertor section 3 where it is sampled and digitized at a first data rate, for example 40 MHz, in response to the input clock circuit 2. The digitized video from the A/D section 3 is coupled to the Digital Interpolation Filter section 4, which in the preferred embodiment operates to reduce the data rate of the digitized video from the first rate of 40 MHz to a second rate of 20 MHz. In addition, interpolation filter 4 operates to increase the number of bits of resolution of the digitized video signal, for example from 10 to 12.

The samples from the interpolation filter 4 are coupled to a memory section 5 under control of a memory control 6. The memory control 6 operates to store the incoming samples of the video signal at known locations in the memory, and when said samples are required to be output in response to the reference video from 13 as determined via output clock section 7, the memory control causes those samples to be read from the memory. For example, the first pixel of the first line of the first field of video may be written to memory address 0000 with the second pixel written to address 0001, etc. Shortly before it is required to output these pixels in order to have them synchronously related to the reference signal, the pixels are read from these addresses. It is not necessary that the address that a given pixel is written into always be the same, as the starting address may very well be different, progressing in some orderly fashion, or even randomly chosen. Such changing of writing address merely requires that the memory control 6 keep track of where the pixels are written so that they may be retrieved as needed.

In FIG. 1, the memory 5 is shown to have an input and two outputs. As is known in the industry, it is fairly easy to arrange memory devices in such a fashion as to have any required number of inputs and outputs or ports. It is also known to have common ports which can serve as either an input or output, all under control of memory control section 6.

It will be seen that memory output via connection X is coupled through a latch 8 which is clocked by a clock from variable delay 12 to achieve variable timing as required. It will be understood that while 8 is shown as a single DQ latch, it is intended to represent a variable delay of any integer or noninteger number of clock cycles as required.

The preferred embodiment of FIG. 1 contains a digital filter interface 9 which has coupled to it the output of the digital interpolation filter 4 via connection Y, the input of the memory 5 via connection Z, the two outputs of the memory 5 via connections Z, the two outputs of the memory 5 via connections X and W. Such arrangement allows the digital filter interface 9 to be electrically located in the data path into the memory, or the data path out of the memory, or both. In addition, the digital filter interface 9 has an output coupled to the Digital to Analog section 10 to provide output video thereto, for conversion back to analog, which analog output is then coupled to an output processor 11.

Output processor 11 may serve to pass the output analog video with a minimum of processing, or may be configured to insert one or more of newly constructed sync, blanking, burst or other timing or test signals.

Output clock section 7, operates to provide clock and timing signals to control the reading of memory. In the preferred embodiment, a reference video signal is applied to 7 via 13 and the output clock section operates in conjunction with 6 to cause the video output from 11 to be synchronously related to the reference signal. It is possible from the adjustment to the HØ, VØ and fineØ controls on 7 and 12 to obtain video output from 11 which has a controlled phase offset with respect to the reference. For example, the video output may be advanced somewhat to make up for subsequent delays it will experience in transiting the cabling to another device such as a production switcher. Such control with respect to an external reference is well known in the art.

A novel feature of this invention is the reference selector 13 which contains a reference video present detector 15 and in the event reference video is not present, this detector will cause the switch in 13 to select the input video or a version thereof to be coupled to the output clock section 7. This is different from the normal operation of clock generators which will switch over to a free running crystal. By using the input video, it is possible to synchronize the video output to the video input, in other words the video is synchronized to itself. This operation effectively causes the apparatus to operate as a fixed delay, however in the case where the HØ and the VØ adjustments are used in the delay becomes adjustable. This is a very useful feature where video timing needs to be advanced. The video is effectively delayed for a repetition period (for example 8 fields in PAL) less the amount of the advance required. If in addition new sync and burst is added, the video can be adjusted by the Video Ø so that it can be repositioned with respect to the sync and burst thus making up for timing faults from other equipment.

Figure 31:
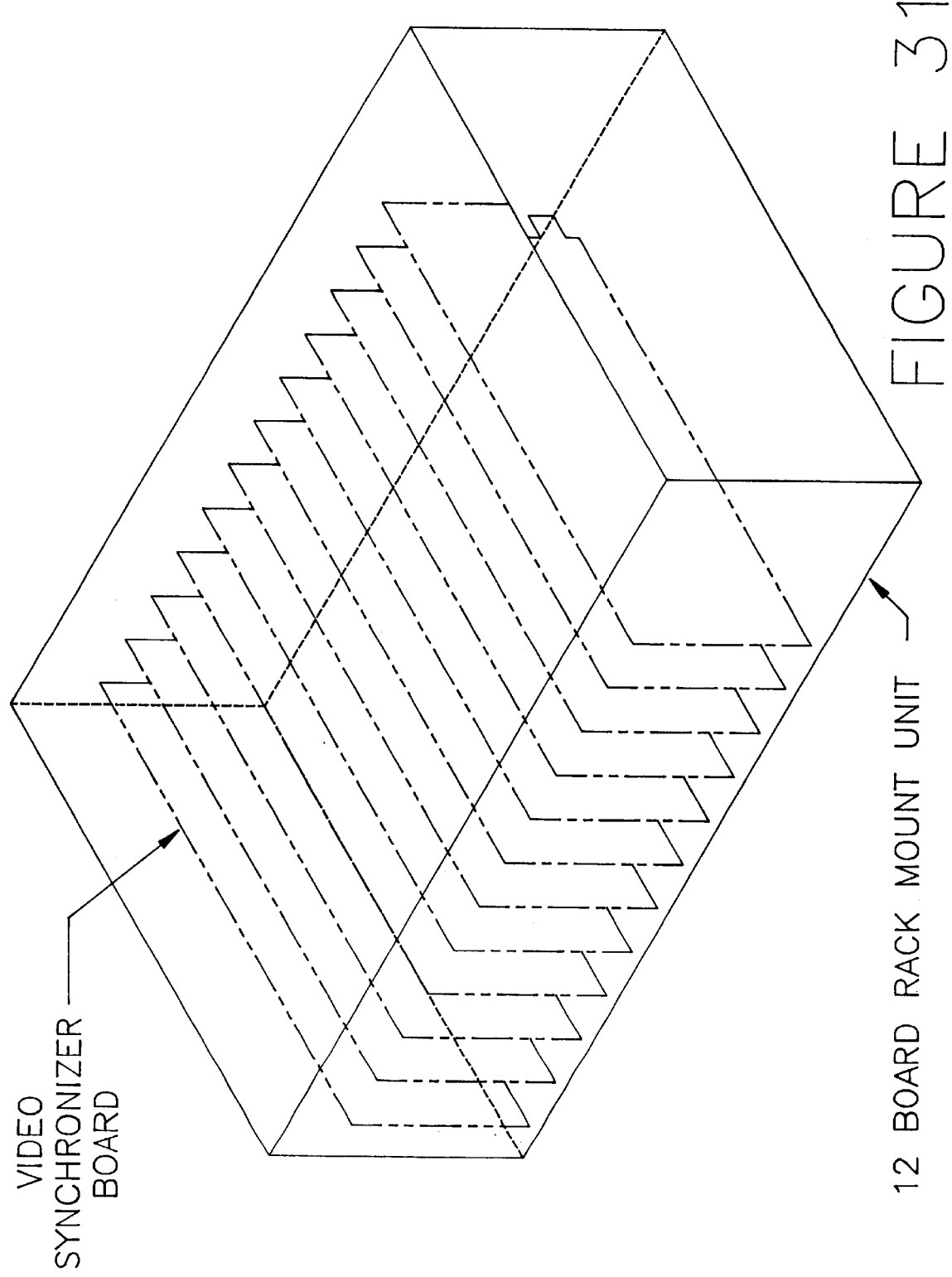
FIG. 31 is a third mechanical diagram of a third mechanical embodiment of the invention showing twelve electronic printed circuit boards each of which embodies the electronics of the preferred embodiment housed in a twelve board case.
Figure 32:
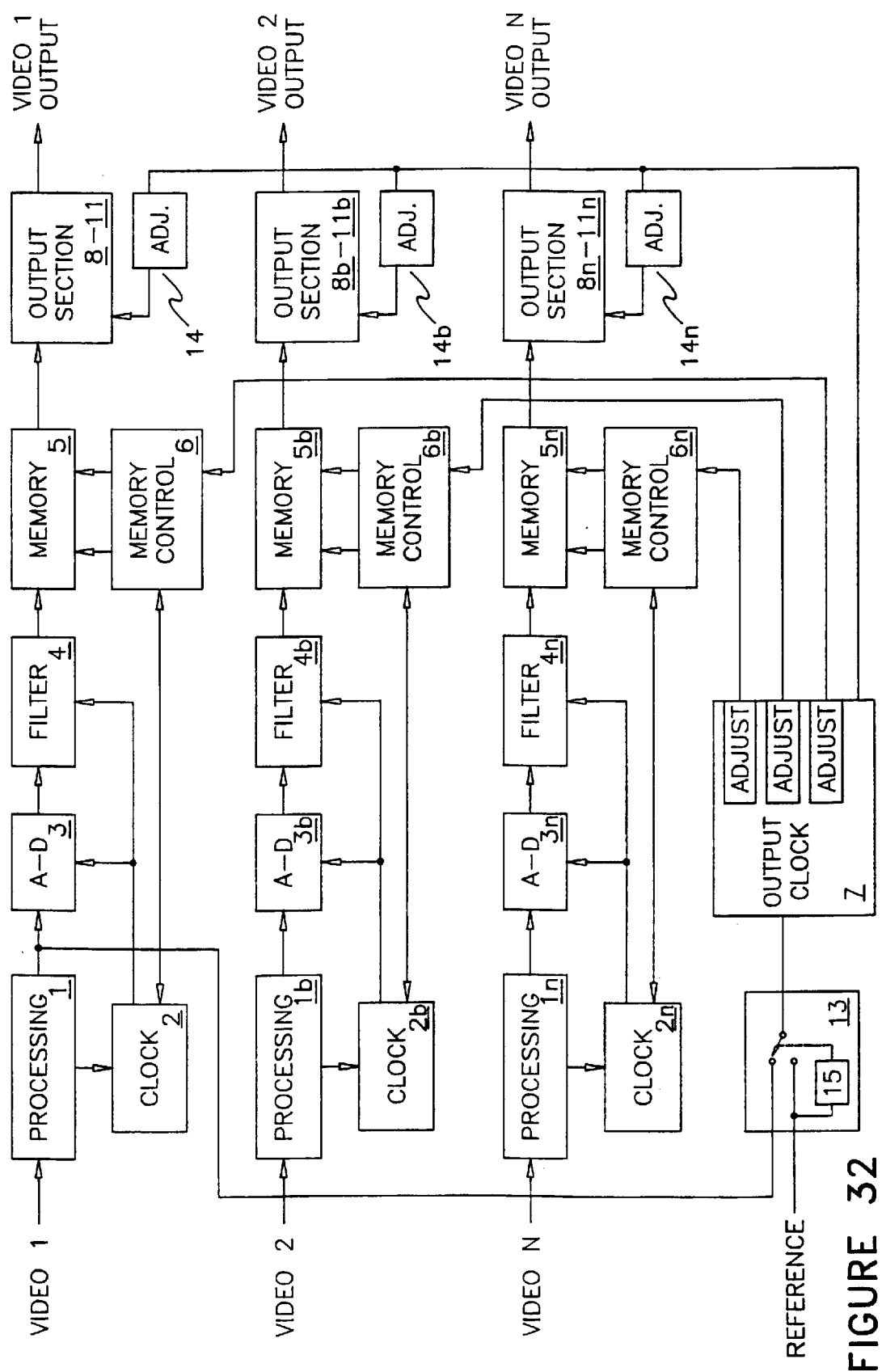
FIG. 32 is a block diagram of a plurality of synchronizers which share a common output clock circuit.

FIG. 32 shows a block diagram of a common reference selector 13 and output clock section 7 utilized with a plurality of video signal paths of FIG. 1. The clock and timing signals from 7 are coupled via individual adjustment controls to individual video signal paths consisting of elements 1, 2, 3, 4, 5, 6, and 8–11 all corresponding to the same numbered elements of FIG. 1. The individual adjustments of 7 correspond to the H & V phase and 14 to fine video phase adjustments of FIG. 1 31 thus allowing these parameters of each video output to be individually adjusted. The detailed changes necessary to convert the embodiment of FIGS. 1–31 to the embodiment of FIG. 32 will be realized by, and the construction thereof within the capability of, one of ordinary skill in the art from the teachings herein.

It will be noted that the memory control 6 has an output labeled DDO (digital delay output). This is a control signal which has a high period corresponding to the delay time of the video in the memory 5. This signal is used to drive a companion audio synchronizer to cause the audio portion of the program to be delayed by an amount equal to the video delay so as to avoid lip sync errors which would otherwise arise due to the video delay. Such devices are described in U.S. Pat. Nos. 4,313,135 and 5,202,761.

The interpolation filter 4 is a quite novel and useful feature of the invention. The net result of the operation of the interpolation filter 4 is to allow video to be sampled at a first data rate and resolution, and converted to video at a second data rate and the same or different resolution. Such will be useful where data rate is traded off for resolution, or vice versa. The forward case of trading speed for resolution is somewhat comforting, since with explanation, many of those skilled in the art can realize that by using or combining a number of samples of a first precision, a lower number of samples of a second higher precision may be obtained. Simply averaging two samples to create one sample is a simple example. In the process, an extra bit or so of resolution is achieved.

It is not so comforting to consider the case where the opposite takes place, namely where a first number of samples of a first precision are used or combined to obtain a larger number of samples of the same or another precision. Such operation may very well be desirable, for example to interpolate a relatively low number of samples taken at one standard, and converting to a higher number of samples. Converting from sampling at 3 times subcarrier to 4 times subcarrier would be an example where this would be useful.

While it normally would be expected that in performing a conversion to increase the number of samples by interpolation or other means, the effective resolution of the resultant samples would be decreased, this does not need to be the case. When signals are properly sampled at any precision at Nyquist rates or above, it is quite possible to convert from one sample rate to another by means of digital filtering and increase the precision at the same time, whether increasing or decreasing the sample rate! The reason for this resides in the nature of the sampling and digitization errors resulting from the quantizing process. It will be recalled that averaging of two similar samples of a signal results in a 3 Db reduction in random noise, since the signal always adds but the noise, being random, only adds part of the time, and sometime cancels. Such can be used to advantage in converting from one sample rate to another, since by combining multiple samples a corresponding noise reduction in an amount related to the coefficients of the samples of the combination takes place. This holds true even if the output sample rate is lesser or greater than the input.

It can thus be understood from these teachings that the digital interpolator filter 4 may be used to advantage to improve the quality of the digitized video beyond that provided by the A/D, for any combination of input and output data rates, owing to the use of multiple input samples to generate each output sample. It should also be noted that these teachings also apply to analog sampled systems, where sampling is performed and the samples are utilized in analog form but the samples are degraded or reduced in accuracy.

One example of such an application is CCD (charge coupled device) and BBD (bucket brigade device) technology where analog samples are taken and shifted along analog shift registers, but wherein the sample accuracy is limited by the quality of the shift registers. Such technologies are well suited for implementing various other functions of the present invention, including the digital filter and the memory sections.

Figure 2C:
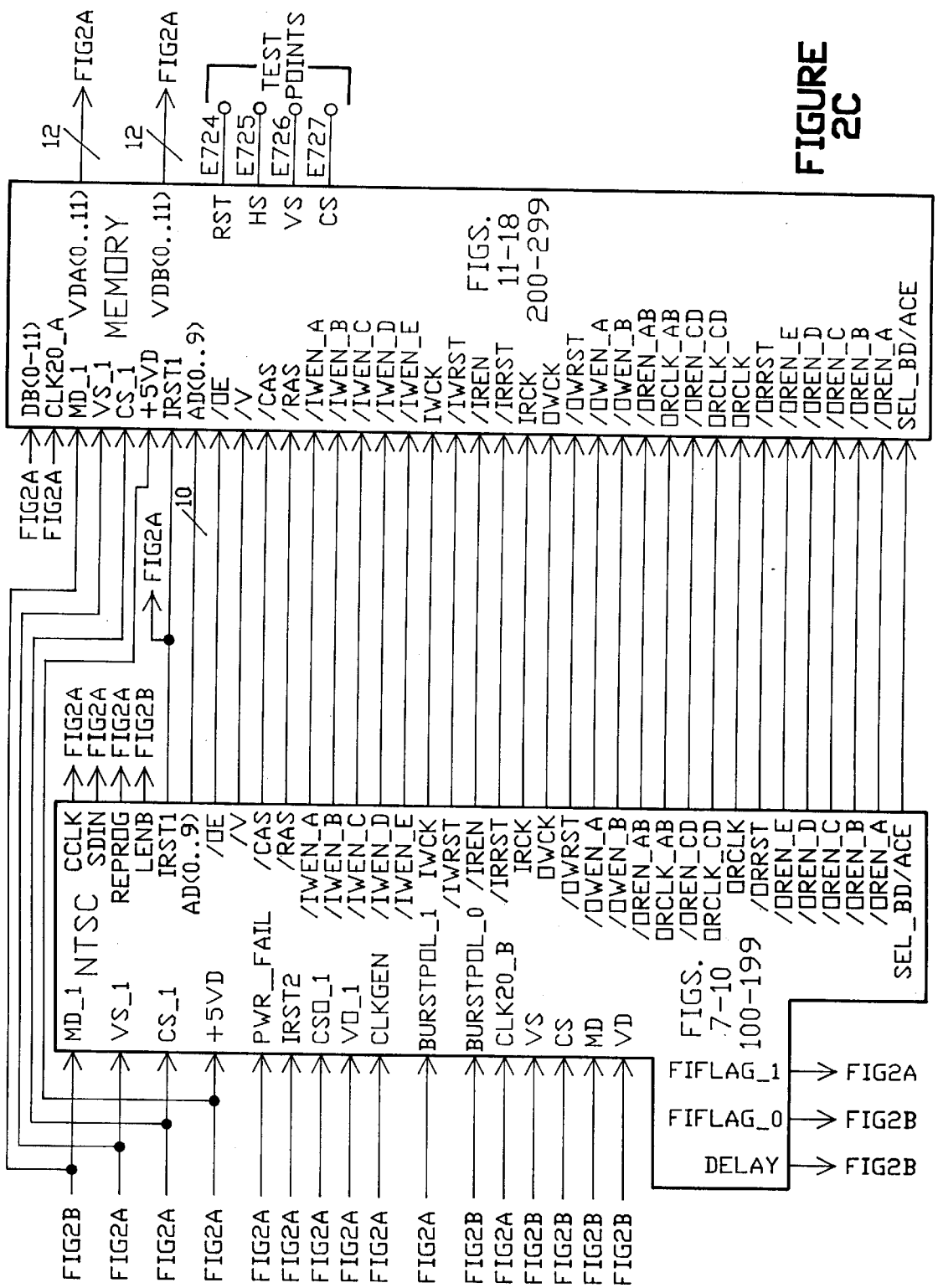
FIG. 2 is a top level schematic diagram of the remaining schematic diagrams of the preferred embodiment of the invention.

FIG. 2 is a top level schematic diagram of the remaining schematic diagrams of the preferred embodiment of the invention. It shows a power regulator section in the upper left labeled 600–699 which receives raw AC power and provides regulated DC power as is well known in the art. Regulated DC power is then supplied to the other sections of the schematic.

The Input Video and A/D sections of the schematic are shown in the central left, labeled 0–99. These schematic sections correspond roughly to elements 1–4 of FIG. 1. This circuit is shown in more detail in FIGS. 3–6, and the interconnection of these circuits with the other circuits is shown.

The Memory Timing and Control sections of the schematic are shown in the middle, labeled 100–199. This circuit is shown in more detail in FIGS. 7–10, and the interconnection of these circuits with the other circuits is shown. These schematic sections correspond roughly to element 6 of FIG. 1.

The Memory sections of the schematic are shown in the right, labeled 200–299. This circuit is shown in more detail in FIGS. 11–18, and the interconnection of these circuits with the other circuits is shown. These schematic sections correspond roughly to element 5 of FIG. 1.

The Digital Filter sections of the schematic are shown in the upper middle, labeled 300–399. This circuit is shown in more detail in FIGS. 19 and 20, and the interconnection of these circuits with the other circuits is shown. These schematic sections correspond roughly to element 9 of FIG. 1.

The D/A and Output Video sections of the schematic are shown in the upper right, labeled 400–599. This circuit is shown in more detail in FIGS. 21–28, and the interconnection of these circuits with the other circuits is shown. These schematic sections correspond roughly to elements 7, 13, 12, 8, 6 10, and 11 of FIG. 1.

FIG. 2 also shows chassis connectors, jumpers and other miscellaneous portions of the preferred embodiment of the invention.

Figure 3A:
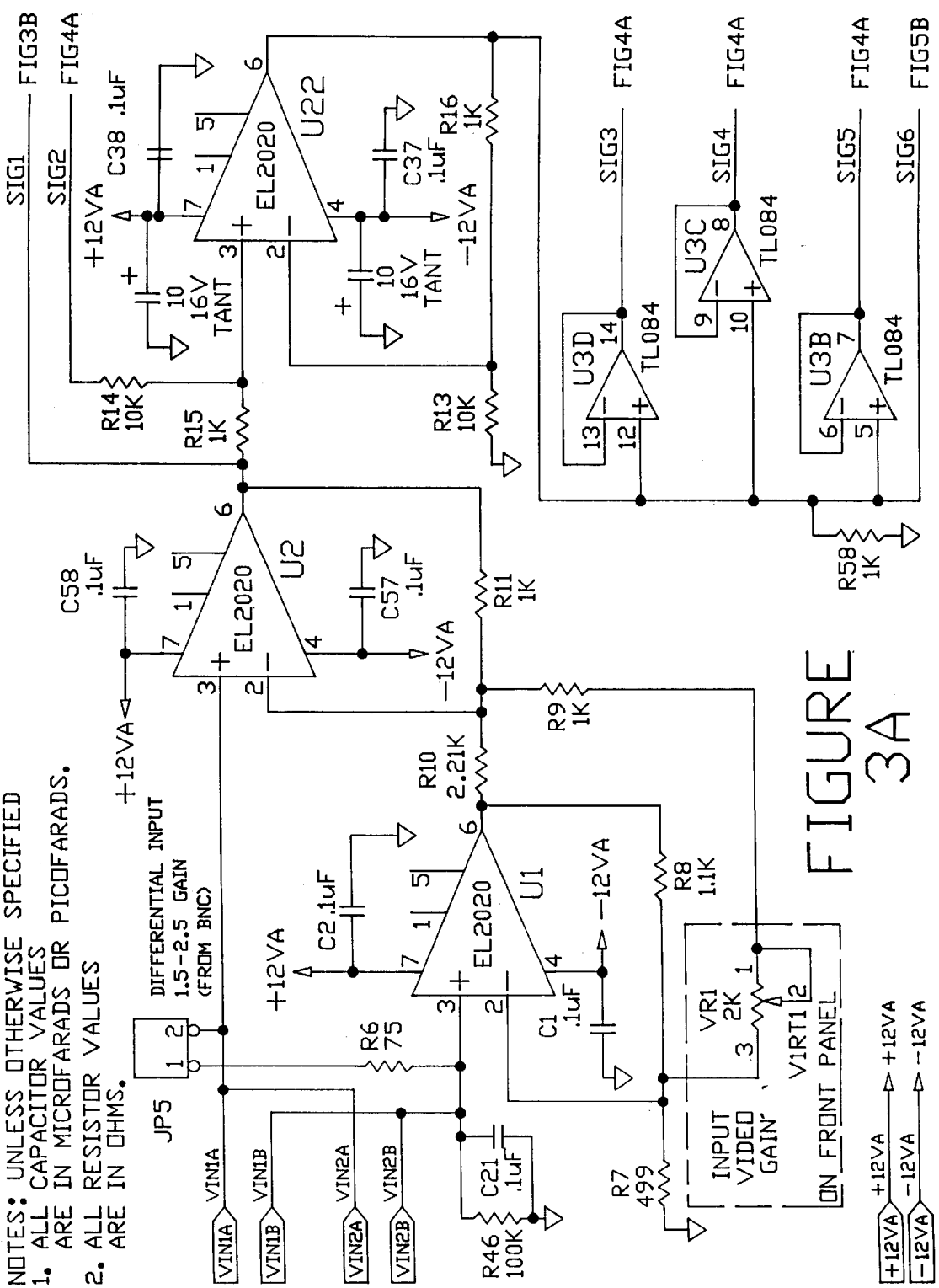
FIG. 3 is a first section schematic diagram of the Input video and A/D sections of the preferred embodiment of the invention.

FIG. 3 is a first section schematic diagram of the Input video and A/D sections of the preferred embodiment of the invention. It shows the differential video input in the upper left of the page, with the input video buffers U2 and U22, Internal buffers U3D, U3C and U3B, and coarse sync stripper comprised of U3A, U5D, U5A and U12A which provides TTL level sync out at pin 12 of U12A.

The Coarse Sync Stripper operates as a modified sync tip clamp circuit. The video is coupled through C3 and buffered by U5D. When the sync tip is pulled negative by R12, U5A operates as a comparator causing the output on pin 12 to go positive thus injecting current into C3 via the two diodes D3. Two diodes are shown to achieve a 1.2 volt drop thus U5's output during sync tip is +1.2 volt. During video, U5's output is −1.2 volt, owing to the action of the two diodes D4. This action provides a limited sync signal which is coupled to comparator U12A and converted to TTL. Buffered video from U5D is coupled to the reference input of U12A. This novel and unconventional circuit thus provides a coarse sync stripper having fast speed and considerable noise immunity owing to the fact that when there is little noise on video switching of the comparator is effected during the near simultaneous transitions of the sync edges on the two inputs of U12A, and during noise, the slew rate of U5A prevents noise from entering into the + input of the comparator, thus providing a large amount of hysteresis with respect to the noise.

Figure 4A:
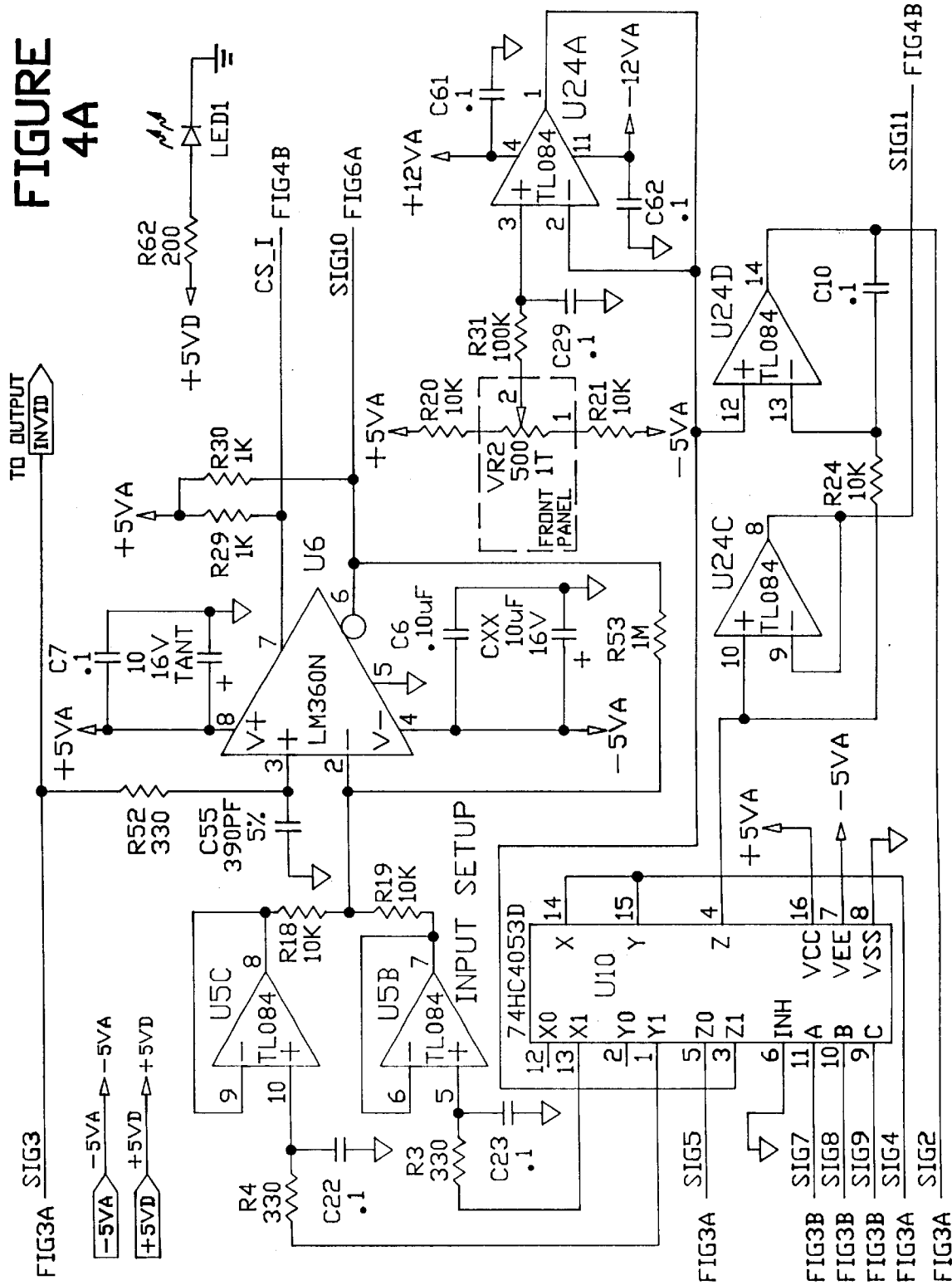
FIG. 4 is a second section schematic diagram of the Input video and A/D sections of the preferred embodiment of the invention.
Figure 4B:
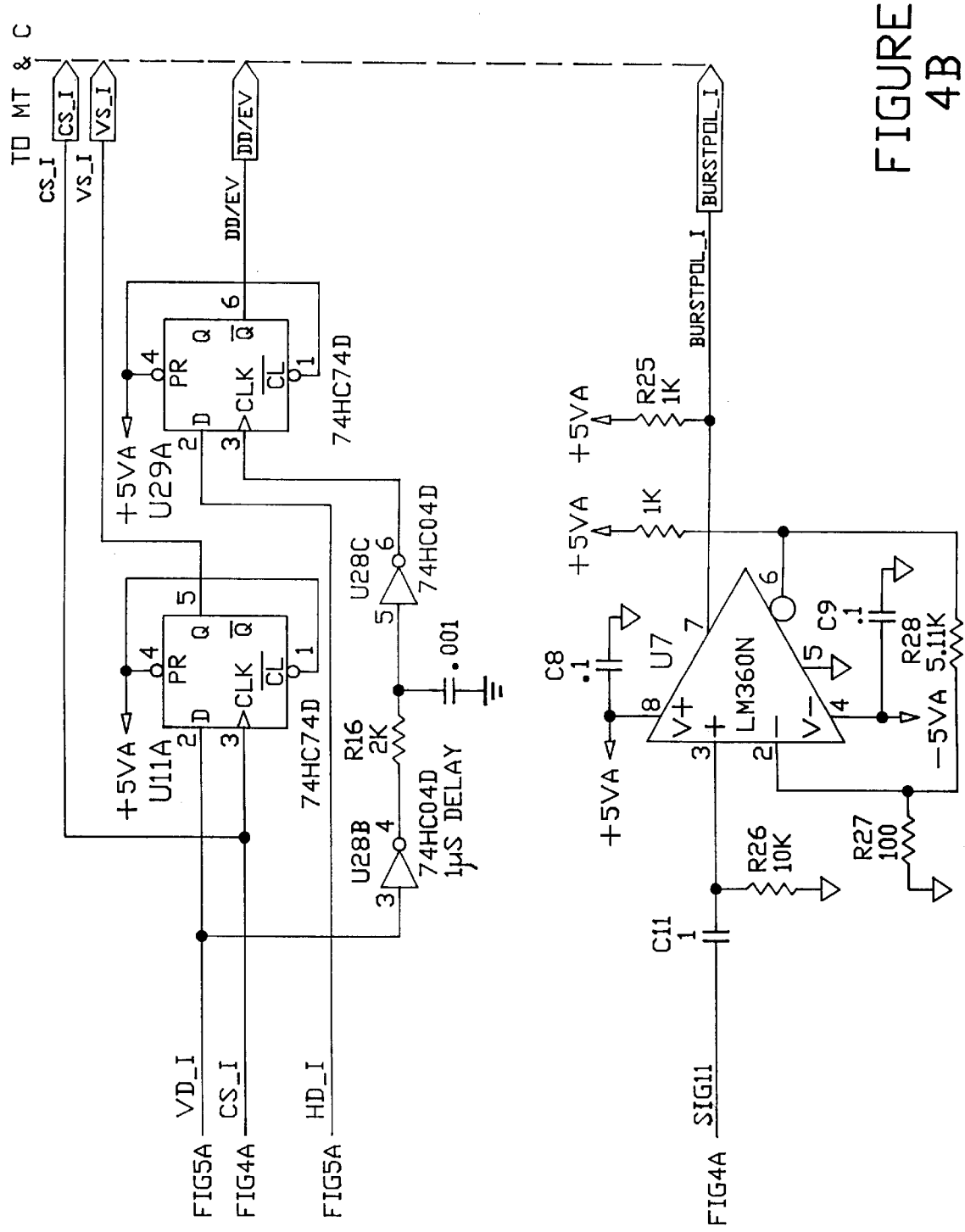

FIG. 4 is a second section schematic diagram of the Input video and A/D sections of the preferred embodiment of the invention. TTL sync from U12A is applied to pins 9 and 11 of U8. The sync edges are differentiated by C34/R1 and C35/R23 to form sampling pulses which are coupled to two sections of analog switch U10. Analog switch U10 samples video on pins 14 and 15 at sync tip and blanking and couples these sample values via pins 13 and 1 to hold capacitors C22 and C23, which are buffered by U5B and U5C. The resistor divider R18 and R19 thus provides a DC voltage to pin 2 of U6 which corresponds to ½ of sync amplitude. Video is coupled from U3D thru low pass filter R52 and C55 to comparator U6 which compares the video to the reference set at half sync tip, thus providing a precision TTL sync signal at outputs 6 and 7.

In addition, one shot U9A provides a sample pulse which is coupled to the third section of analog switch U10. The sample pulse causes the switch to sample video during back porch which sample is present at pin 4. The back porch sample is integrated by U24D, which integrator has a reference voltage established by VR2 and U24A coupled to pin 12. The voltage out of integrator U24D is coupled back to the video via R14 (FIG. 3) thus serving to regulate the clamping of video at the DC voltage set by VR2. This circuit thus operates as a DC clamp to clamp the video to the reference level set by VR2. When Sync and blanking are inserted in video at the output, VR2 becomes a video offset adjustment.

Composite video from precision stripper U6 is coupled to D flip flop U11A where it latches vertical drive to provide a timed vertical drive signal VS_I for the memory control. In addition, vertical drive is delayed by 1 $\mu s$ in U28B&C, and used to clock H drive in U29A to provide the field flag OD/EV also for use by the memory control.

Figure 5A:
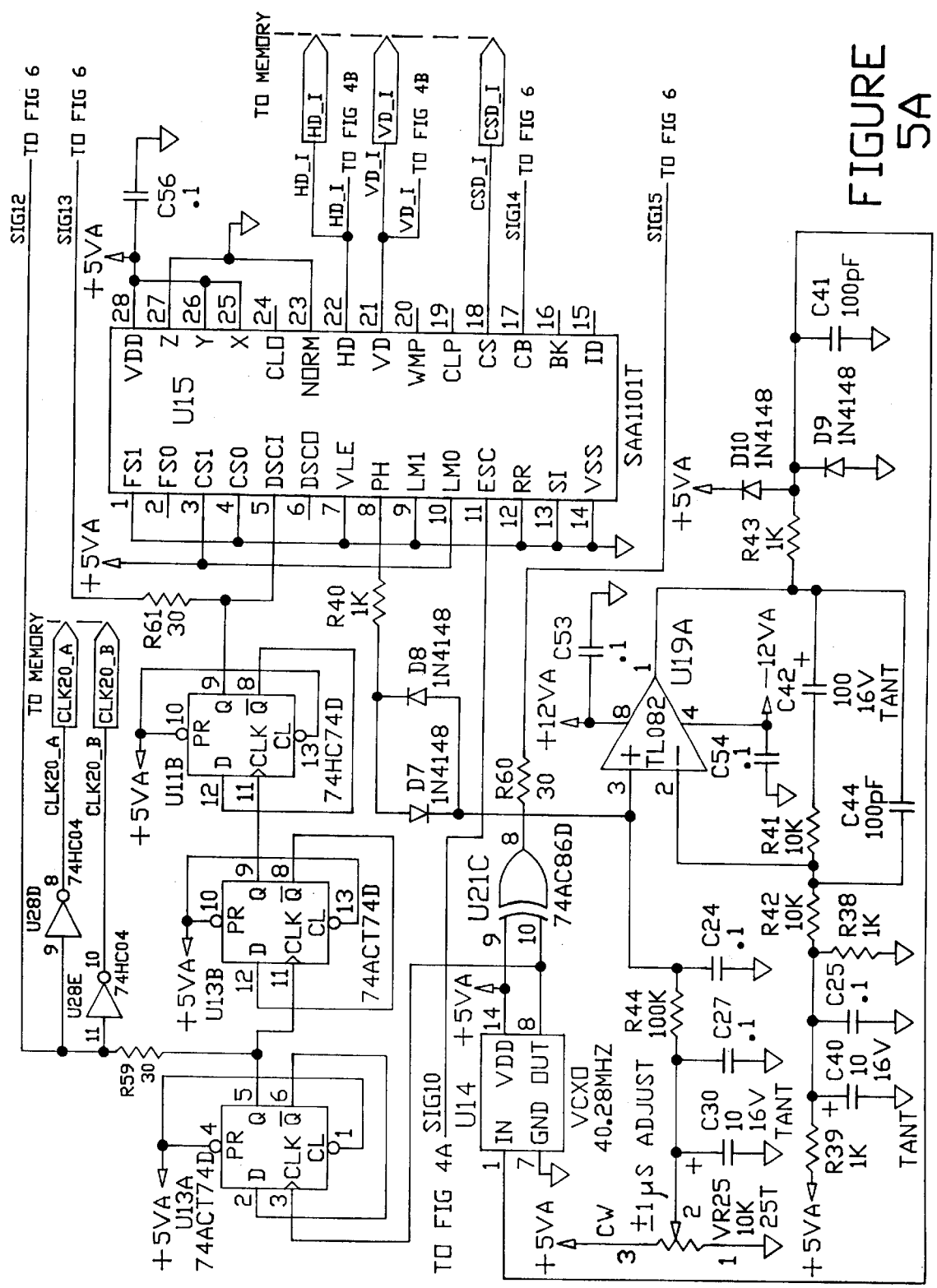
FIG. 5 is a third section schematic diagram of the Input video and A/D sections of the preferred embodiment of the invention.
Figure 5B:
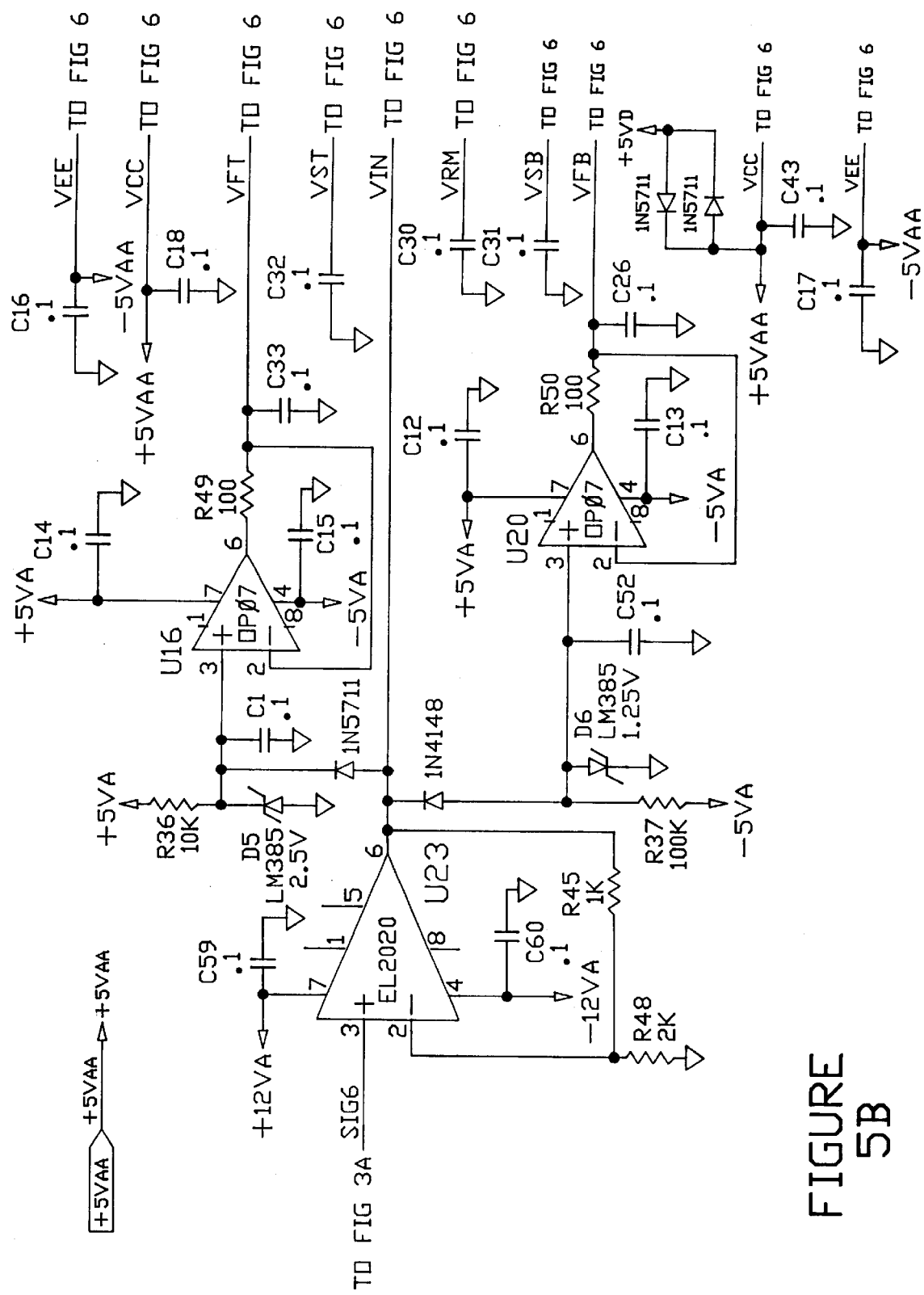

FIG. 5 is a third section schematic diagram of the Input video and A/D sections of the preferred embodiment of the invention. Master input clock is provided by VCXO U14 at ≈40 MHz, which clock is phase locked to video H sync at 2560 times H. The clock is divided to 5 MHz by U13 and U11B (320H) and coupled to sync generator IC U15 on pin 5. Input comp sync from the precision comparator is coupled to U15 on pin 11. U15 provides a phase comparison between input comp sync and its own comp sync and provides an error voltage out from pin 8. The error voltage is integrated in U19A and the integrated error voltage is coupled to frequency control pin 1 of VCXO U14. The generated sync signals output from U15 are thus caused to be phase locked to input video at the aforementioned 2560 times H. An error current is injected into the error integrator via VR25 providing horizontal phase adjustment of the PLL.

Figure 6:
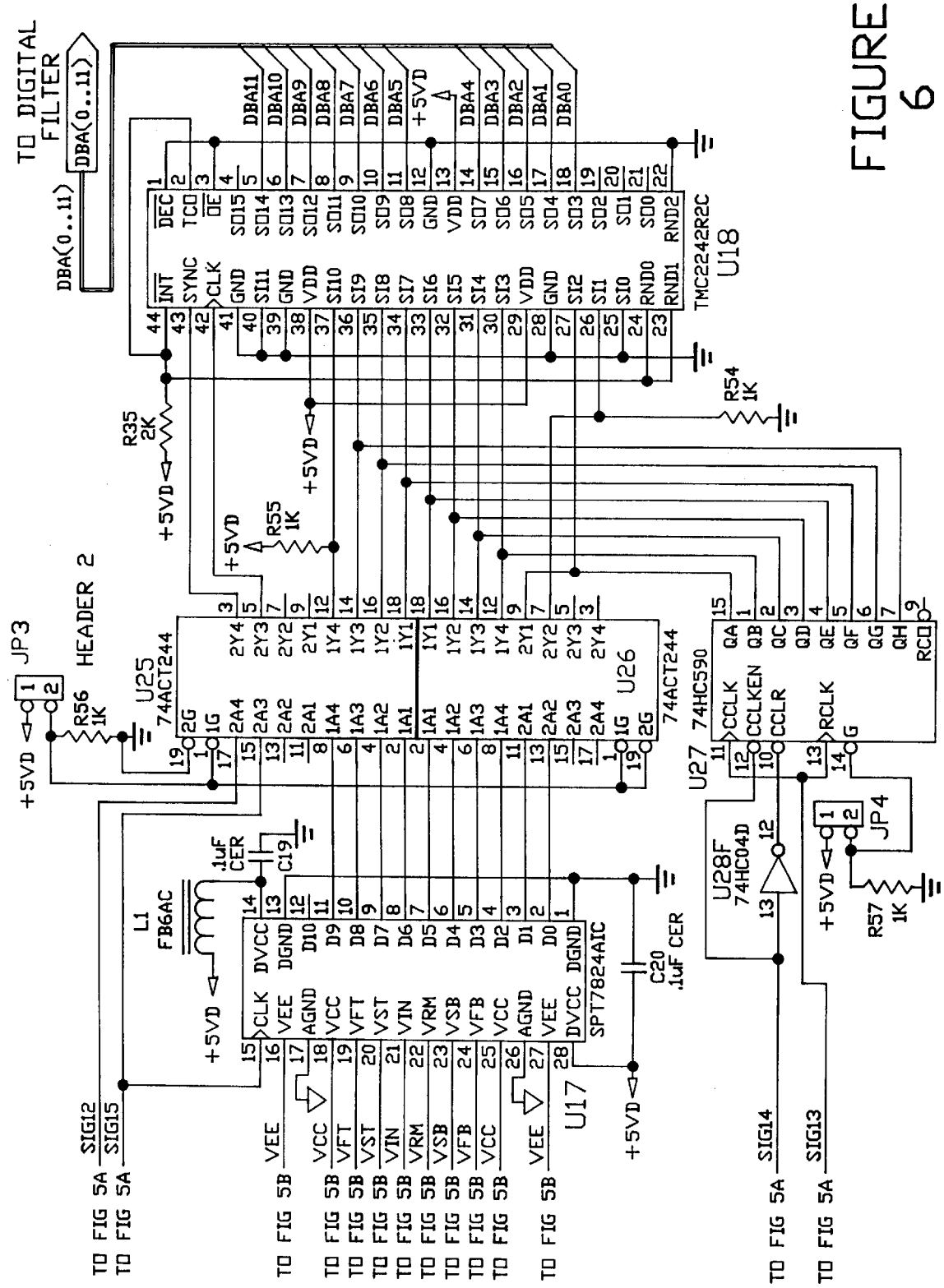
FIG. 6 is a fourth section schematic diagram of the Input video and A/D sections of the preferred embodiment of the invention.

DC reference voltages are provided by D5 and D6, are buffered by U16 and U20 and coupled to the A/D convertor U17 (FIG. 6).

FIG. 6 is a fourth section schematic diagram of the Input video and A/D sections of the preferred embodiment of the invention. A/D convertor U17 receives DC restored input video at pin 21 and 40 MHz clock at pin 15, digitizes the video and provides digitized video of 10 bits resolution and 40 MHz data rate at the outputs pins 2–11. The output of the A/D is buffered by tri state buffers U25 and U26. In addition, an 8 bit counter U27 is coupled into the digital video data path at the output of the buffers. The counter may be enabled and the buffers disabled by installing Jumpers JP3&4, thus providing a test ramp for testing subsequent circuitry.

The 40 MHz 10 bit sampled digital video is coupled to the input of U18, which is configured to interpolate by a ratio of 2:1 to provide 12 bit resolution digital video at a 20 MHz rate. The 12 bit digital video is coupled to the digital filter header shown on FIG. 19.

Figure 7:
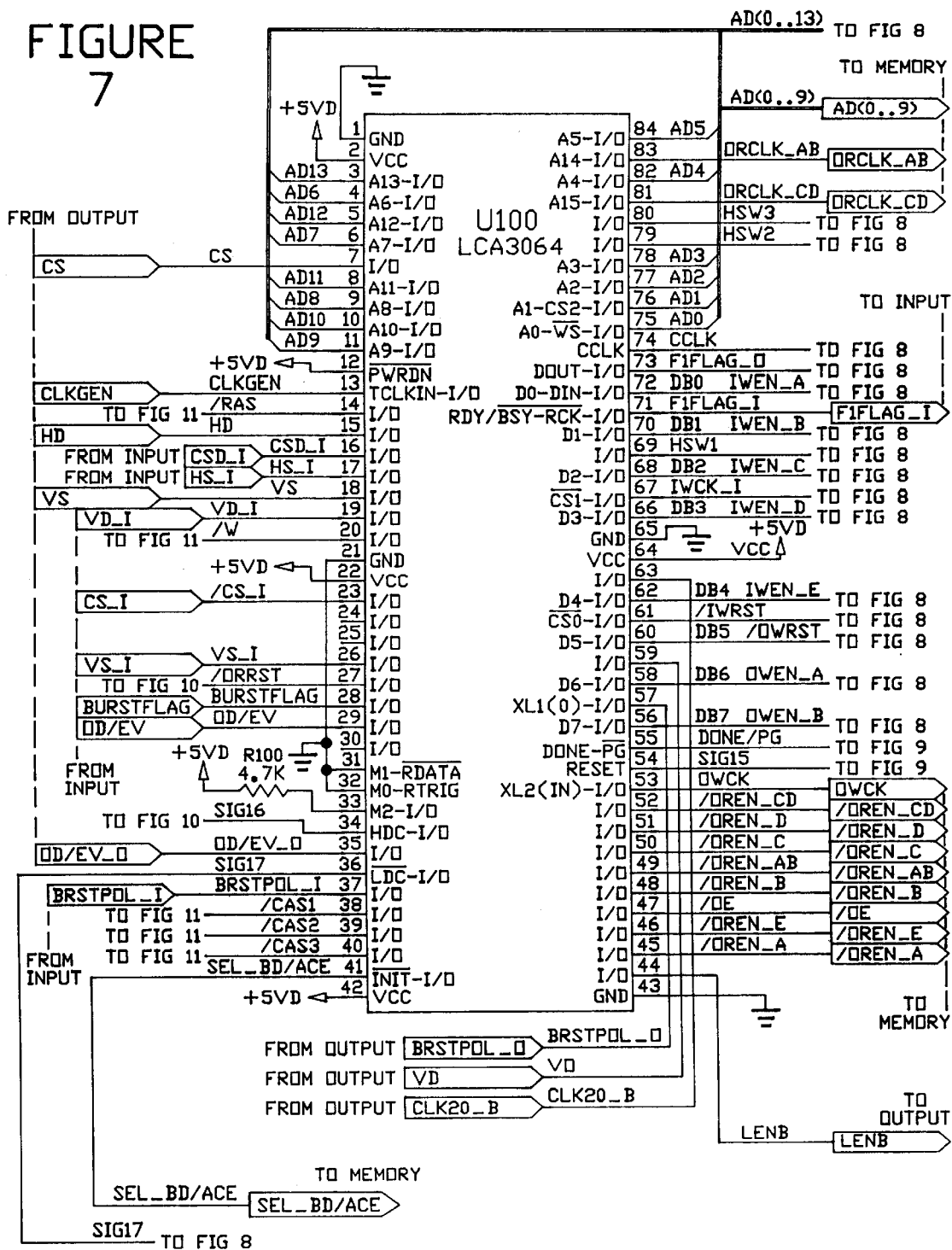
FIG. 7 is a first section schematic diagram of the Memory Timing and Control sections of the preferred embodiment of the invention.
Figure 8:
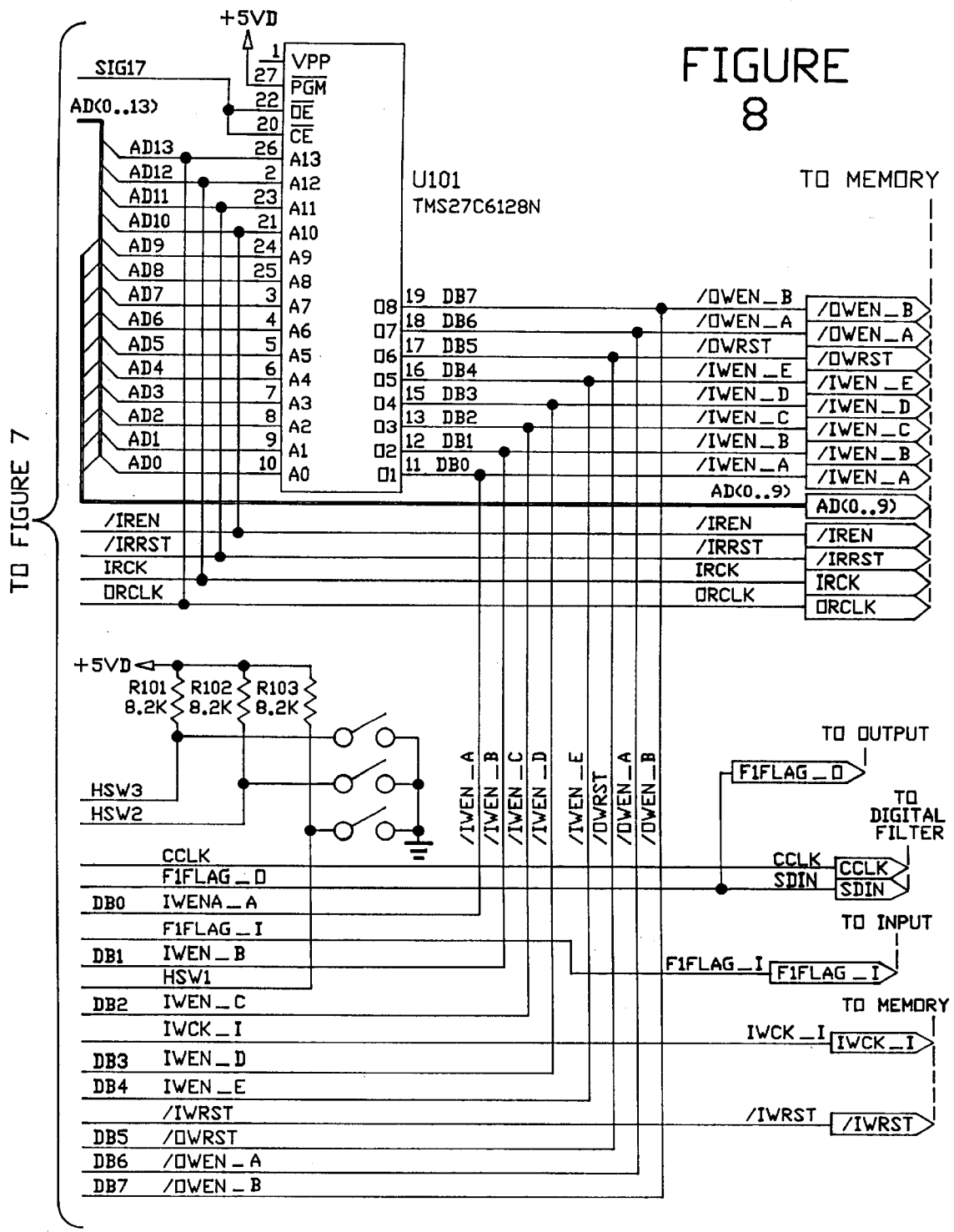
FIG. 8 is a second section schematic diagram of the Memory Timing and Control sections of the preferred embodiment of the invention.

FIG. 7 is a first section schematic diagram of the memory Timing and Control sections of the preferred embodiment of the invention. The bulk of these functions is performed inside a programmable gate array U100 manufactured by XILINX. This gate array receives various timing signals such as comp sync, H drive, V drive, burst flag, even/odd field and burst polarity from the input and output video and PLL circuits. The IC generates memory address and timing information for the write port and two read ports of the memory. This timing information includes FIFO controls, as well as RAS, CAS, WRITE and Out Enable for the DRAMs used in the memory circuit. Other miscellaneous timing signals used by the input, output and digital filter are also provided. The configuration of the XILINX gate array is stored in EPROM U101 (FIG. 8).

From the teachings herein, it will be recognized by one skilled in the art that the Memory is configured in a five cell array, 12 bits deep. The 8 MSBs of the 12 bit data are written one byte at a time into five input FIFOs U205–U209. The 4 LSBs of the 12 bit data are time multiplexed by the ICs U200 and U201 into 2 8 bit words and one four bit word, which are coupled to input FIFOs U202, U203 and U204, respectively. Every 5 clock cycles, one byte from each of the FIFOs, for 60 Bits corresponding to five 12 bit samples, are written into memory. During the same time period, up to two 60 bit reads may be performed, one each into the two lower sets of FIFOs. Thus the memory may provide continuous writing of one 12 bit 20 MHz video input (port) and simultaneous continuous reading of two 12 bit 20 MHz video outputs (ports). In the preferred embodiments, the two memory read ports are reading data from the same point on the image, but separated by one picture period in time 4 fields in NTSC and 8 fields in PAL. The two picture period separated output video streams are used by the noise reducer to provide noise reduction as described in U.S. Pat. No. 4,305,091. By changing the timing of the second read port of the memory, a second video stream having any desired timing with relation to the first video stream may be obtained. In this fashion, alternate configurations of noise reduction and image enhancement may be obtained, for example as described in U.S. Pat. No. 4,573,070.

The video signal is sampled at 2560 times H, thus providing 2560 samples of 10 bit accuracy. Interpolation is used to derive 1280 samples of 12 bit accuracy from the 2560 samples. Since the memory is divided into 5 cells, the 1280 samples will be stored into 1280/5 memory address locations which results in an easy to work with 256 memory addresses which require 8 bits of address. By using 4 meg DRAMs which are configured to each handle 4 bits of data, (i.e. 1M×4) 10 address bits each for RAS and CAS are needed. By using 8 of the 20 total address bits for storing 256 groups of 5 samples for each line of video, 12 bits are left for storing lines. The 12 line address bits provide 2096 lines of storage capability, which is more than enough for storing 8 fields of PAL video or 2500 lines (8×312.5). There is some unused memory, however memory is relatively inexpensive when compared to state machines and counters, and trying to use memory more efficiently would actually require the use of more smaller memory ICs with a resulting increase in cost due to additional PC board space and complexity in generating address counters.

The memory thus contains adequate storage for storing a full picture period of PAL or NTSC video, and can also be configured for other scanning rates, such as 768, 1050 or 1250 line HDTV. In NTSC, the memory can in fact store two complete picture periods of video. Having excess memory, for example two picture periods of storage in NTSC, is very useful in allowing one complete picture period to always be present in memory for interrupted reading, while another is being stored. In the event the writing is interrupted or disrupted due to loss of input, noisy input, etc., the complete picture period already in memory may be repeated as needed (frozen) during the pendency of the disruption until proper writing has resumed and a new full complete picture period is stored. This feature is implemented in the NTSC version EPROM program discussed below.

In PAL, it is possible to use the extra memory, even though it is not a full picture period, to provide a buffer between reading and writing to provide the same protection from disrupted inputs. Unfortunately, due to the lack of a full picture period of additional memory, in the event of a disruption the repeated picture period may need to be comprised of segments of two different picture periods, for example a new field 1–3 and an old field 4–8, whereas in NTSC the four fields can always be from the same picture period.

In the preferred embodiment it is preferred that the 8 bits of memory address for storage of lines of samples be combined with 2 bits signifying the frame to give 10 bits of CAS. In this fashion, fast CAS memory addressing may be used throughout the line of video. The input FIFOs are then used to store an entire line of video samples and when that line is complete the next available memory write cycle is used to store the entire line into memory at a RAS address corresponding to the line number of the video. The frame number will be carried on two of the CAS addresses. Read cycles are similar, and reading two lines of video which are integral numbers of fields apart may be performed during a single RAS cycle since the RAS address for both lines will be the same. This feature is very useful for reading the two output ports one picture period apart.

It should be noted that the memory configuration will support one more DRAM IC, U219A (FIG. 16), than is shown in use on the schematic, since only 4 bits of input data are coupled to U204. Instead of using this memory DRAM (U219A), it was chosen in the present embodiment that the other four bits of the corresponding write FIFO be used for convenience for timing and control signals which are passed and stored in the FIFO along with the video. It will be recognized that these timing and control signals, Input H reset, Input H Drive, Input V Drive and Input Comp Sync are not presently stored in a memory IC, but are taken at the output of the FIFO for other use.

Alternately, these four bits of FIFO and memory capability may be used to store other signals related to the video, for example audio, test, time coding or timing, or may be used to store unrelated signals such as text, messages and data which are desired to be passed through the synchronizer. In such case, it is necessary to install the second memory IC U219A, and to interconnect this IC to the FIFOs as is shown, in correspondence to the upper memory IC, as will be apparent to one skilled in the art from viewing the Figures. The timing signals currently passed through FIFO U204 would then be passed through another FIFO having all control signals wired in parallel with U204. The extra four bits of memory capability which is provided with this novel memory configuration of the preferred embodiment synchronizer is quite useful in emerging video and television systems for the passing of one or more related or unrelated secondary signals with the video signal in order to maintain separate parallel but time related transmission paths for the two signals. The second signal path of course is digital in nature, and if the desired secondary signal(s) are in analog form, Analog to Digital conversion and time multiplexing into a 4 bit 4 MHz data stream will be required, as will be known to one skilled in the art.

It will be seen that input video data of 12 bits resolution and 20 MHz clock rate, is time multiplexed by 5 and stored in the memory array via the input FIFOs. Alternatively, it may be described as a memory array having a 60 bit resolution and a 4 MHz input data rate. In addition, the unused 4 bits of input FIFO U204 provide another 4 bit 4 MHz storage channel capability which is paralleled with the video memory and matched in time.

FIG. 8 is a second section schematic diagram of the Memory Timing and Control sections of the preferred embodiment of the invention. This Figure shows the EPROM U101 which stores the program information used to configure the programmable gate array U100 the memory control, and U300 (FIG. 20) the noise reducer gate array. The programming of these two devices is performed automatically upon power up of the devices. One skilled in the art will be capable of configuring these two gate arrays to perform the desired functions from the descriptions given herein.

The above programs are slightly different for use with NTSC and PAL standard signals and other video formats due to the 525 or 625 lines per frame affecting the address counters. When the synchronizer is configured for 625 line operation, it may also be utilized with SECAM signals.

Figure 9:
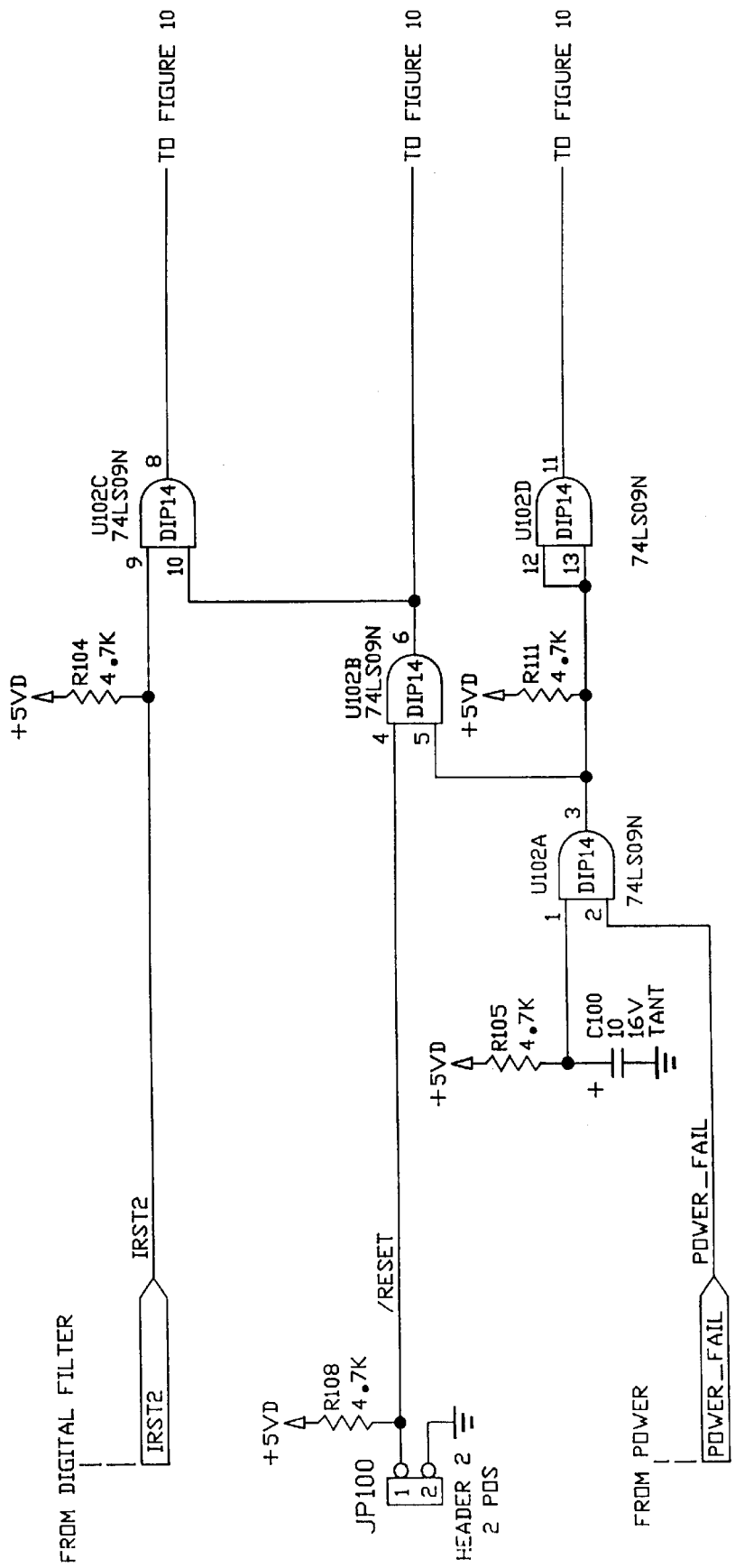
FIG. 9 is a third section schematic diagram of the Memory Timing and Control sections of the preferred embodiment of the invention.

FIG. 9 is a third section schematic diagram of the Memory Timing and Control sections of the preferred embodiment of the invention. This Figure shows the reset and power on logic used to cause the programmable gate arrays U100 and U300 to program automatically upon power on, thus loading one of the above programs into the arrays.

Figure 10:
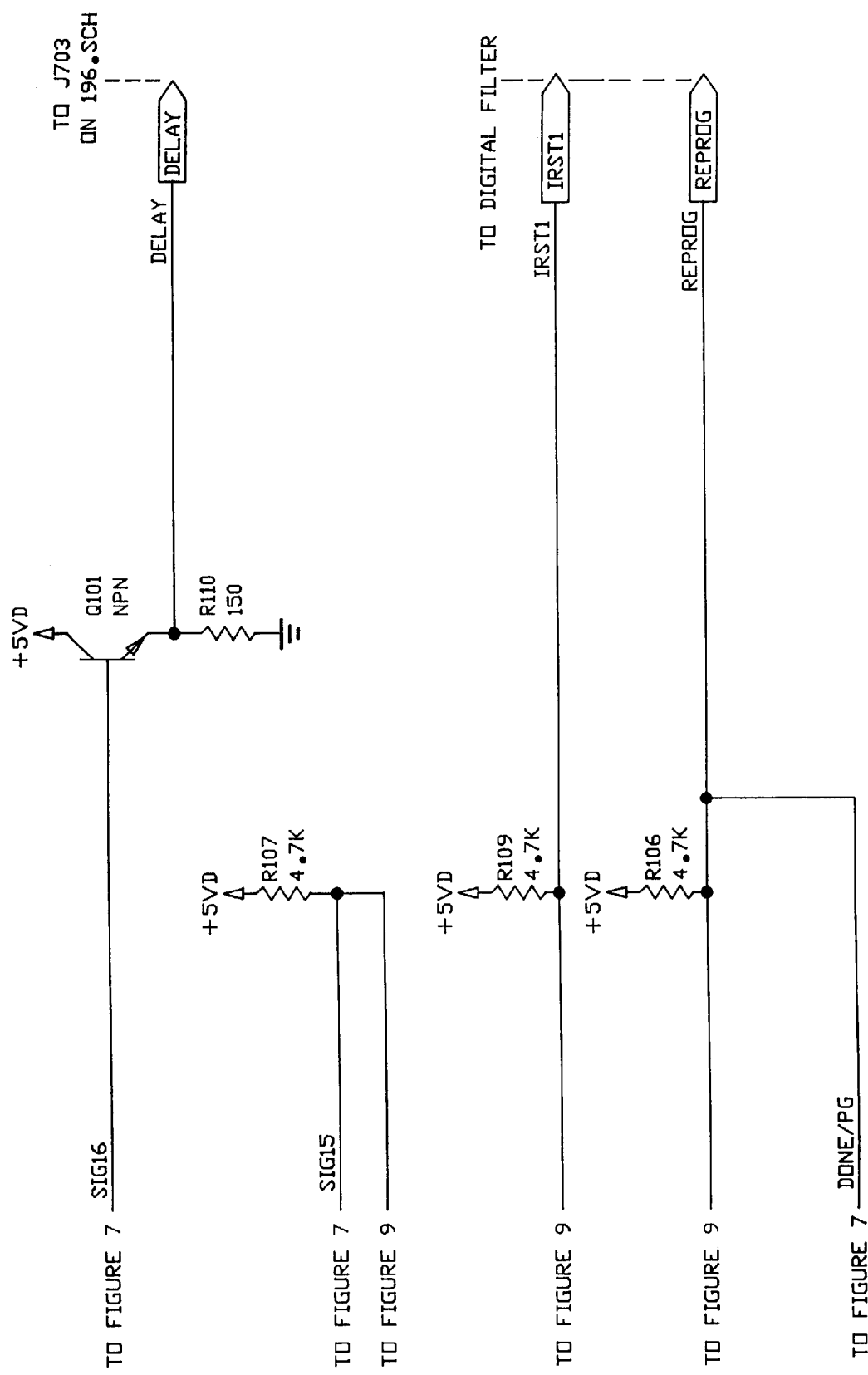
FIG. 10 is a fourth section schematic diagram of the Memory Timing and Control sections of the preferred embodiment of the invention.

FIG. 10 is a fourth section schematic diagram of the Memory Timing and Control sections of the preferred embodiment of the invention, showing further interconnections of the memory timing and control circuitry.

Figure 11:
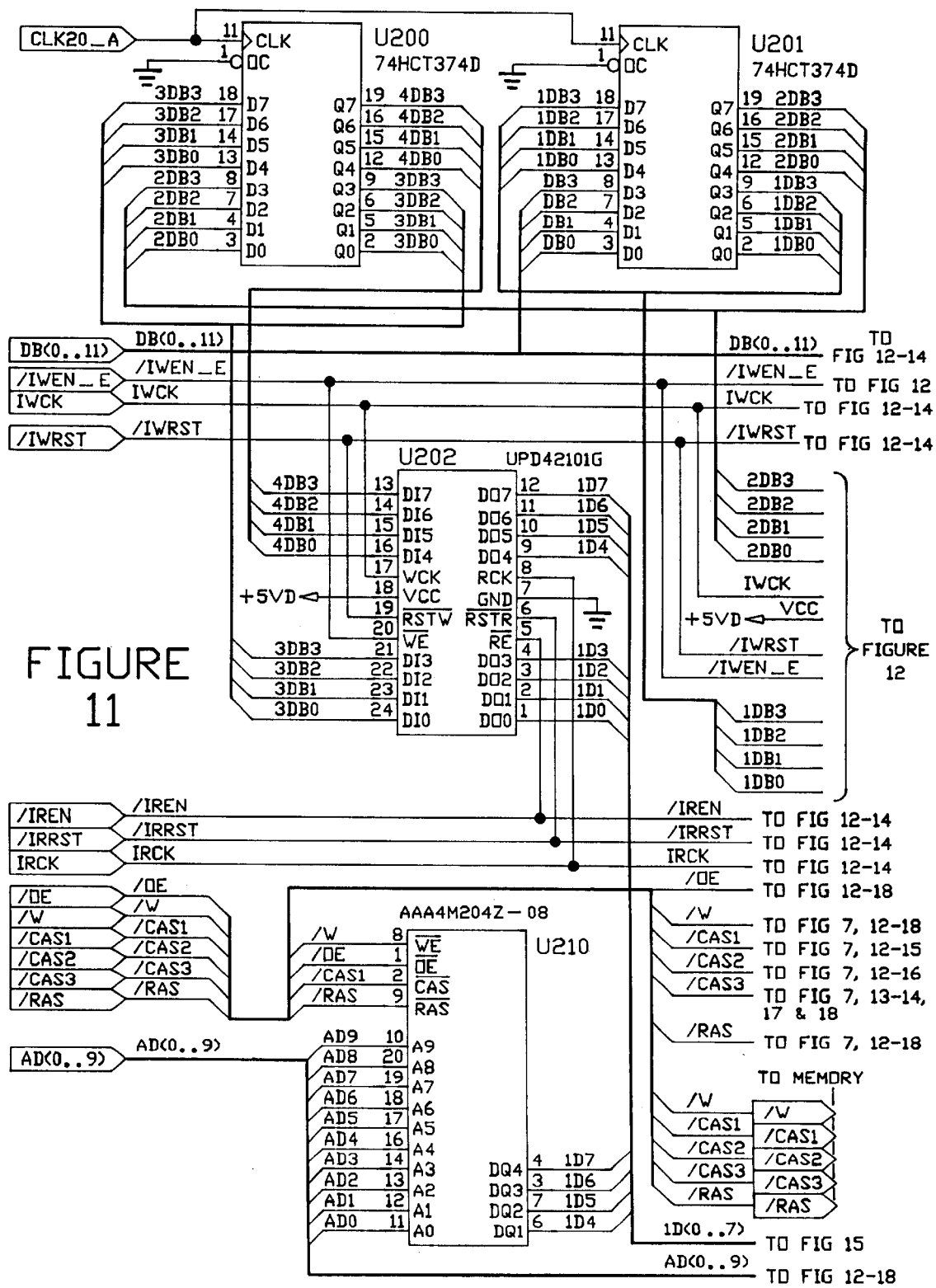
FIG. 11 is a first section schematic diagram of the Memory sections of the preferred embodiment of the invention.
Figure 12:
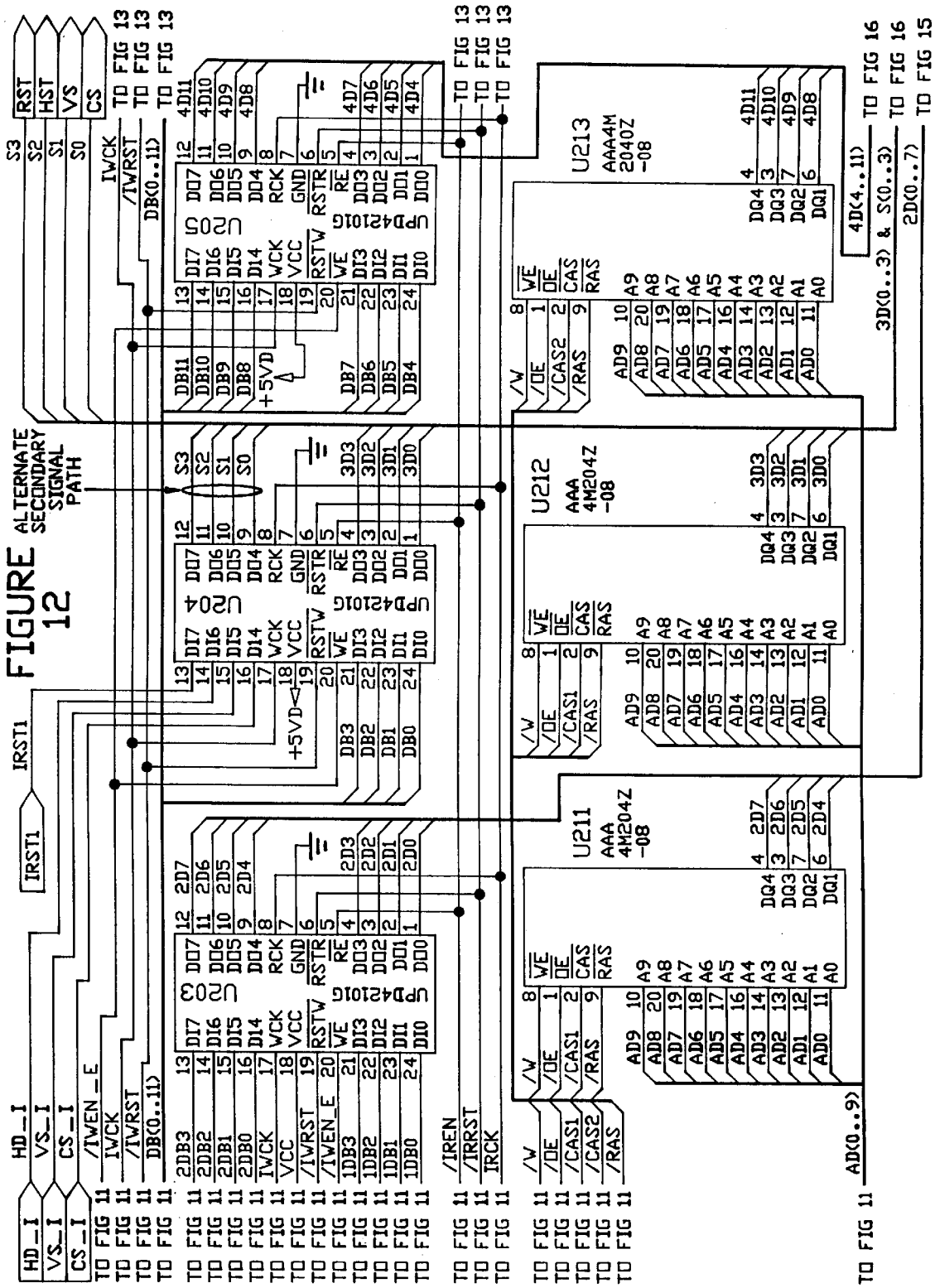
FIG. 12 is a second section schematic diagram of the Memory sections of the preferred embodiment of the invention.
Figure 13:
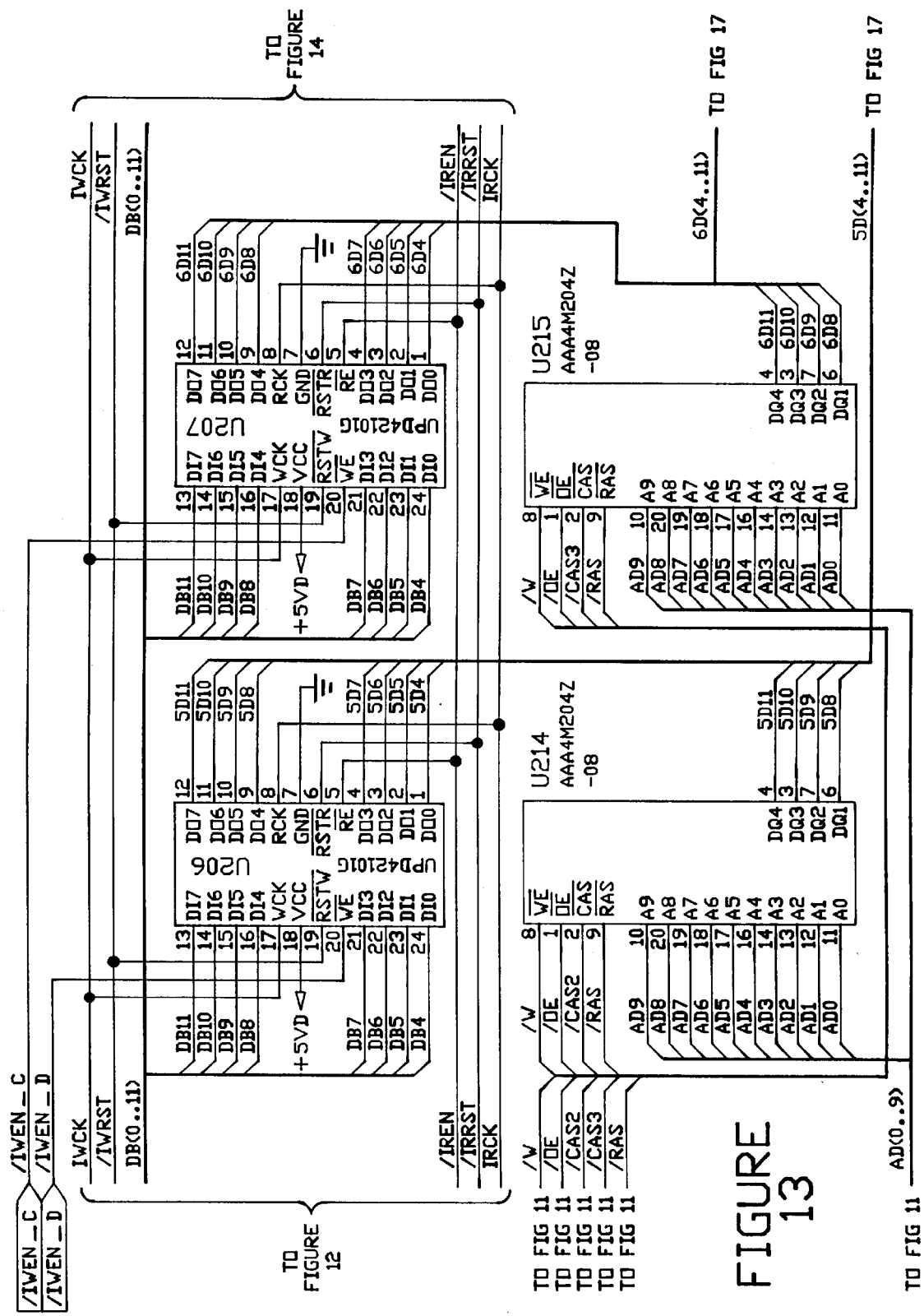
FIG. 13 is a third section schematic diagram of the Memory sections of the preferred embodiment of the invention.
Figure 14:
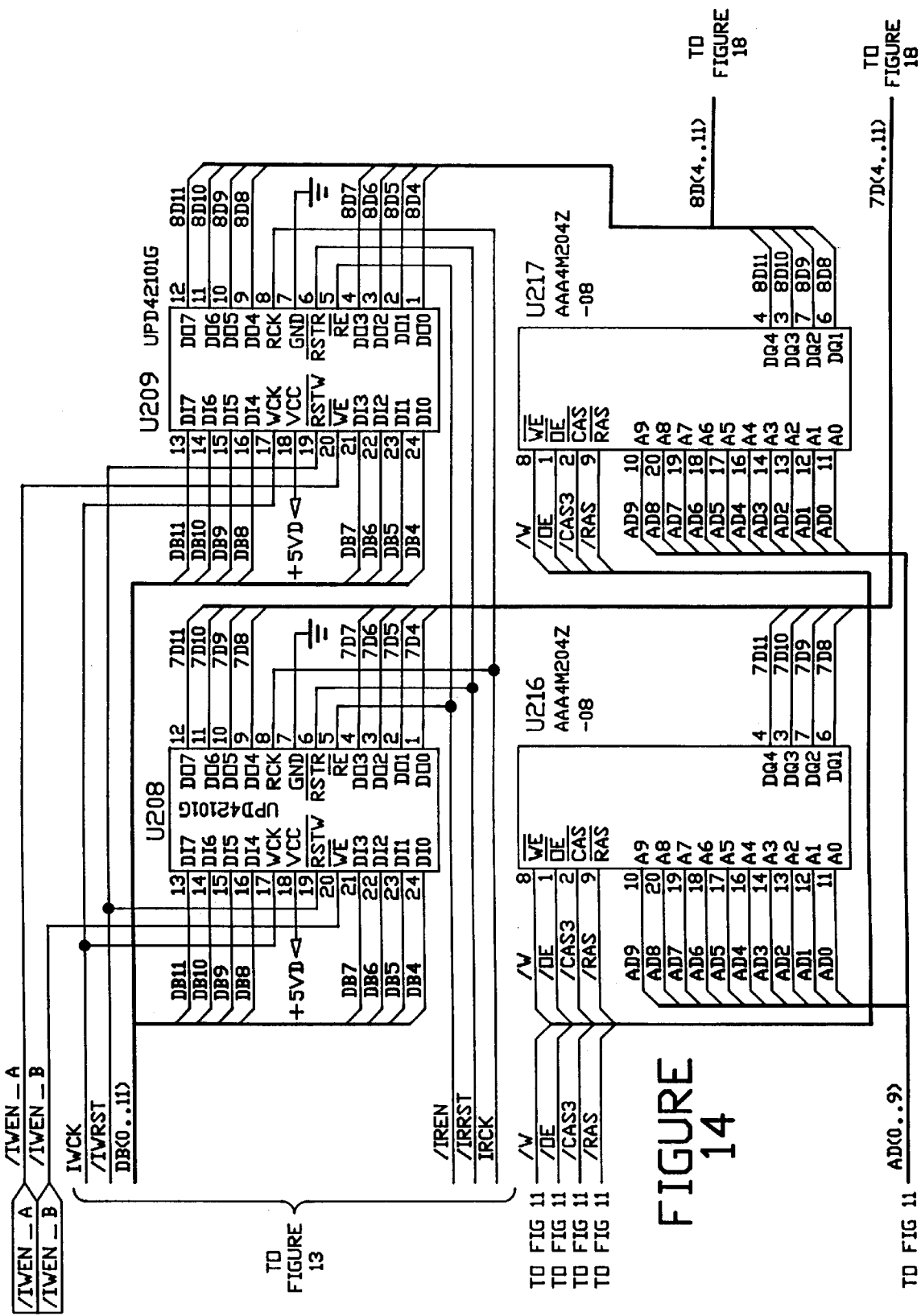
FIG. 14 is a fourth section schematic diagram of the Memory sections of the preferred embodiment of the invention.

FIG. 11 is a first section schematic diagram of the Memory sections of the preferred embodiment of the invention. This Figure shows the lower half (bits 0–3) of the first two memory cells consisting of a DRAM U210 (and U218 of FIG. 15) which is supported by a write port FIFO U202 which in turn is supported by a parallel register U200.

FIGS. 12–15 show the second through fourth sections of the schematic diagram of the Memory sections of the preferred embodiment of the invention. These Figures similarly show on FIG. 12 the lower half (bits 0–3) of the second, third, fourth and fifth memory cells, and also on FIG. 12 half of the upper (bits 8–11) section of the first cell (U213), on FIG. 13 the upper section (bits 8–11) of the second and third cells, and on FIG. 14 the upper section (bits 8–11) of the fourth and fifth cells.

Figure 15:
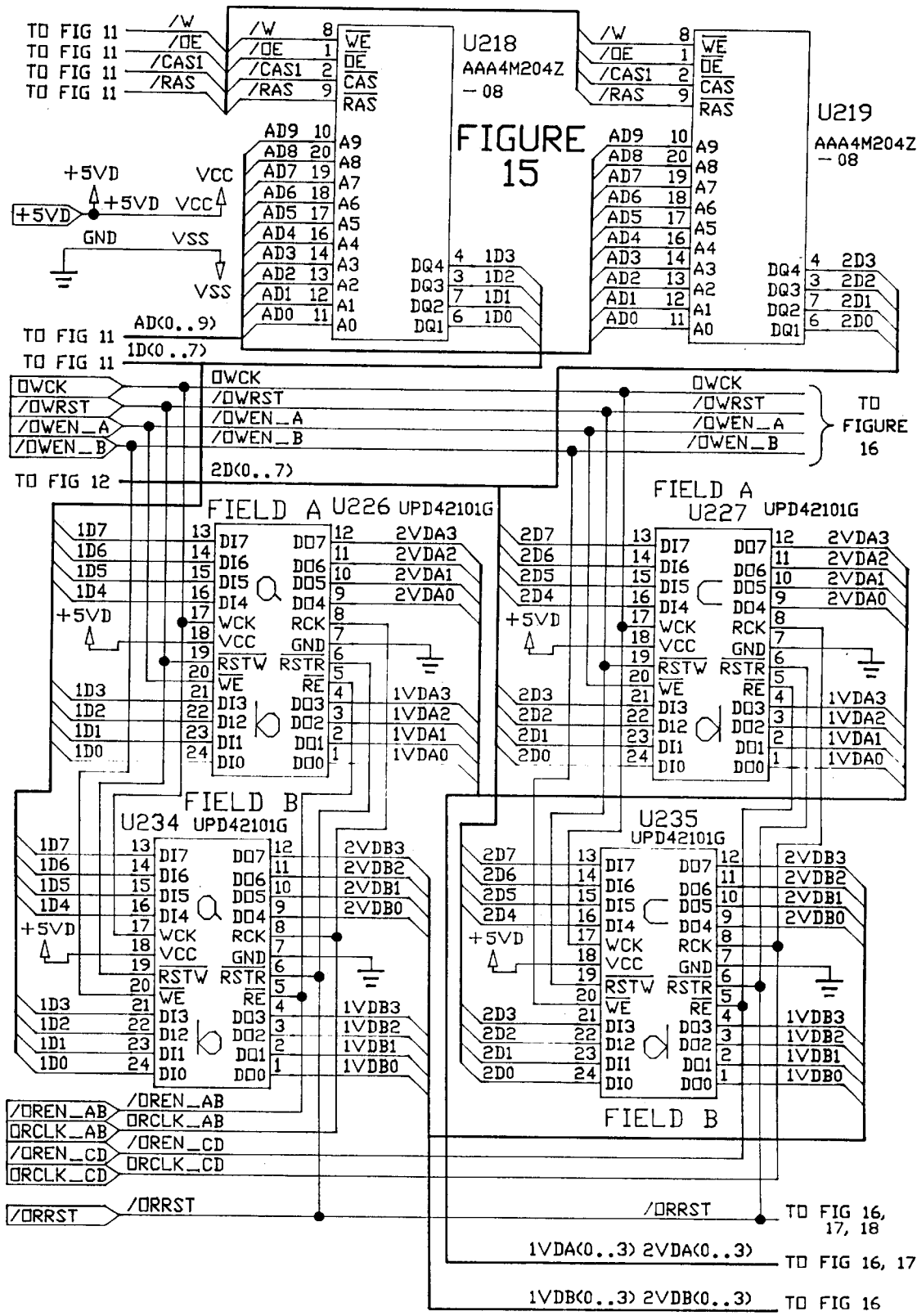
FIG. 15 is a fifth section schematic diagram of the Memory sections of the preferred embodiment of the invention.

FIG. 15 is a fifth section schematic diagram of the Memory sections of the preferred embodiment of the invention. Referring also to FIG. 11, it will be seen that FIG. 15 shows the second DRAM of the lower half (bits 0–3) of the first and second memory cells, U218 and U219, respectively, as well as the two read port FIFOs for each, U226 and U234 for cell 1 and U227 and U235 for cell 2.

Figure 16:
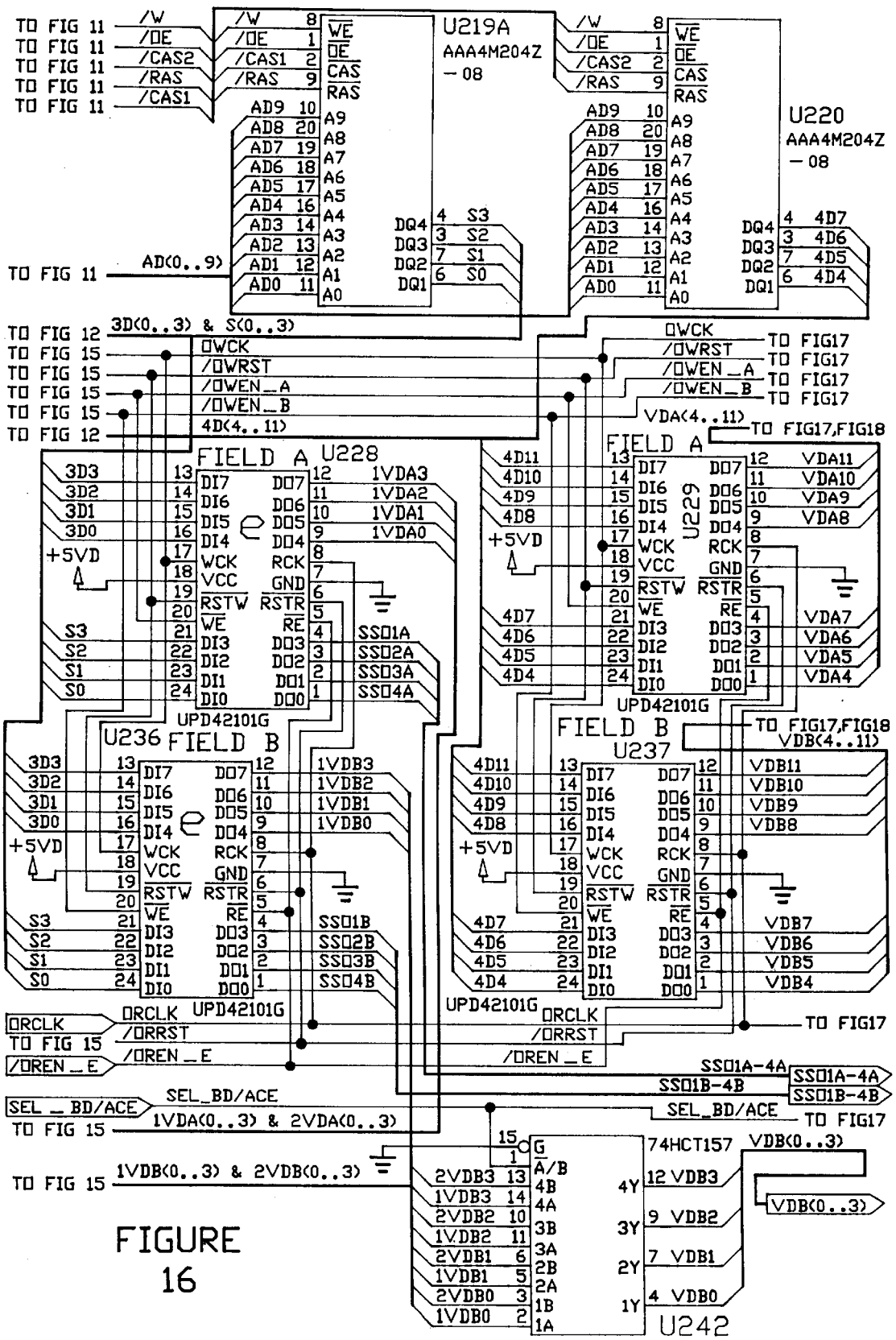
FIG. 16 is a sixth section schematic diagram of the Memory sections of the preferred embodiment of the invention.

FIG. 16 is a sixth section schematic diagram of the Memory sections of the preferred embodiment of the invention. This Figure shows the second DRAM comprising the lower half (bits 4–7) of the upper section of the first memory cell, U220 and the read port FIFOs for lower section cells 4 and 5.

Figure 17:
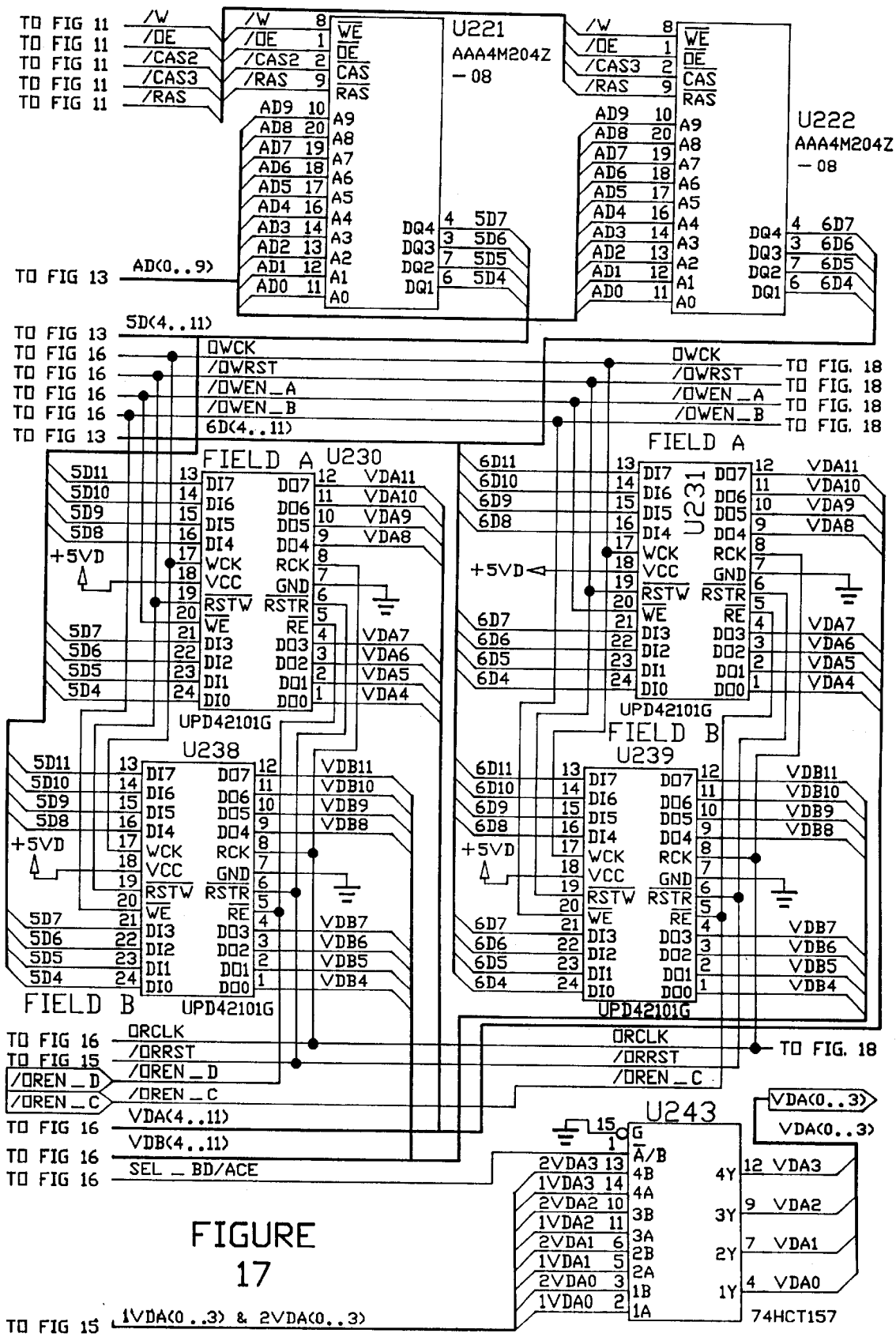
FIG. 17 is a seventh section schematic diagram of the Memory sections of the preferred embodiment of the invention.

FIG. 17 is a seventh section schematic diagram of the Memory sections of the preferred embodiment of the invention. This figure shows the second DRAMs comprising the lower half (bits 4–7) of the upper section of the second and third memory cells, and the read port FIFOs for cells 2 and 3.

Figure 18:
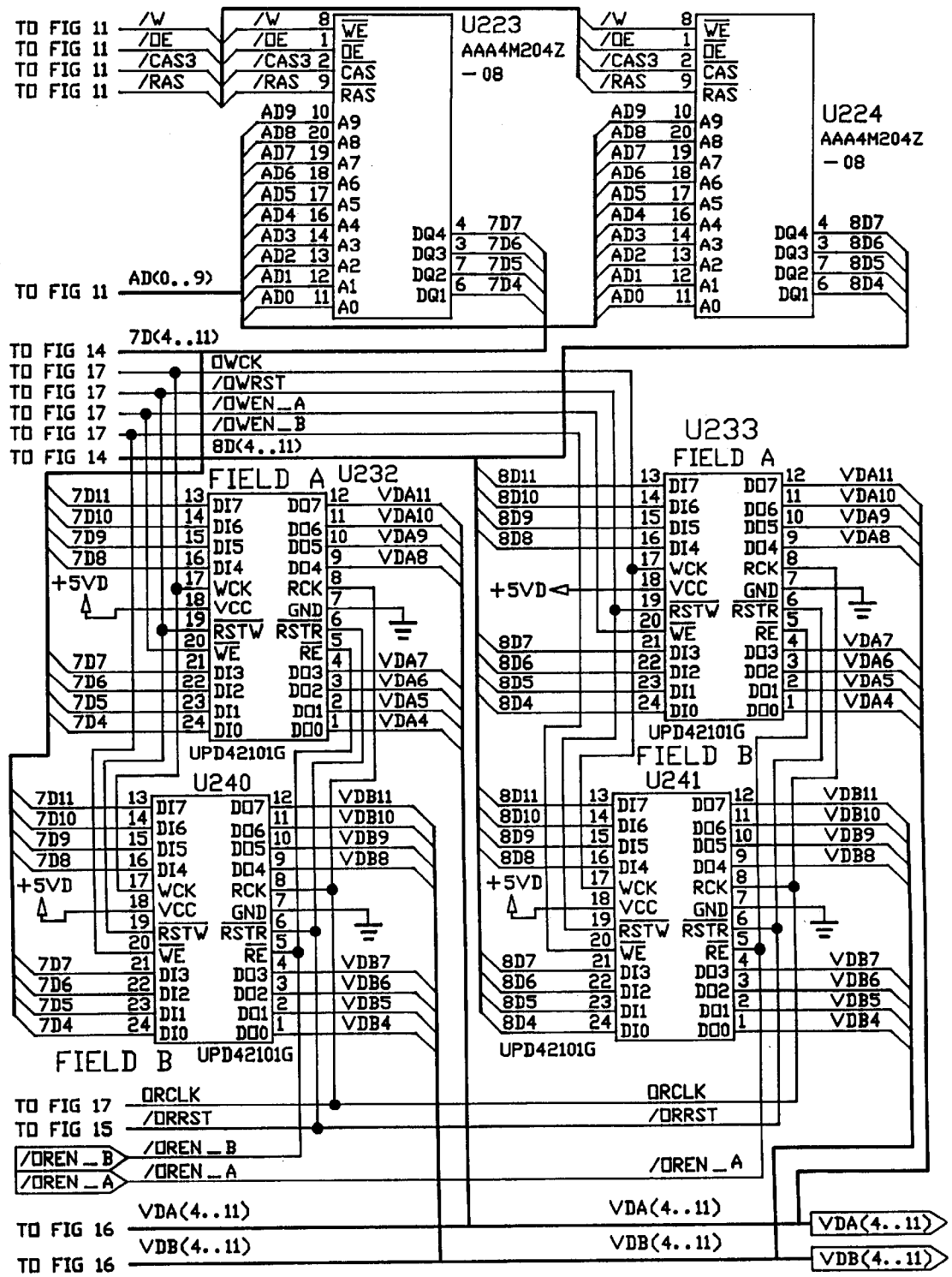
FIG. 18 is an eighth section schematic diagram of the Memory sections of the preferred embodiment of the invention.

FIG. 18 is a eighth section schematic diagram of the Memory sections of the preferred embodiment of the invention. This Figure shows the second DRAM comprising the lower half (bits 4–7) of the upper section of the fourth and fifth memory cells, and the corresponding read port FIFOs.

Figure 19:
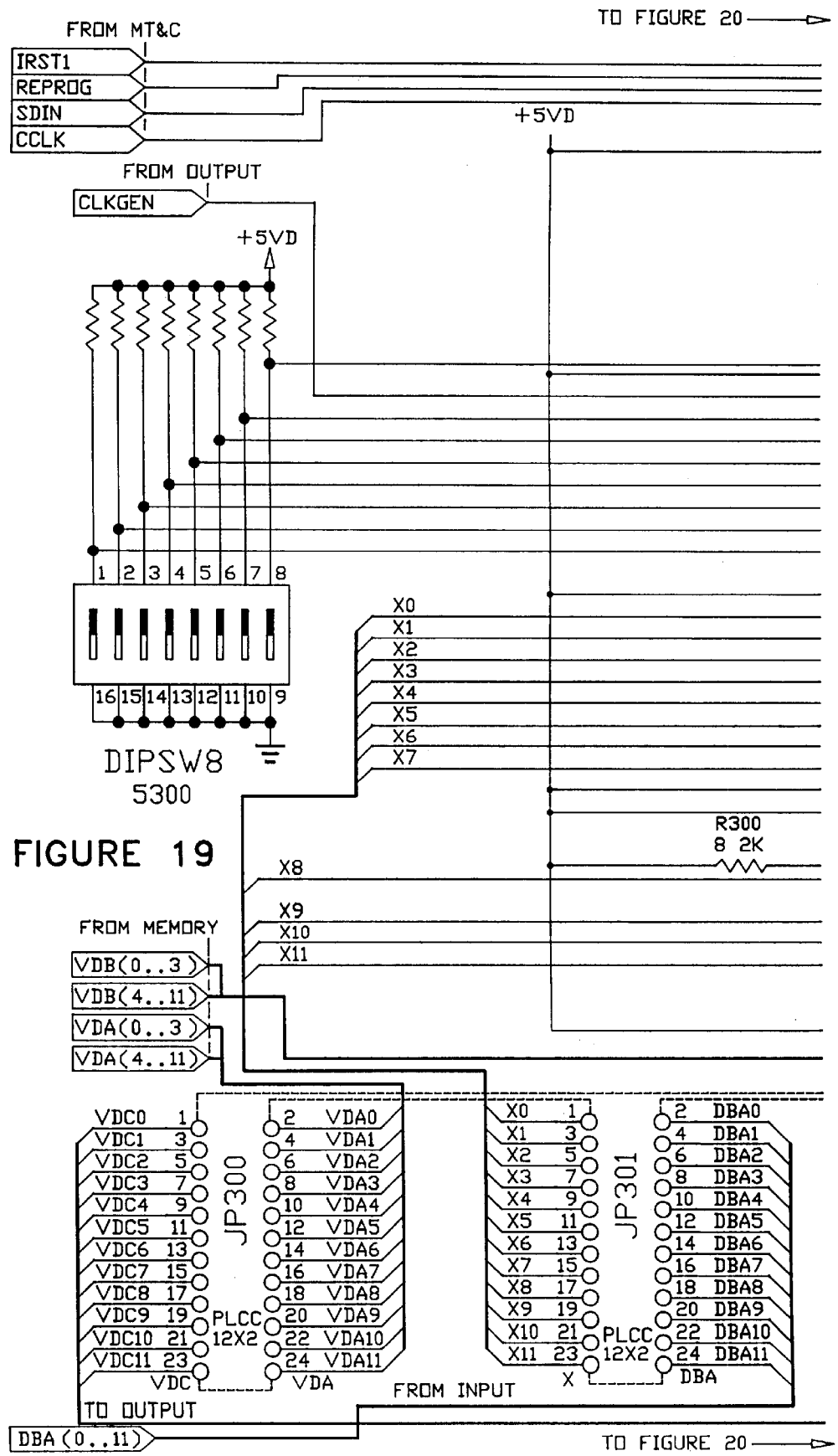
FIG. 19 is a first section schematic diagram of the Digital Filter sections of the preferred embodiment of the invention.

FIG. 19 is a first section schematic diagram of the Digital Filter sections of the preferred embodiment of the invention, showing jumper connections JP300 and JP301 and showing the preferred mechanical arrangement of the jumpers of the filter section connectors shown.

Figure 20:
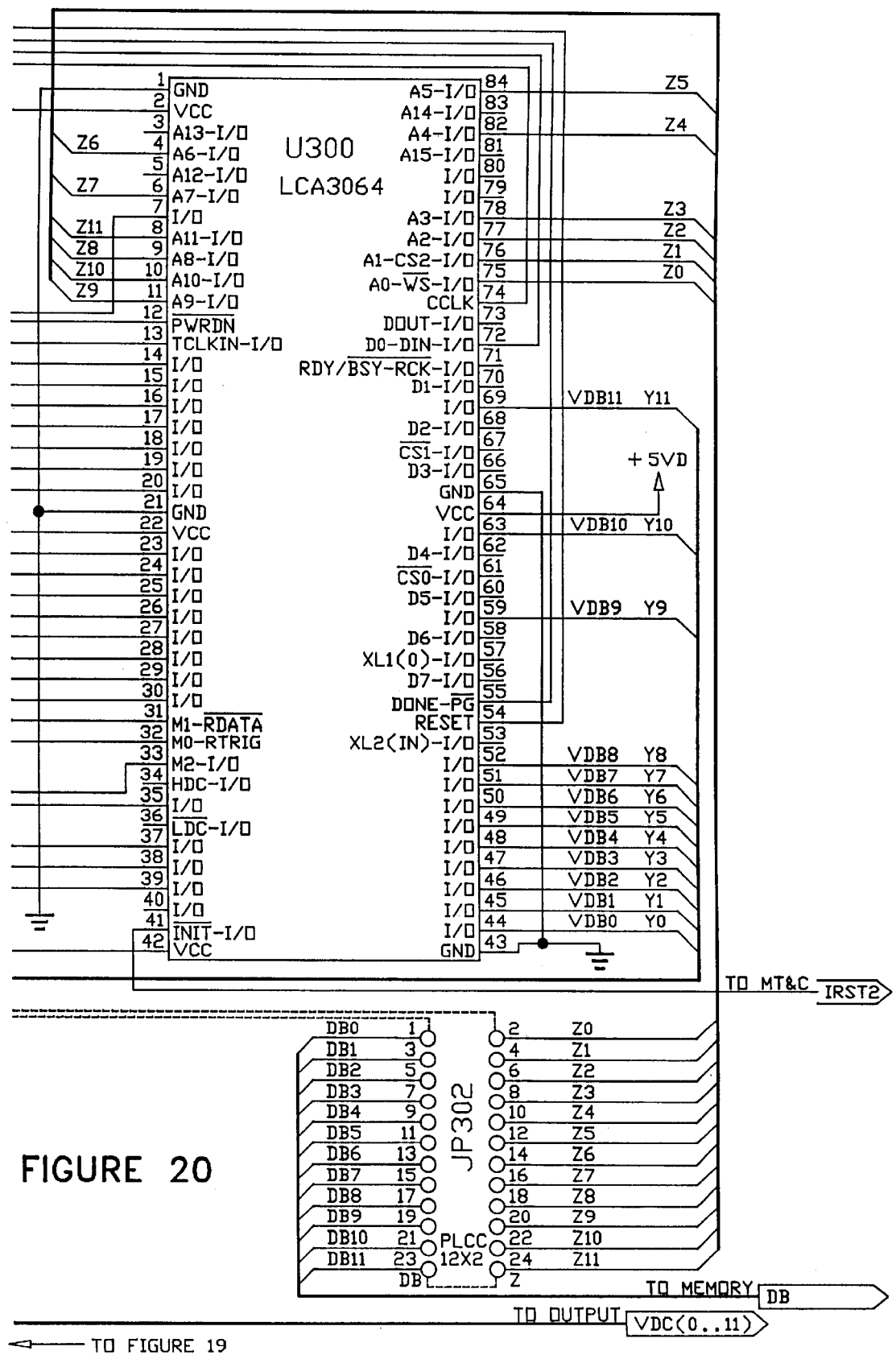
FIG. 20 is a second section schematic diagram of the Digital Filter sections of the preferred embodiment of the invention.

FIG. 20 is a second section schematic diagram of the Digital Filter sections of the preferred embodiment of the invention and with FIG. 19, and JP302 data connections for the various portions of the data flow within the preferred embodiment of the invention. It will be recognized that by jumpering from one data output to another data input that it is possible to configure the filter IC U300 to either a recursive or nonrecursive position with respect to the memory. Noise reduction is performed by IC U300 in a preferred fashion described in U.S. Pat. No. 4,305,091. Those skilled in the art may practice the '091 invention in either recursive or nonrecursive form by appropriate strapping of Jumpers 300–302.

The actual noise reduction comparison and processing is performed inside a programmable gate array U300 manufactured by XILINX. This gate array receives data signals from jumpers and memory, and provides noise reduced video to the jumpers. The noise reduced signal may thus be produced by the input and memory signals, and output to the memory input, or may be produced by the input and memory signals, and output to the synchronizer output, or may be produced by two memory signals, and output to the synchronizer output, all depending on how the jumpers are strapped.

The EPROM program listings given previously both contain the configuration data for configuring U300 to perform the desired noise reduction of the video signal.

Figure 21:
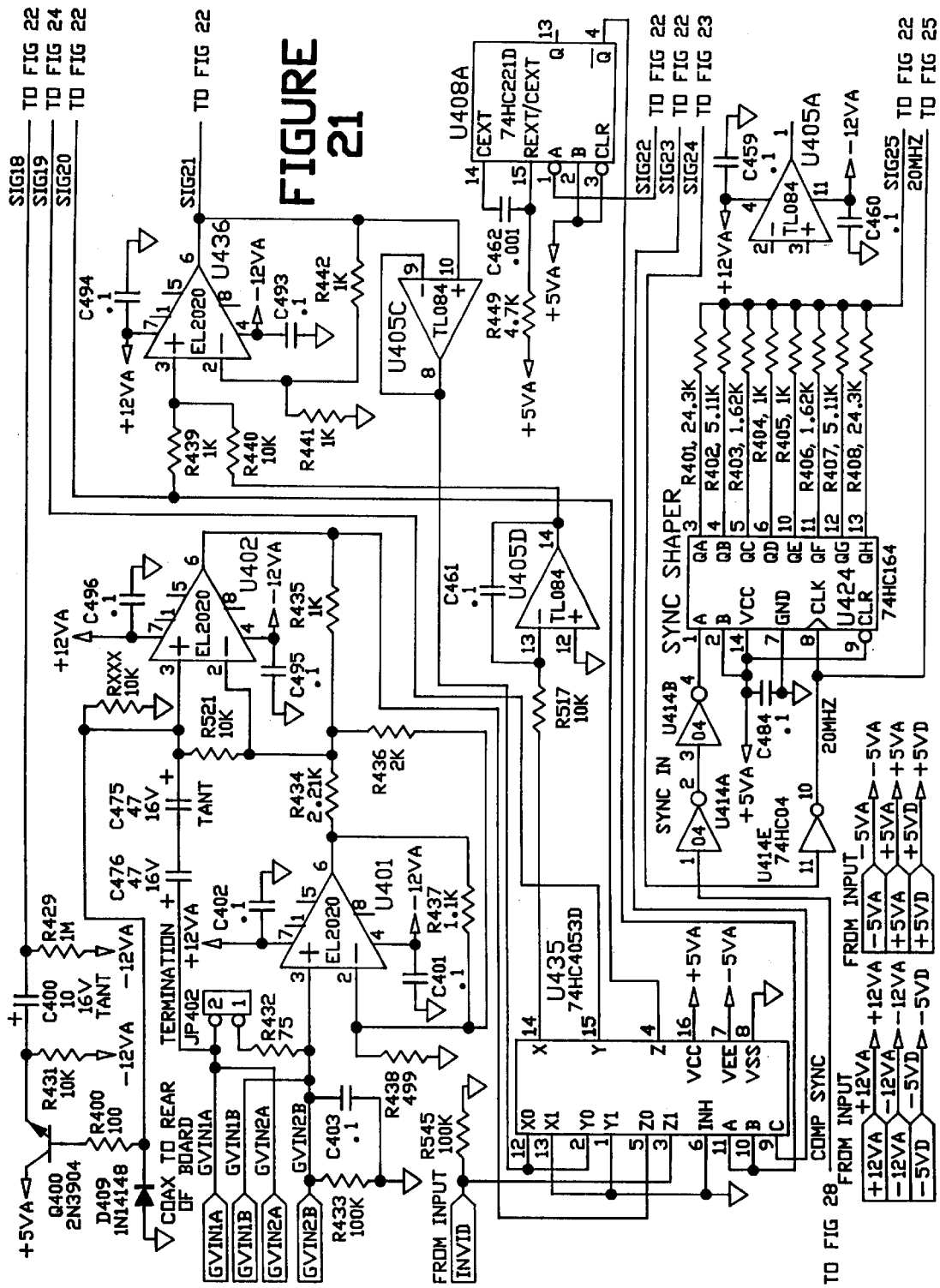
FIG. 21 is a first section schematic diagram of the D/A and Output Video sections of the preferred embodiment of the invention.

FIG. 21 is a first section schematic diagram of the D/A and Output Video sections of the preferred embodiment of the invention. This figure shows the differential reference signal input in the upper left. The reference input amplifier U401, U302 and U436 and clamp U435 and U405D is similar to that of the input video circuit. In addition, the reference section includes a video switch, the Z section of U435 which selects the input signal as the reference in the event the reference signal is missing. Q400 which drives Q401, U413A and via D403 U413B are used to detect the presence of the reference signal and operate the switch. Using the input signal as the reference is a novel and desirable feature of the present invention since this allows the synchronizer to operate as a fixed length video delay usable for timing purposes.

In addition to the reference input processing circuitry, FIG. 21 shows a sync shaper circuit U424 operable to provide $\sin^2$ shaped synchronizing pulses usable to replace the sync pulses in the output video signal.

Figure 22:
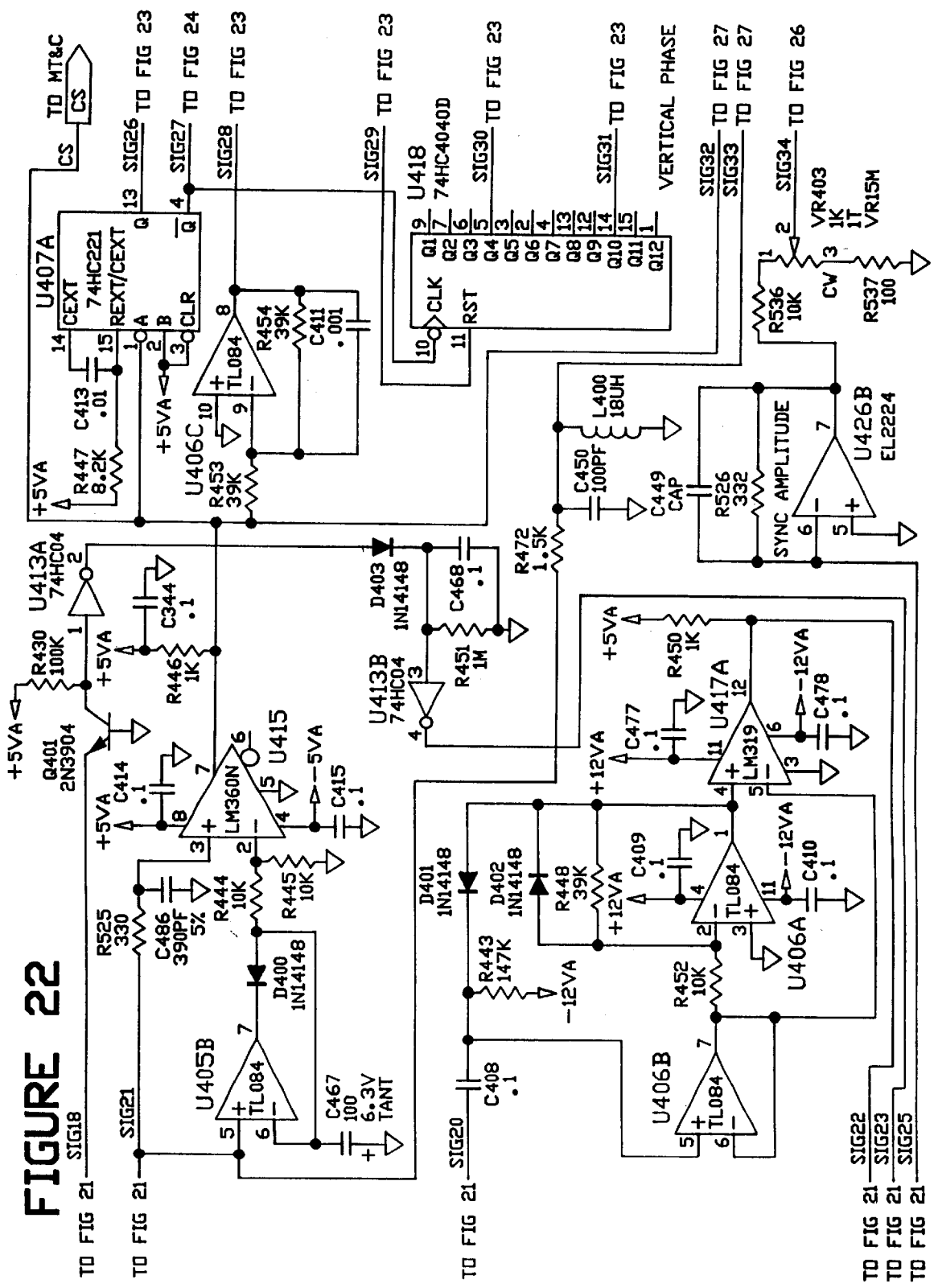
FIG. 22 is a second section schematic diagram of the D/A and Output Video sections of the preferred embodiment of the invention.
Figure 23:
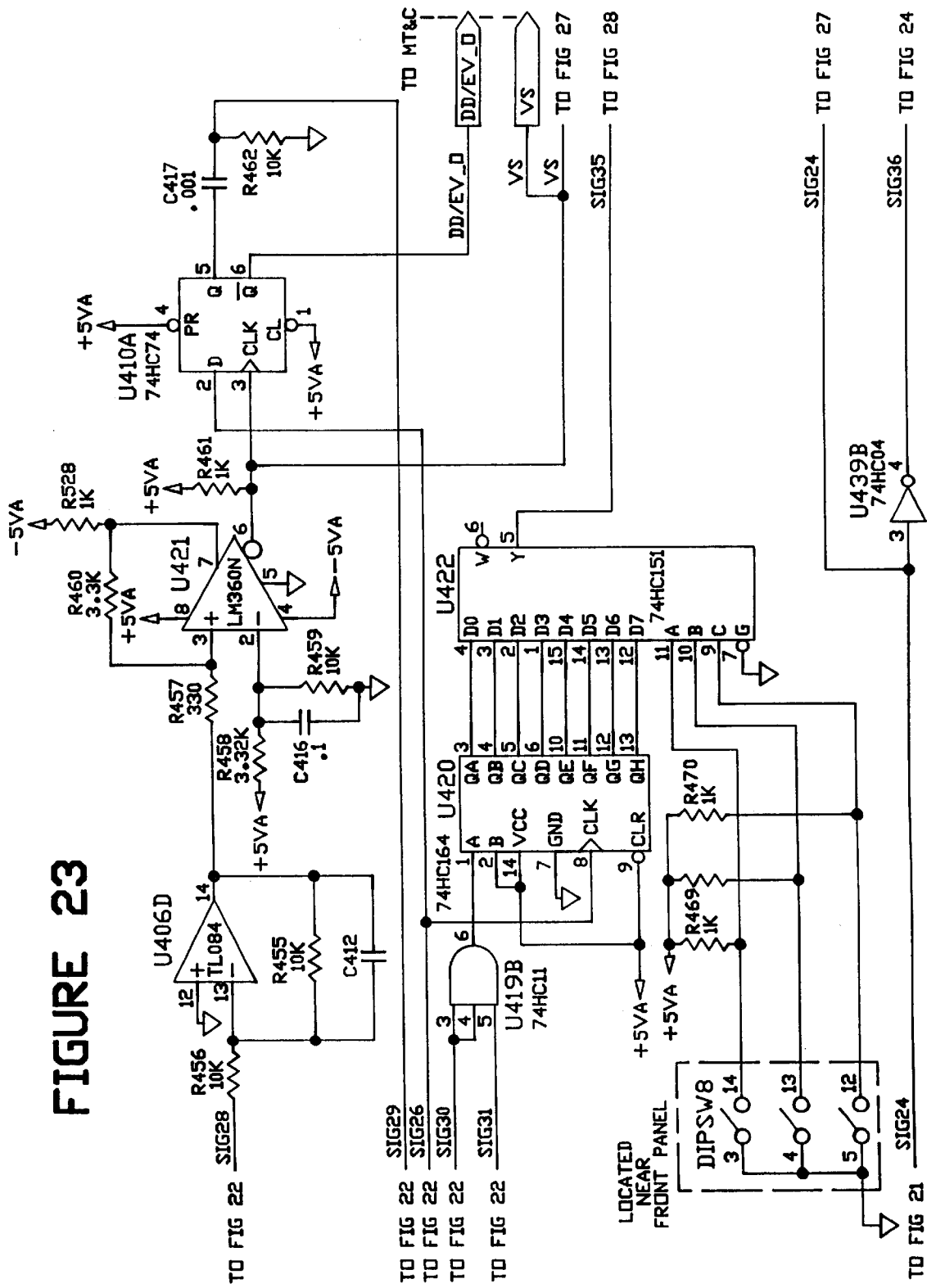
FIG. 23 is a third section schematic diagram of the D/A and Output Video sections of the preferred embodiment of the invention.

FIGS. 22 and 23 are second and third sections schematic diagram of the D/A and Output Video sections of the preferred embodiment of the invention. These figures show the sync tip peak detector U405B which samples and holds the voltage of the sync tip peak on hold capacitor C467. The sync tip voltage is divided by two by R444 and R445 providing a 50% reference level for sync comparator U415. The TTL level sync from U415 is coupled to several sections, including U407A which eliminates ½ H pulses to provide H pulses, and U406C, U406D (FIG. 23) and U421 which operate to integrate the TTL sync and provide a TTL vertical sync signal. U416 of FIG. 22 operates with U419B (FIG. 23), U420, U422 and dip switch 8 to provide an adjustable vertical reset signal out of pin 5 of U422 which is used to reset the reference sync generator U423 pin 12 (FIG. 28) thus allowing the reference sync generator, and thus the output video to be locked ahead or behind the reference video in 1 H increments. FIG. 23 also shows a D Flipflop, U410A which clocks the H signal from U407A with vertical sync from U421 to provide a field square wave signal. The field square wave signal is differentiated with C417 and R462 to provide a reset pulse for vertical counter U418, and to provide an ODD/EVEN signal for the memory control circuit.

Figure 24:
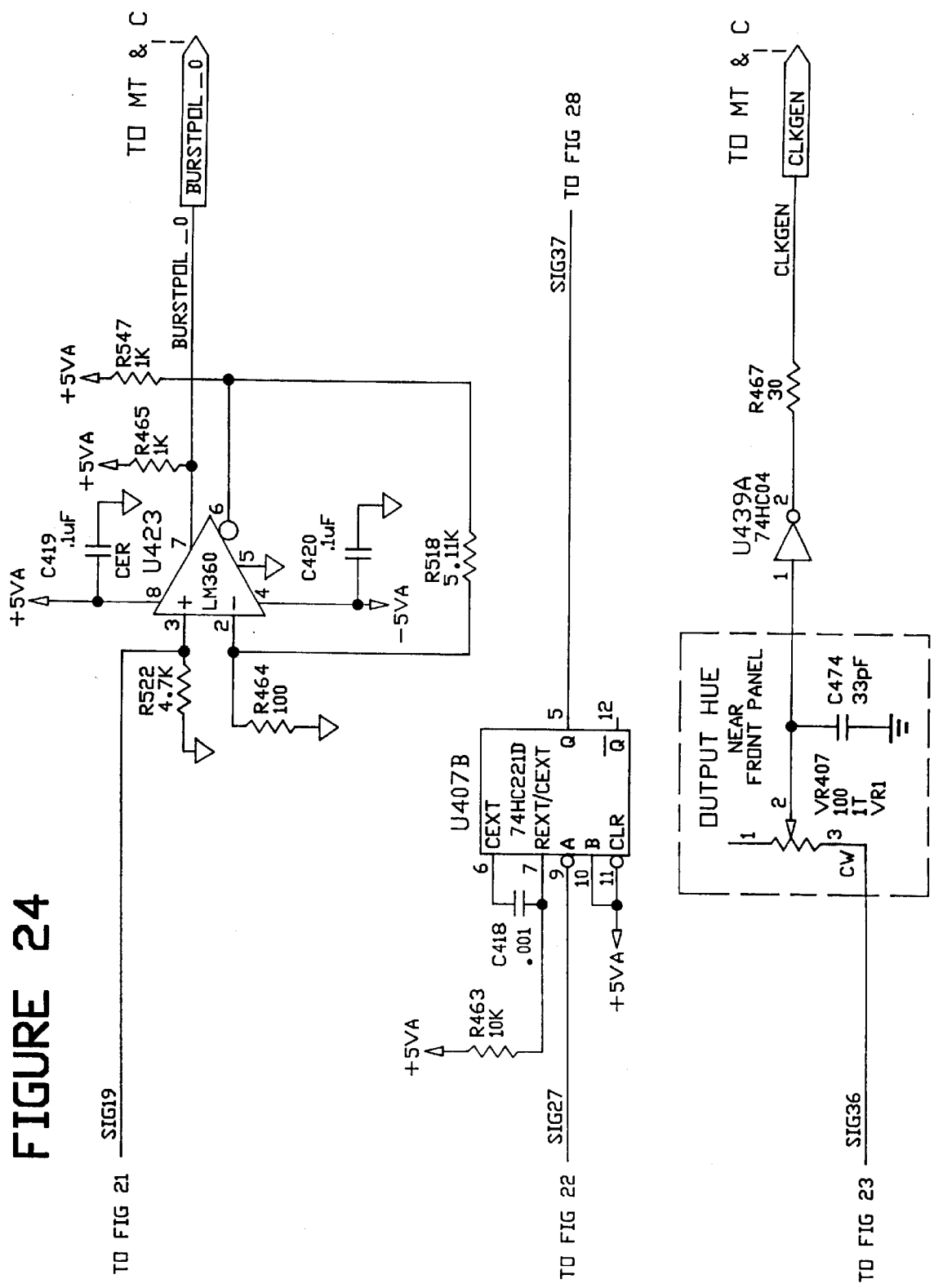
FIG. 24 is a fourth section schematic diagram of the D/A and Output Video sections of the preferred embodiment of the invention.
Figure 28:
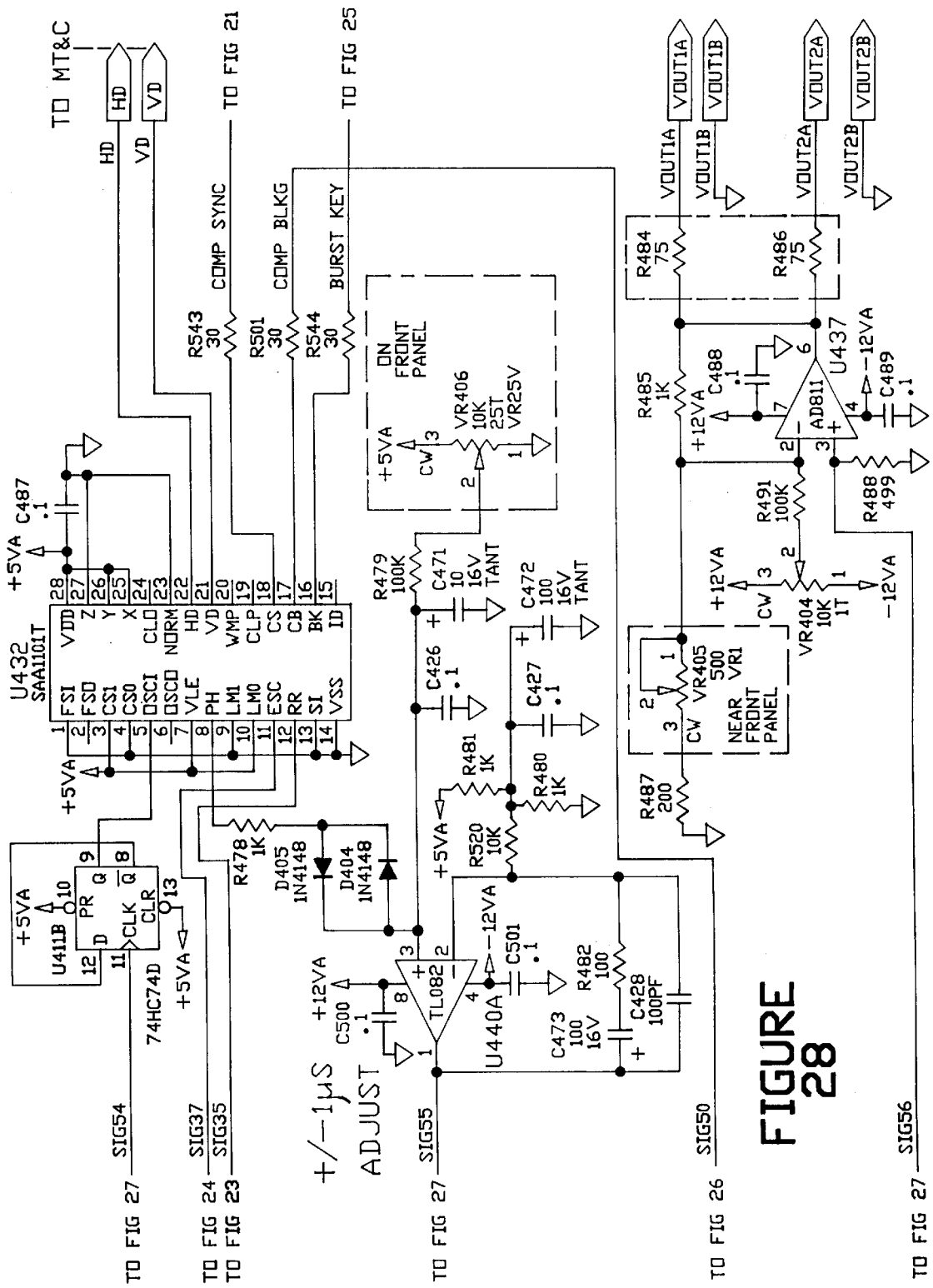
FIG. 28 is an eighth section schematic diagram of the D/A and Output Video sections of the preferred embodiment of the invention.

FIG. 24 is a fourth section schematic diagram of the D/A and Output of the preferred embodiment of the invention which shows a one shot U407B operating on reference comp sync to provide sync pulses for input to the reference sync generator U423 pin 11 (FIG. 28). In addition, color burst from the reference video is coupled to U423 to provide a TTL level signal corresponding to the positive half cycle period of the burst. This signal is used by the memory control circuit to distinguish field 1 from field 4 in PAL. It is not necessary to use this signal for monochrome or SECAM signals. Also shown in FIG. 24 is a variable phase shifter VR407 and C474 which is used to shift the phase of the clock signal in order to delay the reading of video from memory by a variable amount. When new sync and burst is added to the output video, this adjustment operates as a fine video chroma phase control.

Figure 25:
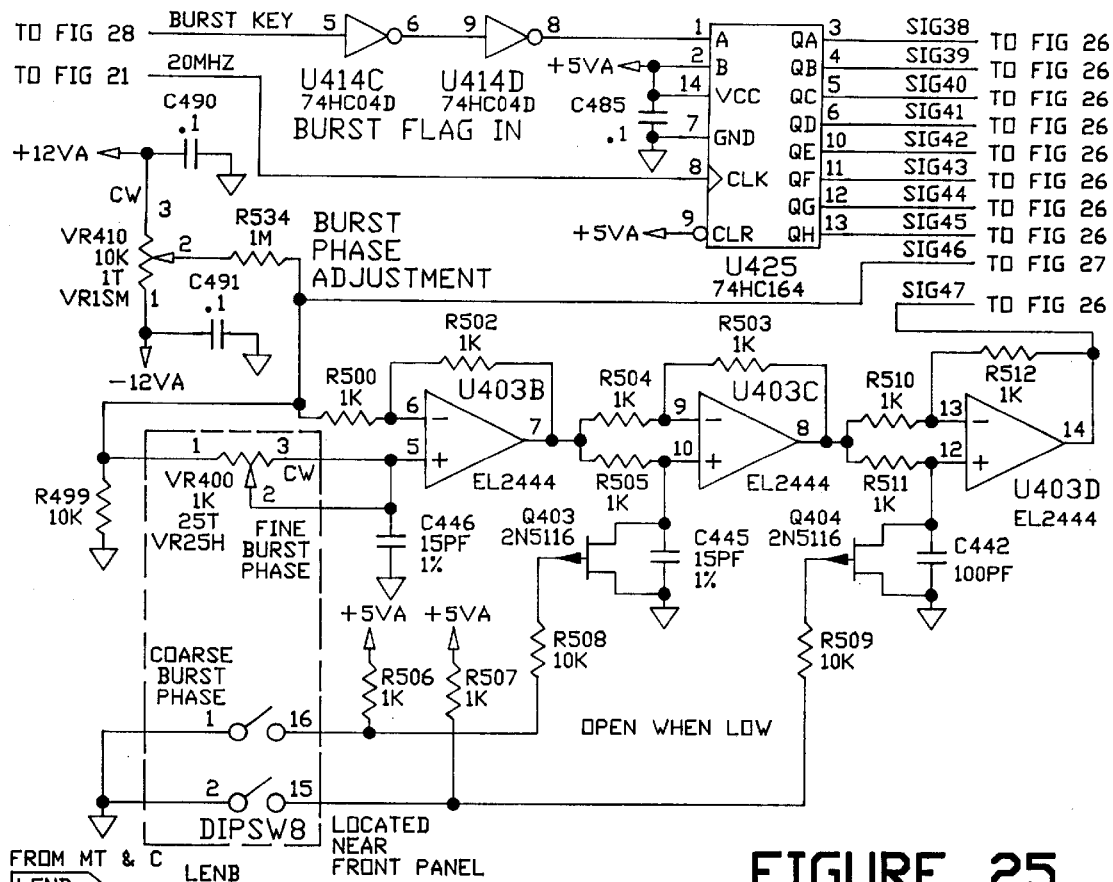
FIG. 25 is a fifth section schematic diagram of the D/A and Output Video sections of the preferred embodiment of the invention.
Figure 26:
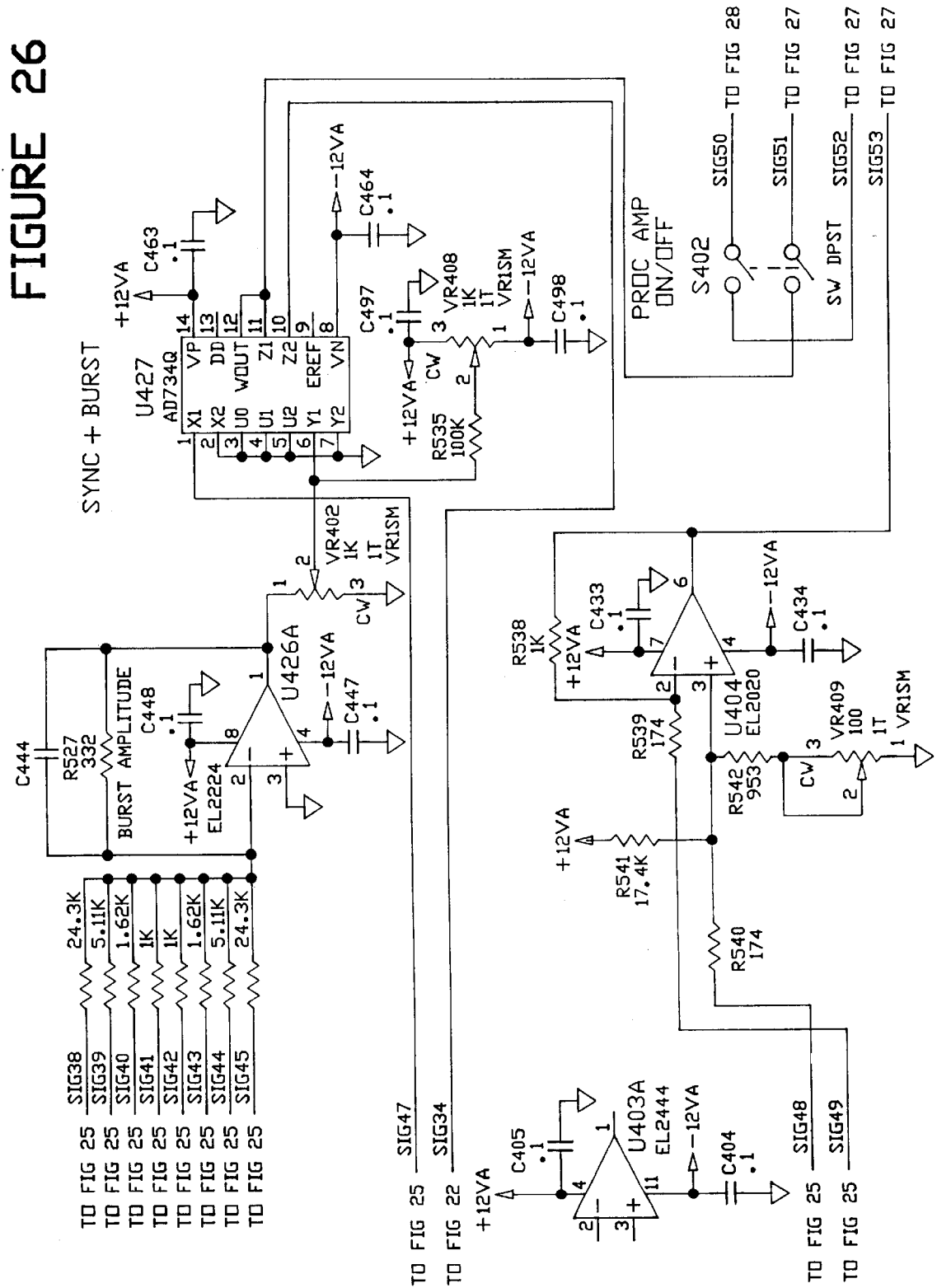
FIG. 26 is a sixth section schematic diagram of the D/A and Output Video sections of the preferred embodiment of the invention.

FIGS. 25 and 26 are fifth and sixth section schematic diagrams of the D/A and Output Video sections of the preferred embodiment of the invention. These diagrams show a burst shaper U425, and U426A which operate to shape the edges of the burst flag signal from the reference sync generator (U432 of FIG. 28) with a $\sin^2$ shape. This burst flag is multiplied with the color subcarrier in multiplier U427 to provide a shaped burst. U427 also operates to add sync from the sync shaper to the burst. The subcarrier for the burst is supplied from adjustable phase shifted comprised of U403B, C and D. It should be noted that VR400 provides an adjustable phase shift which is adjustable over approximately 120° and switches 1&2 of dip switch 8 each provide a switched 120° adjustment. In this fashion, a full 360° adjustment may be obtained. For PAL operation, one of the FET switches in this phase shifter may be switched so as to provide the ±90° burst shift on a line by line basis.

FIG. 25 also shows the D/A convertor, U416 which converts the digital video signal back to analog. The output of the D/A is differential current and must be converted to voltage, which is performed by amplifier U404 of FIG. 26.

Figure 27:
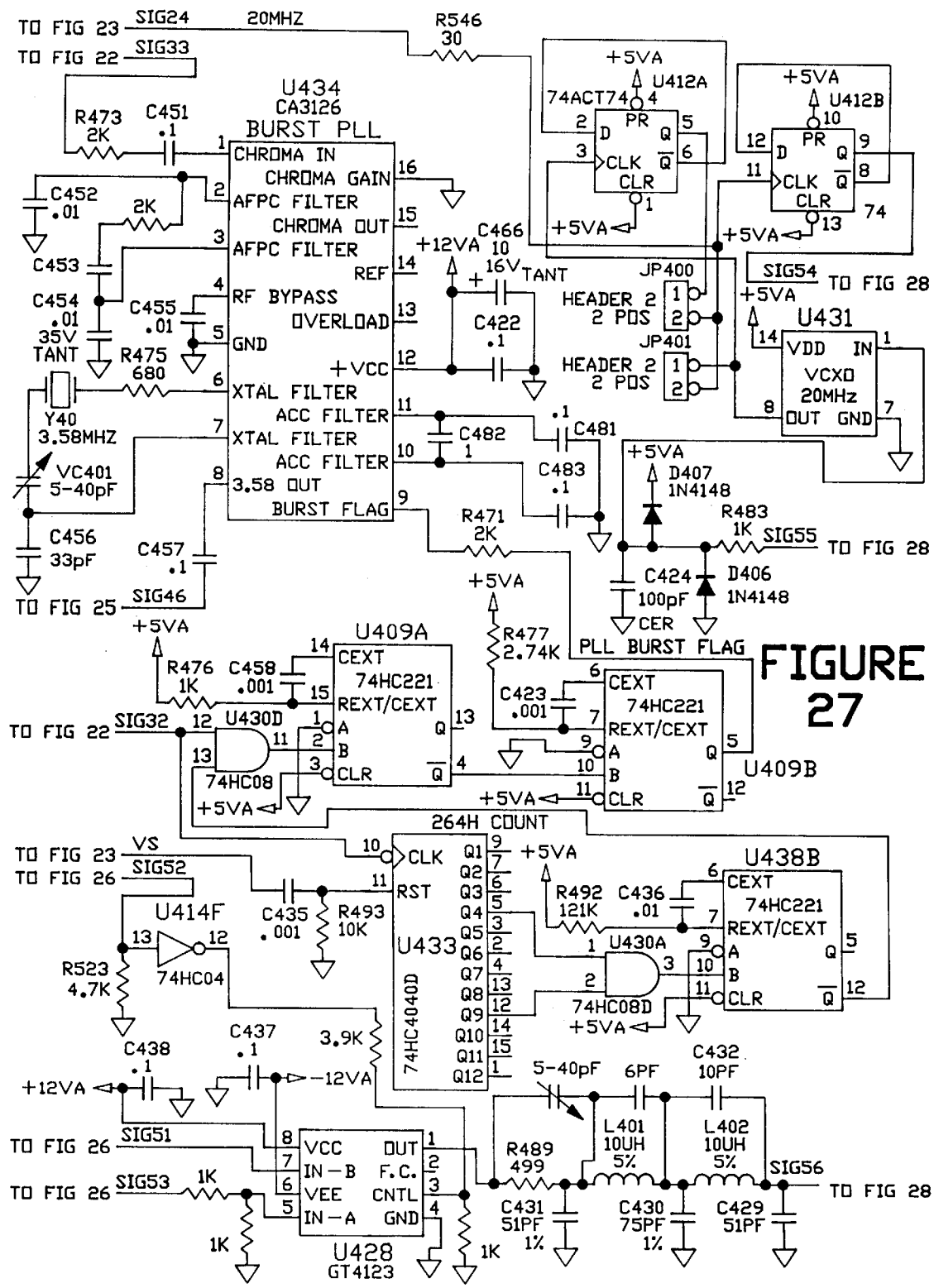
FIG. 27 is a seventh section schematic diagram of the D/A and Output Video sections of the preferred embodiment of the invention.

FIG. 27 is a seventh section schematic diagram of the D/A and Output Video sections of the preferred embodiment of the invention, showing the burst PLL U434 which receives the burst from the reference video on pin 1 and provides a continuous subcarrier out on pin 8. This subcarrier is used to create a new burst signal having adjustable phase which may be inserted in the output video. While shown with NTSC component values, this circuit may be operated in PAL as well. It is not used for SECAM or monochrome signals. A burst flag for the chroma PLL is generated from the reference video sync by one shots U409A&B in response to counter U433, U430A and oneshot U438B.

FIG. 27 also shows VCXO U431 which may be either 20 MHz or 40 MHz frequency, and with dividers U412A&B which are jumpered with jumpers JP400 and JP401 to accommodate the frequency in use. Normally a 20 MHz part which is used on the input PLL. The frequency of VCXO U431 is controlled by the control signal on pin 1.

FIG. 27 also shows analog switch U428 which is used to reinsert new burst, blanking and sync in the output video. Output video is input on pin 5, new burst and blanking on pin 7 and during the blanking period, a control signal on pin 3 causes the new burst and blanking to be inserted. Normally, the control signal is comprised of composite blanking, however from the teachings herein, it will become apparent to one skilled in the art that other signals may be used as well to tailor the insertion of new signals to meet the needs of a particular application. For example, only vertical sync and horizontal blanking may be utilized thus allowing only sync and burst to be inserted while preserving vertical interval signals. Other signals such as vertical and horizontal are available from the reference sync generator IC U432 which signals may be combined by simple logic to provide selective insertion of reconstructed repetitive signals as desired, thus maintaining any non-repetitive signals which are outside of the active video area. The insertion may be entirely defeated, causing the digitized sync burst and blanking, as well as any test signals, sound in sync or other wanted signals to be passed by switching S402 to the down or open position.

The video out of switch 428 is coupled to the reconstruction filter shown on the lower right of FIG. 27. This filter removes the 20 MHz clock component from the video signal, as well as providing sinX/X compensation and frequency response flattening via the trim capacitor.

FIG. 28 is an eighth section schematic diagram of the D/A and Output Video sections of the preferred embodiment of the invention. This figure shows the reference sync generator U432 which is phase locked to the reference video signal just as the input sync generator was phase locked to the input video signals. The error integrator is U440A and the horizontal phase adjust is VR406. In addition, the output video buffer amplifier U437 is shown with video gain control VR405 and DC offset control VR404.

It will be understood by one skilled in the art that in configurations such as the preferred 6 board case and 12 board case where multiple video synchronizer boards are utilized to synchronize multiple video feeds to a common reference signal, that the circuitry to couple to and strip synchronizing and burst signals off of the reference, which includes U401, U402, U436, U435, U415, U406, U421, U410, U418, U420, U419B U434 and associated circuitry need not be duplicated for each channel. It will be understood from these teachings that an extremely cost effective embodiment may be had by coupling the subcarrier from pin 8 of U434, Vertical sync from pin 6 of U410, Line count from the outputs of U428 and horizontal sync from pin 4 of U407 to the remaining circuitry which will be duplicated for each channel. Such sharing of the reference processing circuitry will provide individual phase controls for each output but allows them to all be timed from a common reference signal. The supplied signals may be different than those suggested, for example H sync may be used in place of line count from U428 and individual line counters placed on each output thus reducing the number of interconnection signals at the expense of additional parts usage. Alternatively, it will be seen from the teachings herein that other signals may be utilized for reference, for example individual ones of clock, subcarrier, H and V sync and field one reference may be utilized in respect to the multiple synchronizer configuration described herein and a single genlock circuit may be utilized to provide such reference signals for all of the multiple synchronizers being utilized, but still retaining individual phase controls for each.

The circuits described above can be used with both NTSC and PAL standard signals as well as other video formats. The two preferred embodiment programs for 525 and 625 line operation are given above. In addition, other minor changes to both the input and output analog and PLL circuits will of course be necessary to change from NTSC (which is shown) to PAL. These changes include changing the frequency of the Burst PLL U434 (FIG. 27) to operate at the 4.43 MHz subcarrier rate, and changing the burst phase shifter (FIG. 25) to add the ±45° phase shift by switching one of the FETs with an H/2 signal. In addition changing the two VCXOs (FIGS. 5 & 28) is required to operate them at 40.0 MHz instead of 40.3 MHz so that the sampling clock continues to run at 2560 times H. The vertical counter U433 will need to be reconfigured to count 314 instead of 264 and the Philips SAA1101 Sync generator ICs (FIGS. 5 & 28) need to be reconfigured for PAL operation according to the manufacturers recommendations. Other minor changes to convert the operation to PAL will be apparent to those skilled in the art from the teachings herein. It may be noted that due to the high sampling frequency that the anti aliasing and reconstruction filtering used herein is relatively independent of the signal standard used as compared to those normally used in synchronizing devices. No change of the present filters is needed when changing to NTSC, PAL, SECAM or HDTV formats, as long as the signal bandwidth is within the bandwidth of the interpolation filter. In the present example, this is approximately 0.22 times the A/D sampling frequency or 8.8 MHz. It may also be noted that higher A/D sampling frequencies may be utilized with the present configuration, providing the sampling is performed at 2560 times H and that the frequency does not exceed the clock speed limits of the various parts of the circuit.

When the synchronizer is configured for 625 line operation, it may be utilized with SECAM signals be removing, defeating or not using the burst related circuitry which is used for PAL. Since the memory control is H locked and does not use burst except for distinguishing field 1 from 3 in NTSC or 1 from 4 in PAL, burst is not needed for operation. In fact, if burst is not present as with a monochrome signal, or is found to be unusable, the memory controller ignores it. The SECAM signal is then passed just as if it were a 625 line monochrome signal. As a result of digitizing the full waveform, the entire SECAM color barrier will be passed by the synchronizer. When new sync and blanking is reinserted on the output, care must be taken not to blank out the color synchronizing waveforms in the vertical blanking area, and to accommodate the narrower horizontal blanking as is know to one skilled in the art as it pertains to SECAM.

The video synchronizer of the preferred embodiment described herein is suitable for construction on a single PC board of approximately 6×16". While other dimensions having the same area would be acceptable, these dimensions provide considerable flexibility in mounting the board in case sizes which meet standard mounting configurations used by the video industry.

The case configurations available by using the preferred PC board dimensions include a single board desk top version, a 6 board rack mount version, and a 12 board rack mount version. The 6 and 12 board versions may mix boards operating on various signal standards, for example NTSC and PAL boards. The flexibility of mounting configurations provides great utility as compared to prior art designs.

Figure 29:
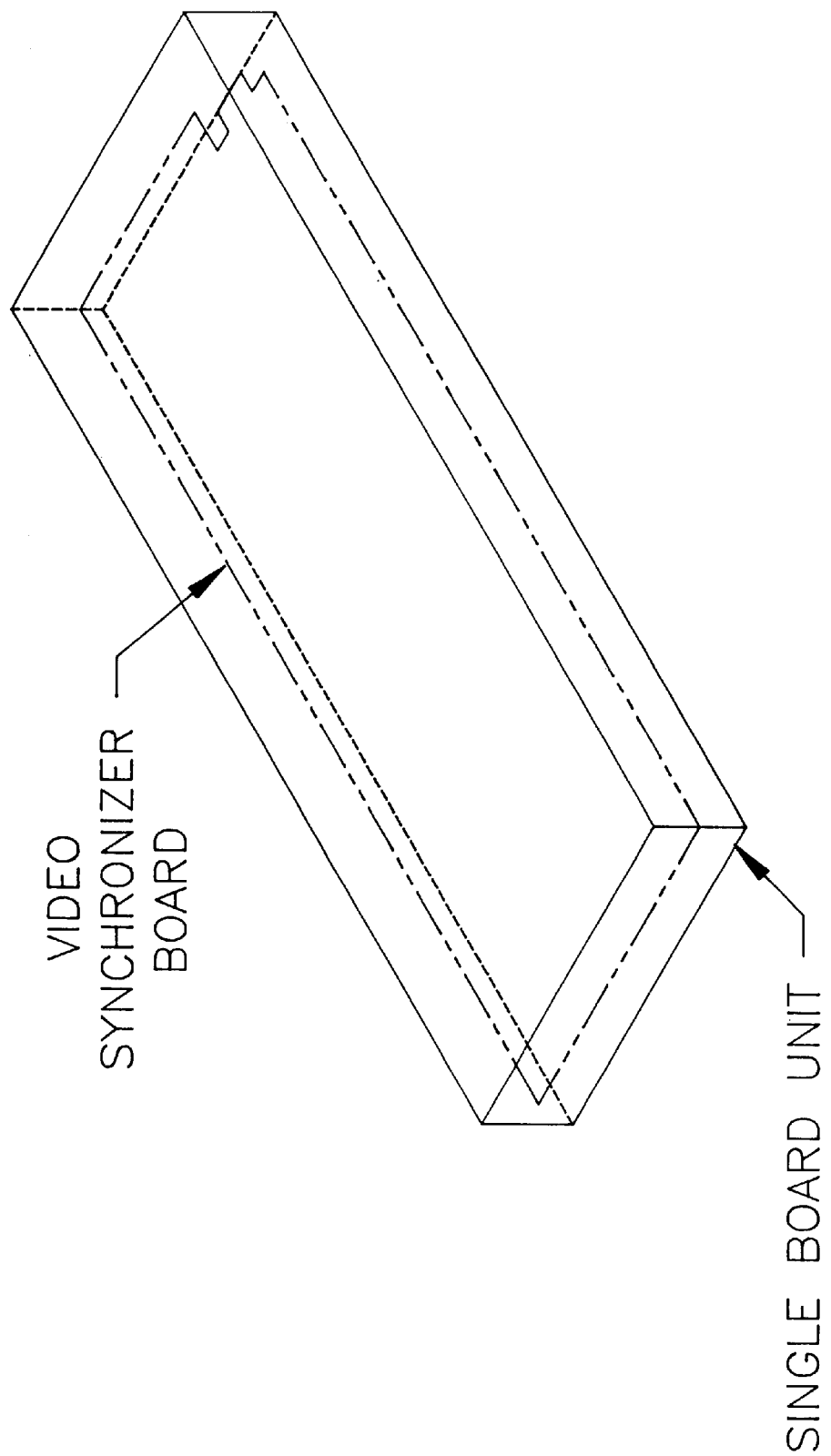
FIG. 29 is a first mechanical diagram of a first mechanical embodiment of the invention showing a single electronic printed circuit board which embodies the electronics of the preferred embodiment housed in a single board case.

FIG. 29 shows the mechanical embodiment of the invention in which a single electronic printed circuit board is housed in a single board case. It can be seen that the size of the case, as allowed by the size of the PC board, which in turn is allowed by the simple and efficient design of the circuitry embodying the invention is quite well adapted to be placed on a desk next to a computer or other video device.

Figure 30:
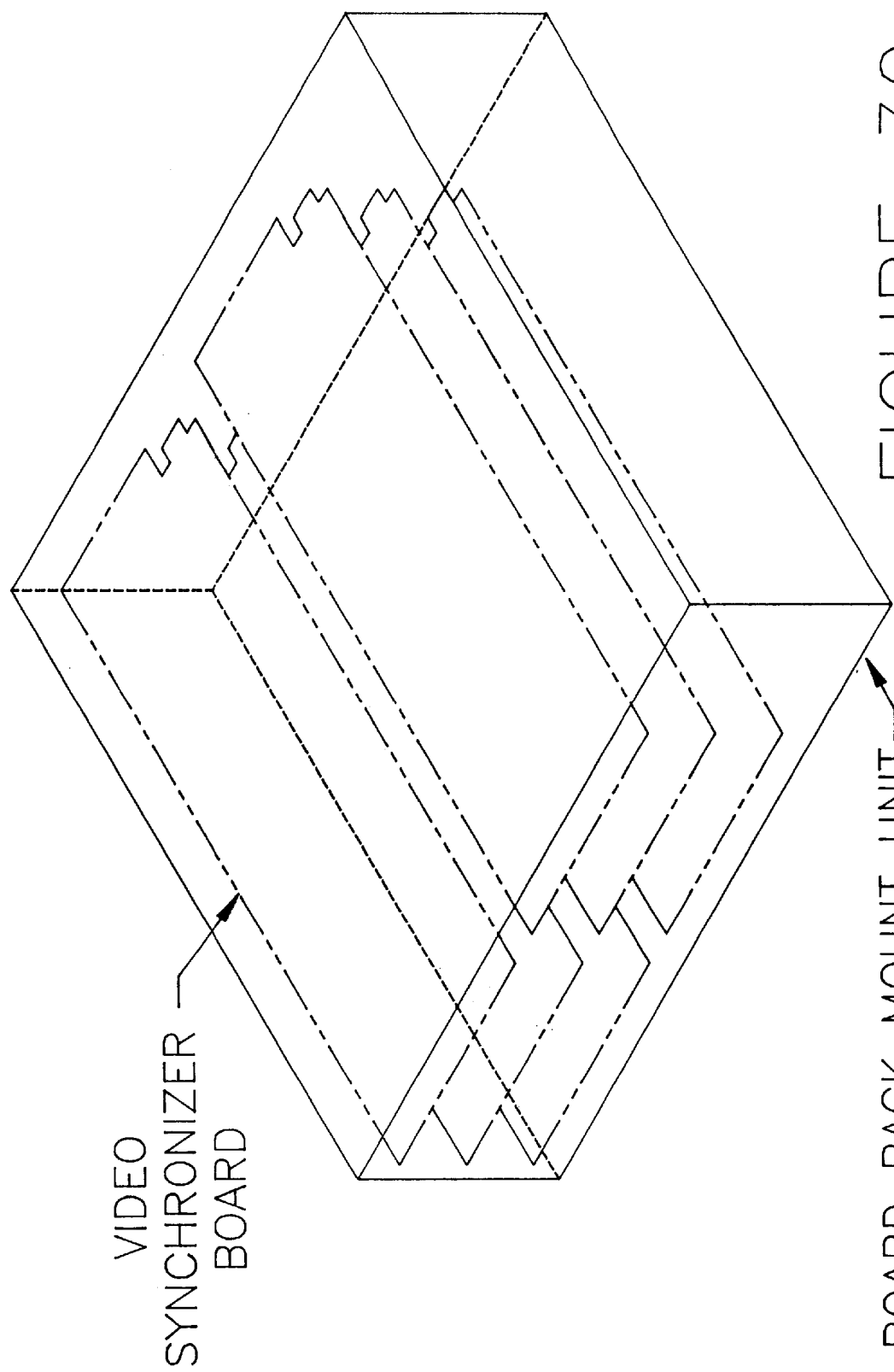
FIG. 30 is a second mechanical diagram of a second mechanical embodiment of the invention showing six electronic printed circuit boards which each of which embodies the electronics of the preferred embodiment housed in a six board case.

FIG. 30 shows second mechanical diagram of the invention showing six electronic printed circuit boards housed in a six board case. It can be seen that the size of the case, as allowed by the size of the PC boards therein, which are the same board as above is quite well adapted to be placed in a standard 3.5" high 19" wide equipment rack.

FIG. 31 is a third mechanical diagram of the invention showing twelve printed circuit boards housed in a twelve board case. It can be seen that the size of this case, as allowed by the size of the PC boards therein, which are the same board as above in quite well adapted to be placed in a standard 7" high 19" wide equipment rack.

It can thus be appreciated from the above FIGS. 29–31 that the ability to squeeze high performance into a relatively small PC board allows unobvious flexibility in the packaging of the invention for multiple applications. The achievement of this inventive feature is brought about by the novel use of circuitry to perform wanted features in nonconventional ways, including but not limited to the use of large amounts of memory and high sampling speeds to reduce circuit complexity and board size and power consumption. For example, the size reduction is supported by the elimination of complex filtering by use of oversampling and interpolation, elimination of complex chroma burst locking circuitry and chroma inversion circuitry by the use of a full repetition period of memory, elimination of complex memory timing and address generation circuitry by not fully utilizing the large memory ICs which were selected and making the memory addressing logically correspond to the video synchronizing, the elimination of complex and fast acting freeze circuitry by the use of more than a full repetition period of memory. The reduction in power consumption is brought about by minimizing the electronic circuitry, and be keeping memory speeds to relatively low levels. Other novel features support the size and power reduction as well.

FIG. 32 shows a block diagram of a multiple channel video synchronizer system having a plurality of video inputs 1-N coupled to individual signal paths to provide a plurality of video outputs 1-N respectively as will be discussed in more detail with respect to FIG. 33.

Figure 33:
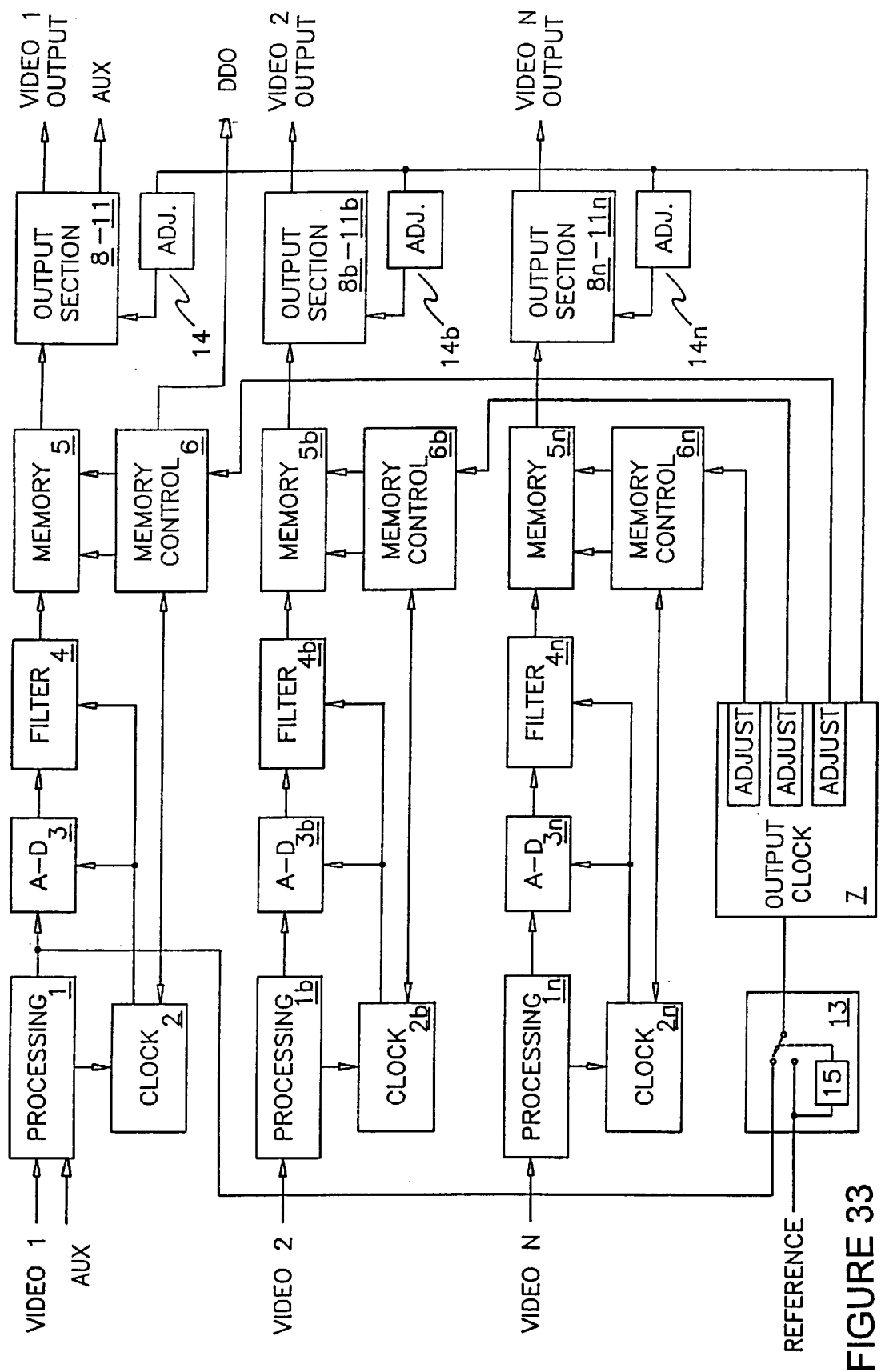
FIG. 33 is a block diagram of a multiple synchronizer system of the preferred embodiment of the invention as used with analog to digital converters.

FIG. 33 shows a block diagram of a multiple channel video synchronizer system of FIG. 32, with the addition of an Auxiliary input shown below Video 1 input. FIG. 33 has a plurality of video inputs 1-N coupled to individual signal paths. The invention operates to synchronize each of the video inputs to a common reference signal. Each signal path consists of elements 1, 2, 3, 4, 5, 6, and 8–11 shown by way of example and all corresponding to the same numbered elements of the previous application, which may be referred to for detailed description. Each video signal is received by a processing circuit 1 which operates to prepare the video signal for conversion to digital in an A-D converter 3. A clock generator 2, generates a sampling clock commonly referred to as the write clock, which is preferred to be related to the input video signal, which sampling clock is coupled to the A-D 3 and filter 4. In addition, the clock circuit 2 operates to provide appropriate control and timing signals to the memory control 6, as well as to receive appropriate control and timing signals therefrom.

The digital video output from the A-D 3 is coupled to a filter circuit 4 where various filtering operations may take place as previously described. Alternatively, the filter circuit 4 may be eliminated if no filtering is desired. While the filter circuit 4 is shown operating on the video input to memory 5, it will be understood that 4 may operate on the video output from memory 5 before it is coupled to the output section 8–11, or may operate on both video input and video output from memory. The nature of the filtering may be recursive or nonrecursive or both as desired to implement a particular filtering application.

In the preferred embodiment, the filtered video from 4 (or alternatively the unfiltered video from 3) is coupled to the memory 5 where it is stored in response to the memory control 6, in response to the input signal synchronizing type components. The stored video is read out of the memory 5 under control of the memory control 6 in response to a timing signal provided by the output clock circuit 7. The read out of the video signal is responsive to the reference signal as facilitated by the reference signal selector 13 and the output clock circuit 7 which provides the timing signal. The stored video read out of the memory 5 is in effect a delayed version of the input signal, and thus can be said to be a delayed input signal which is synchronized with the reference signal.

The stored video read out of the memory 5 is coupled to the output section 8–11 where the video is operated on as previously described, for example to select portions contained within the non picture areas corresponding to said stored signal from said memory 5 in order that these selected portions may be preserved or passed and further to operate so that known ones of the repetitive portions of the non picture areas corresponding to said stored signals from said memory section are reconstructed or reconstituted in said stored signals from said memory section before it is output. The signal which is output from the output section 8–11 is thus also a delayed signal synchronized with the reference, but it has had additional processing performed upon it. For example, the embedded audio and test signals which are contained in the nonpicture area of the video signal may be selected to be passed unaltered while the active video may be operated on to change the gain or offset of one or more of the components, and the synchronizing type signals may be reconstituted in the signal. Thus since the video signal is delayed and processed, the output of 8–11 is a delayed version of the input video signal which is synchronized to the reference.

As previously described, 14 provides for fine adjustment of the video signal timing, for example to achieve the desired color subcarrier phase. Alternatively, this function may be combined in the memory controller 6.

FIG. 33 also shows an auxiliary signal path associated with Video 1, which shares the Video 1 signal path electronics. The auxiliary signal may be an associated signal such as an audio signal, or other secondary signal as previously described. It is important to note that in this manner the auxiliary signal may be synchronized to the reference signal, or may otherwise be delayed in relation to the video 1 signal in order to maintain proper timing relationship therewith. In many instances, it is desirable to mute, modify or otherwise act on the auxiliary signal if the associated video signal is disrupted. For example in MPEG or other compressed data streams, the digital audio is likely to be corrupted if the digital video is disrupted. In this instance the output section 8–11 will be preferred to operate to provide such muting or other action on said auxiliary signal in response to the detection of the disruption by 2 or alternatively in response to the outputting of a frozen image by the memory 5.

FIG. 33 shows a common reference selector 13 which contains a reference detector 15 which operates to detect the presence of a given preferred reference signal, shown here by example as the external reference. If the preferred reference is present the selector 13 selects it to be used as the reference for the output clock circuit 7 (also known collectively as a genlock circuit) and if the external reference is not present a selected one of the plurality of input video signals, in the present example shown as the video 1 signal, is used.

A common output clock section 7 is shown to be utilized with the plurality of video signal paths. The clock and timing signals from 7 are coupled via individual adjustment controls to individual signal paths. The individual adjustments of 7 correspond to the H & V phase, and 14 to fine video phase adjustments of FIG. 1 of the parent application. These adjustments allow these parameters of each video output to be individually adjusted.

In the preferred embodiment, section 2 operates to detect when the input signal is disrupted, which may be performed by detecting when sync like pulses from the video are missing or misplaced, or when the input PLL is consequently unlocked. The information of the input being disrupted is used by the memory controller 6 to cause the memory 5 to cease storage of video samples and repetitively output an entire repetition period of stored samples of the previously input video during at least the pendency of the disruption. This action results in a frozen image being output from memory. Alternatively, the output processing section may be caused to output a known image, such as black for example, or to select another video signal. The output processing section may select the known image or other video after a time delay. For example after 5 seconds of frozen image the output processing section may fade to a message to standby. In addition, the output processing section may also operate to interact with the auxiliary signal as previously described.

While it is preferred to have only one output clock circuit 7, one skilled in the art will recognize from the present teachings that it is also possible to have more than one such circuit, thus allowing synchronization to a plurality of references. For example, 3 inputs might be synchronized to one reference and a different 3 inputs to another. Many other combinations are possible as well and one of ordinary skill in the art will know to adapt the circuitry of the present teachings to fit a particular need for the invention.

As shown with respect to the DDO (delay detector output) signal from memory control 6 in the diagram of FIG. 33, it will be appreciated from the teachings of the earlier application that the memory control 6 operates to output a delay signal which is representative of the delay which the signal undergoes in the memory. In the present example this delay is the same for both the AUX and Video 1 signal, however it may represent either delay. Such delay signal may be utilized to delay an associated signal by an amount to keep it properly timed with the signal whose delay through 5 it represents. For example it may be utilized to control the delay of an associated audio signal to match the delay of the Video 1 signal. In addition, it will also be appreciated that the memory 5 itself is shown to be configured to include appropriate circuitry to delay the associated AUX signal by an amount to keep it properly timed with the video signal.

Figure 34:
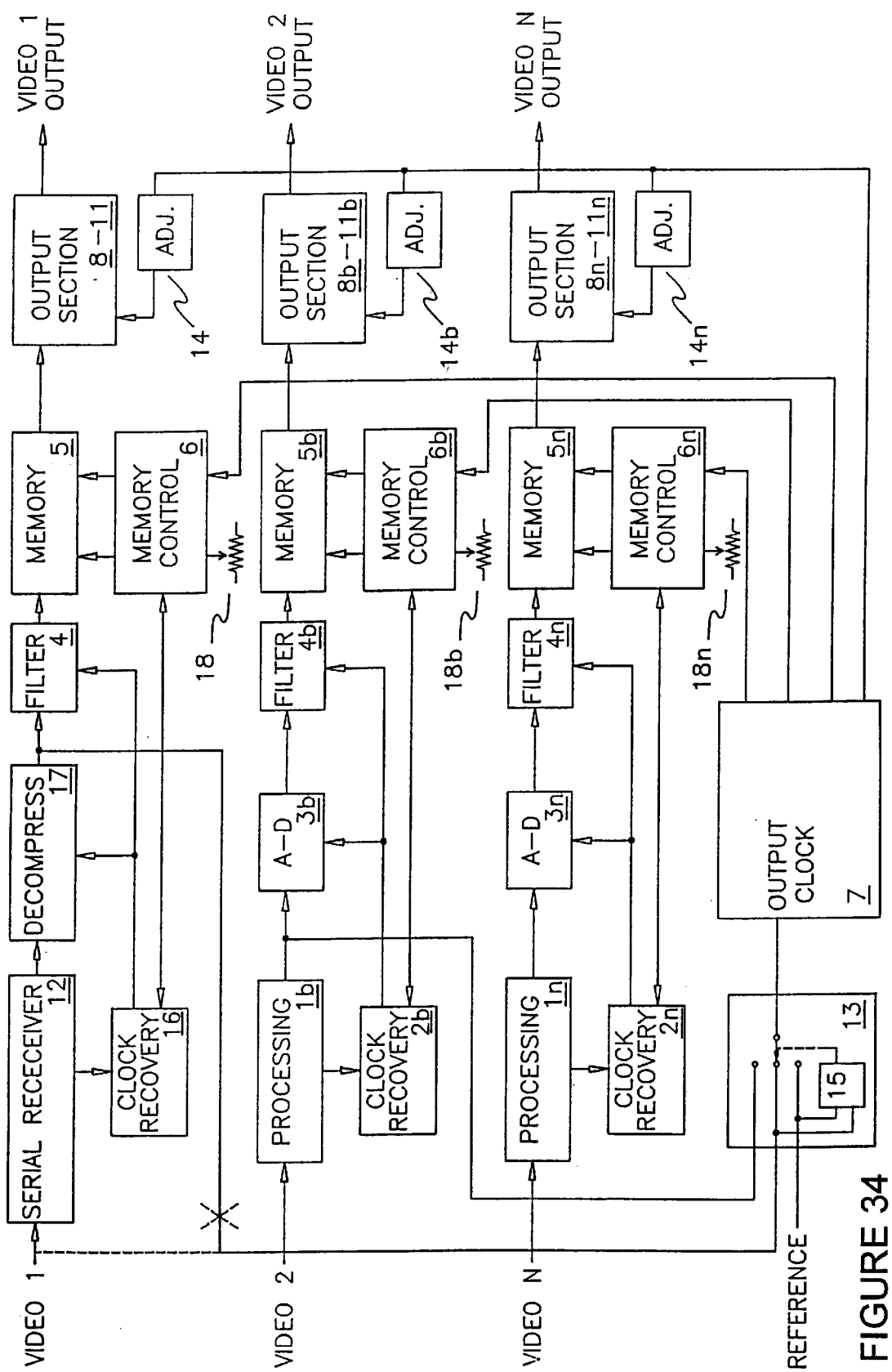
FIG. 34 is a block diagram of a multiple synchronizer system of the preferred embodiment of the invention as used with both analog and digital video signals.

FIG. 34 shows the preferred embodiment of the invention as used with digital signals. The embodiment of the invention shown in FIG. 34 is similar to that of FIG. 33, except that the first video input is shown as a digital input, and as with the earlier device of FIG. 33, the stored video read out of the memory 5 is coupled to the output section 8–11 where the video is operated on as previously described to pass, alter or reconstruct or reconstitute select portions contained within the non picture areas. For example, the embedded digital audio may passed unaltered while the active video may be operated on to change the gain or offset of one or more of the luma or chroma components, and the error checking and correcting signals recalculated and the SAV and EAV signals reconstituted.

FIG. 34 also shows individual timing controls 18 configured to allow the memory control 6 to provide adjustable timing of the output video signal with respect to the reference input signal selected by 13. This location of the adjustment is different than that of FIG. 33 in which the adjustment is provided as part of 7.

The reference selector 13 is seen to select one of the preferred reference, video 1 or video 2 in accordance with a hierarchy or other criteria or plan of selections which may be specified at the time of manufacture or by an operator as previously discussed. It is seen that 15 is responsive to the preferred reference and to video 1 to select one of the three aforementioned signals as the reference to be coupled to 7. It may also be seen in FIG. 34 that the video 1 signal which is utilized for reference may be taken before or after the serial receiver and decompression as appropriate, as shown by the dashed line connection. Similarly, the Video 2 or other signal may be utilized before of after processing and/or decompression as will be apparent to one of ordinary skill in the art from the teachings herein.

FIG. 34 shows elements 1–11 as in FIG. 33. In addition a serial digital receiver 12 is shown to receive the serial digital video 1 signal. Receiver 12 is coupled to a clock recovery circuit 16 to recover the clock and synchronizing components from the serial video, which clock and synchronizing components are used as are those of element 2. In addition a decompress circuit 17 is shown to provide for decompression of compressed video signals.

The serial receiver 12 and clock recovery circuitry are responsive to the serial digital video signal to recover the clock and synchronizing portions therefrom. Other types of digital signals may be accommodated as well and 12 and 16 will be understood to respond to such digital signals which also often contain synchronizing components such as start of active video (SAV), end of active video (EAV) which have different names and positions, and in some instances different functions, with respect to their analog counterparts, but which still are provided for the purpose of identifying portions or segments of the data stream.

Serial receiver 12 may also operate to receive embedded associated signals such as digital audio, time stamps, etc. for the uses previously described.

For the purposes of the present disclosure and claims the words synchronizing, synchronizing components, synchronizing portions and the like will be understood to apply to those portions of the signal which are utilized for such control and/or identification functions. When speaking of the purpose or use such synchronizing related words, it will be understood to mean the intended usage as commonly known in the art as will be understood by one of ordinary skill in the art, even though the wording herein may differ from the commonly used wording.

As an example, when it is stated "synchronizing components define horizontal lines of active video" the "phrase synchronizing components" is intended to include the digital SAV and EAV values which define the start and end of active video for SMPTE 259 video, as well as other similar digital components, even though "synchronizing components" is more commonly used in the analog sense of sync pulses which drive the line oscillator in a TV receiver. The use of the word signal will also be understood to include an individual component and vice versa, for example an associated signal may include a timing component or an auxiliary component of a digital video data stream. It will nevertheless be understood that the phrases used herein are intended to apply equally to analog signals and digital data streams in analog component, composite, serial and parallel; digital serial, parallel, component, composite, compressed and other forms and standards of electronic signal conveyance.

What is claimed is:

1. An electronic apparatus for processing an input video type signal including in combination:
    a) an input processing section responsive to said input video type signal to provide a processed signal having an established DC level;
    b) a clock section for generating a sampling clock;
    c) a sampling section operative to sample said processed signal and provide samples thereof in response to said clock section;
    d) an interpolation section responsive to groups of said samples to perform interpolation thereof to provide interpolated samples having improved resolution;
    e) a memory and control section to temporarily store said interpolated samples thus providing stored interpolated samples;
    f) an output section responsive to said stored interpolated samples to provide an output video type signal in the same or different form as said input video type signal.

2. An apparatus as claimed in claim 1 further including a filter section responsive to said interpolated samples of d) and operable to further improve the resolution thereof.

3. An apparatus as claimed in claim 1 further including a filter section responsive to said stored interpolated samples of e) and operable to further improve the resolution thereof.

4. An apparatus as claimed in claim 1 further including a filter section responsive to said interpolated samples of d) and said stored interpolated samples of e) and operable to further improve the resolution of said interpolated samples of d).

5. An apparatus as claimed in claim 1 further including a filter section responsive to said interpolated samples of d) and said stored interpolated samples of e) and operable to further improve the resolution of said stored interpolated samples of e).

6. An apparatus as claimed in claim 1, 2, 3, 4 or 5 wherein said memory and control section of e) also provides a signal in response to the amount of time said stored interpolated samples are stored in said memory and control section.

7. An electronic apparatus for processing an input video type signal including in combination:
    a) an input processing section responsive to said input video type signal to DC restore said input video type signal thereby providing a processed signal having a known DC level;
    b) a clock section for generating a sampling clock;
    c) a sampling section responsive to said clock section and operative to sample and digitize said processed signal to provide digital samples thereof having a first number of bits of resolution at said sampling clock rate;

d) an interpolation section responsive to groups of said digital samples to perform interpolation thereof to provide interpolated samples having a second number of bits of resolution;

e) a memory and control section to delay said interpolated samples to provide delayed interpolated samples;

f) an output section responsive to said delayed interpolated samples to provide an output video type signal in the same or different form as said input video type signal.

8. An apparatus as claimed in claim 7 further including a filter section responsive to said interpolated samples of d) and operable to improve the resolution thereof.

9. An apparatus as claimed in claim 7 further including a filter section responsive to said delayed interpolated samples of e) and operable to improve the resolution thereof.

10. An apparatus as claimed in claim 7 further including a filter section responsive to said interpolated samples of d) and said delayed interpolated samples of e) and operable to improve the resolution of said interpolated samples of d).

11. An apparatus as claimed in claim 7 further including a filter section responsive to said interpolated samples of d) and said delayed interpolated samples of e) and operable to improve the resolution of said delayed interpolated samples of e).

12. An apparatus as claimed in claim 7 wherein said first number of c) is 10 and said second number of d) is greater than 10.

13. An apparatus as claimed in claim 7 wherein in d) said interpolated samples are provided at a rate slower than said sampling clock rate of c).

14. An apparatus as claimed in claim 7 wherein said second number of d) is greater than said first number of c) and said interpolated samples of d) are provided at a rate slower than said sampling clock rate of c).

15. An apparatus as claimed in claim 7, 8, 9, 10, 11, 12, 13 or 14 wherein said memory and control section of e) also provides a signal in response to the delay time of said delayed interpolated samples.

16. An apparatus as claimed in claim 7, 8, 9, 10, 11, 12, 13 or 14 wherein said input video type signal contains an color subcarrier conforming to the NTSC or PAL standard, and the frequency of said sampling clock of b) is at least 8 times the frequency of said color subcarrier.

17. A method for processing an input video type signal including the steps:

a) in response to said input video type signal providing a processed signal having an established DC level;

b) generating a sampling clock;

c) sampling said processed signal and provide samples thereof in response to said sampling clock;

d) interpolating groups of said samples to provide interpolated samples having improved resolution;

e) temporarily storing said interpolated samples to provide stored interpolated samples;

f) providing an output video type signal in response to said stored interpolated samples with said output video signal being in the same or different form as said input video type signal.

18. A method as claimed in claim 17 further including filtering said interpolated samples of d) to improve the resolution thereof.

19. A method as claimed in claim 17 further including filtering said stored interpolated samples of e) to improve the resolution thereof.

20. A method as claimed in claim 17 further including filtering said interpolated samples of d) and said stored interpolated samples of e) to improve the resolution of said interpolated samples of d).

21. A method as claimed in claim 17 further including filtering said interpolated samples of d) and said stored interpolated samples of e) to improve the resolution of said stored interpolated samples of e).

22. A method as claimed in claim 17, 18, 19, 20 or 21 wherein said temporary storage step e) also provides a signal in response to the storage time said stored interpolated samples.

23. A method as claimed in claim 17, 18, 19, 20 or 21 wherein said input video type signal contains a color subcarrier conforming to the NTSC or PAL standard, and the frequency of said sampling clock of b) is at least 8 times the frequency of said color subcarrier.

24. A method for processing an input video type signal including the steps:

a) processing said input video type signal to DC restore said input video type signal thereby providing a processed signal having a known DC level;

b) generating a sampling clock;

c) sampling and digitizing said processed signal in response to said sampling clock to provide digital samples thereof having a first number of bits of resolution at said sampling clock rate;

d) interpolating groups of said digital samples to provide interpolated samples having a second number of bits of resolution;

e) delaying said interpolated samples to provide delayed interpolated samples;

f) providing an output video type signal in response to said delayed interpolated samples with said output video type signal being in the same or different form as said input video type signal.

25. A method as claimed in claim 24 further including filtering said interpolated samples of d) to improve the resolution thereof.

26. A method as claimed in claim 24 further including filtering said delayed interpolated samples of e) to improve the resolution thereof.

27. A method as claimed in claim 24 further including filtering said interpolated samples of d) and said delayed interpolated samples of e) to improve the resolution of said interpolated samples of d).

28. A method as claimed in claim 24 further including filtering said interpolated samples of d) and said delayed interpolated samples of e) to improve the resolution of said delayed interpolated samples of e).

29. A method as claimed in claim 24 wherein said first number of c) is 10 and said second number of d) is greater than 10.

30. A method as claimed in claim 24 wherein in d) said interpolated samples are provided at a rate slower than said sampling clock rate of c).

31. A method as claimed in claim 24 wherein said second number of d) is greater than said first number of c) and said interpolated samples of d) are provided at a rate slower than said sampling clock rate of c).

32. A method as claimed in claim 24, 25, 26, 27, 28, 29, 30 or 31 wherein said delay step e) also provides a signal in response to the delay time of said delayed interpolated samples.

33. A method as claimed in claim 24, 25, 26, 27, 28, 29, 30 or 31 wherein said input video type signal contains a color subcarrier conforming to the NTSC or PAL standard, and the frequency of said sampling clock of b) is at least 8 times the frequency of said color subcarrier.

34. A method as claimed in claim 24, 25, 26, 27, 28, 29, 30 or 31 wherein when a disruption of said input video type signal occurs, step f) provides black output video.

35. A method as claimed in claim 24, 25, 26, 27, 28, 29, 30 or 31 wherein when a disruption of said input video type signal occurs, step f) provides a known image.

36. A method as claimed in claim 24, 25, 26, 27, 28, 29, 30 or 31 wherein when a disruption of said input video type signal occurs, step f) provides a known image which known image may be an entire repetition period of stored samples from step e).

37. A method as claimed in claim 24, 25, 26, 27, 28, 29, 30 or 31 wherein when a disruption of said input video type signal occurs, step f) provides a first known image output video followed by a second known image after a time delay.

38. A method for processing and temporarily storing an analog input video type signal having scanning lines, some of which scanning lines have an active video portion, said input video signal also including a color subcarrier which may be an NTSC or PAL type, said method including for each of a plurality of said active video portions the following steps wherein M, N, X and Y are integers:
   a) processing said input video type signal to DC restore said input video type signal thereby providing a processed signal having a known DC level;
   b) generating a sampling clock at a frequency at least 8 times the frequency of said color subcarrier;
   c) sampling and digitizing an active video portion of said processed signal in response to said sampling clock to provide X digital samples of M bits of resolution;
   d) filtering each said X digital samples to provide Y filtered samples of N bits of resolution;
   e) temporarily storing said Y filtered samples to provide Y delayed samples;
   f) filtering said Y delayed samples to provide filtered delayed samples;
   g) providing an output video type signal in response to said filtered delayed samples with said output video type signal being in the same or different form as said input video type signal.

39. A method as claimed in claim 38 wherein N is larger than M.

40. A method as claimed in claim 38 wherein N is two more than M.

41. A method as claimed in claim 38 wherein the resolution of said filtered delayed samples is equal to N.

42. A method as claimed in claim 38 wherein the resolution of said filtered delayed samples is equal to N and N is 12.

43. A method as claimed in claim 38 wherein X is greater than Y.

44. A method as claimed in claim 38 wherein X is twice Y.

45. A method as claimed in claim 38 wherein the number of said filtered delayed samples is equal to Y.

46. A method as claimed in claim 38 wherein said frequency of said sampling clock of b) is an integer multiple of the frequency of said scanning lines.

47. A method as claimed in claim 38 wherein said storing of e) includes the use of a FIFO type memory.

48. A method as claimed in claim 38 wherein said filtering of d) and said storing of e) utilize separate clocks and said storing of e) includes the use of a FIFO memory to transfer data from the clock used in said filtering of d) to the clock used in the storing of e).

49. A method as claimed in claim 38 wherein in step g) selected ones of the repetitive sync, burst and blanking are reconstructed and reinserted in the stored signals from e) as part of providing said output video signal of g).

50. The invention as claimed in claim 1, 2, 3, 4, 5, 7, 8, 9, 10, 11, 12, 13, 14, 17, 18, 19, 20, 21, 24, 25, 26, 27, 28, 29, 30, 31, 38, 39, 40, 41, 42, 43, 44, 45, 46, 47, 48, or 49 wherein claim element e) is responsive to said input video type signal to provide said output video type signal with a fixed delay with respect to said input video type signal.

51. The invention as claimed in claim 1, 2, 3, 4, 5, 7, 8, 9, 10, 11, 12, 13, 14, 17, 18, 19, 20, 21, 24, 25, 26, 27, 28, 29, 30, 31, 38, 39, 40, 41, 42, 43, 44, 45, 46, 47, 48, or 49 wherein claim element e) is responsive to said input video type signal to provide said output video type signal with a fixed delay with respect to said input video type signal and wherein claim element e) is responsive to operator adjustment to adjust the amount of said fixed delay.

52. An electronic apparatus for processing an input video type signal including in combination:
   a) a clock section for recovering a clock;
   b) a receiving section responsive to said input video type signal to provide samples thereof in response to said clock section;
   c) an interpolation section responsive to groups of said samples to perform interpolation thereof to provide interpolated samples having improved resolution;
   d) a memory and control section to temporarily store said interpolated samples thus providing stored interpolated samples;
   e) an output section responsive to said stored interpolated samples to provide an output video type signal in the same or different form as said input video type signal.

53. An apparatus as claimed in claim 52 further including a filter section responsive to said interpolated samples of c) and operable to further improve the resolution thereof.

54. An apparatus as claimed in claim 52 further including a filter section responsive to said stored interpolated samples of d) and operable to further improve the resolution thereof.

55. An apparatus as claimed in claim 52 further including a filter section responsive to said interpolated samples of c) and said stored interpolated samples of d) and operable to further improve the resolution of said interpolated samples of c).

56. An apparatus as claimed in claim 52 further including a filter section responsive to said interpolated samples of c) and said stored interpolated samples of d) and operable to further improve the resolution of said stored interpolated samples of d).

57. A method for processing an input video type signal including the steps:
   a) generating a clock in response to said input video type signal;
   b) receiving said input video type signal in response to said clock to provide digital samples thereof having a first number of bits of resolution at said clock rate;
   c) interpolating groups of said digital samples to provide interpolated samples having a second number of bits of resolution;
   d) delaying said interpolated samples to provide delayed interpolated samples;
   e) providing an output video type signal in response to said delayed interpolated samples with said output video type signal being in the same or different form as said input video type signal.

58. A method as claimed in claim 57 further including filtering said interpolated samples of c) to improve the resolution thereof.

59. A method as claimed in claim 57 further including filtering said delayed interpolated samples of d) to improve the resolution thereof.

60. A method as claimed in claim 57 further including filtering said interpolated samples of c) and said delayed interpolated samples of d) to improve the resolution of said interpolated samples of c).

61. A method as claimed in claim 57 further including filtering said interpolated samples of c) and said delayed interpolated samples of d) to improve the resolution of said delayed interpolated samples of d).

62. A method as claimed in claim 57 wherein said first number of b) is 10 and said second number of c) is greater than 10.

63. A method as claimed in claim 57 wherein in c) said interpolated samples are provided at a rate slower than said clock rate of b).

64. A method as claimed in claim 57 wherein said second number of c) is greater than said first number of b) and said interpolated samples of c) are provided at a rate slower than said clock rate of b).

65. A method as claimed in claim 57, 58, 59, 60, 61, 62, 63 or 64 wherein said memory and control section of e) also provides a signal in response to the amount of time said stored interpolated samples are stored in said memory and control section.

66. The invention as claimed in claim 52, 53, 54, 55, 56, 57, 58, 59, 60, 61, 62, 63 or 64 wherein claim element d) is responsive to said input video type signal to provide said output video type signal with a fixed delay with respect to said input video type signal.

67. The invention as claimed in claim 52, 53, 54, 55, 56, 57, 58, 59, 60, 61, 62, 63 or 64 wherein claim element d) is responsive to said input video type signal to provide said output video type signal with a fixed delay with respect to said input video type signal and wherein claim element d) is responsive to operator adjustment to adjust the amount of said fixed delay.

68. The invention as claimed in claim 52, 53, 54, 55, 56, 57, 58, 59, 60, 61, 62, 63 or 64 wherein when a disruption of said input video type signal occurs, element d) provides a known image for said output video type signal.

* * * * *